United States Patent
Duane et al.

(10) Patent No.: US 12,293,351 B2
(45) Date of Patent: May 6, 2025

(54) PEER-TO-PEER DATA OBJECT TRANSFER AND STATE MANAGEMENT

(71) Applicant: Block, Inc., San Francisco, CA (US)

(72) Inventors: Michael Duane, San Francisco, CA (US); Matthew Hickman, San Francisco, CA (US); Steven Austin, Brooklyn, NY (US); Benjamin Shen, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 17/685,195

(22) Filed: Mar. 2, 2022

(65) Prior Publication Data

US 2023/0045946 A1    Feb. 16, 2023

Related U.S. Application Data

(60) Provisional application No. 63/301,046, filed on Jan. 19, 2022, provisional application No. 63/233,187, filed on Aug. 13, 2021.

(51) Int. Cl.
  *G06Q 20/34* (2012.01)
  *G06Q 20/06* (2012.01)
  (Continued)

(52) U.S. Cl.
  CPC ......... *G06Q 20/348* (2013.01); *G06Q 20/065* (2013.01); *G06Q 20/227* (2013.01); *G06Q 20/351* (2013.01); *G06Q 20/405* (2013.01)

(58) Field of Classification Search
  CPC .. G06Q 20/348; G06Q 20/065; G06Q 20/227; G06Q 20/351; G06Q 20/405
  See application file for complete search history.

(56) References Cited

U.S. PATENT DOCUMENTS 8,443,049 B1    5/2013  Geddes
10,482,449 B1 *  11/2019  Gantert .............. G06Q 20/3274
(Continued)

FOREIGN PATENT DOCUMENTS

WO   WO-2012082835 A1 *  6/2012  .......... G06Q 10/101
WO   2023/018903 A1    2/2023
WO   2023/018906 A1    2/2023

OTHER PUBLICATIONS

Bentz, Alyssa, Can I see some ID? https://www.wellsfargohistory.com/can-i-see-some-id/ (Year: 2022).*

(Continued)

*Primary Examiner* — Scott C Anderson
*Assistant Examiner* — James H Miller
(74) *Attorney, Agent, or Firm* — FIG. 1 Patents

(57) ABSTRACT

Particular embodiments determine, at least in part by a computing device of a payment service, to associate a data object with a user account that is associated with a stored balance managed by the payment service. The computing device associates an amount of the data object with a distinct stored balance associated with the user account. The distinct stored balance is associated with a condition of use. The computing device monitors transaction data associated with users of the payment service. The computing device identifies, from the transaction data, a transaction associated with an identifier associated with the user account. Based on a determination that the transaction satisfies the condition of use, processing payment for the transaction using at least a portion of the distinct stored balance prior to using the stored balance.

20 Claims, 27 Drawing Sheets

(51) Int. Cl.
*G06Q 20/22* (2012.01)
*G06Q 20/40* (2012.01)

(56) References Cited

U.S. PATENT DOCUMENTS

| | | | |
|---|---|---|---|
| 10,692,060 B2 | 6/2020 | Gardner et al. | |
| 10,721,242 B1 | 7/2020 | Jones et al. | |
| 11,055,727 B1 | 7/2021 | Kumar | |
| 2004/0260653 A1 | 12/2004 | Henry et al. | |
| 2006/0143107 A1 | 6/2006 | Dumas et al. | |
| 2008/0228615 A1* | 9/2008 | Scipioni | G06Q 20/10 705/35 |
| 2012/0030109 A1 | 2/2012 | Dooley et al. | |
| 2012/0290420 A1* | 11/2012 | Close | G06Q 20/20 705/16 |
| 2013/0041814 A1* | 2/2013 | Ankarath | G06Q 40/00 705/39 |
| 2013/0110720 A1* | 5/2013 | Rekhi | G06Q 20/2295 705/35 |
| 2013/0218657 A1* | 8/2013 | Salmon | G06Q 30/0215 705/14.29 |
| 2013/0311467 A1 | 11/2013 | Galle et al. | |
| 2014/0067671 A1 | 3/2014 | Dehaven et al. | |
| 2014/0081852 A1 | 3/2014 | Blackhurst et al. | |
| 2014/0207612 A1* | 7/2014 | Isaacson | G06Q 40/02 705/26.8 |
| 2014/0278905 A1 | 9/2014 | Denardis | |
| 2017/0048248 A1* | 2/2017 | Janzer | H04L 63/10 |
| 2018/0089294 A1 | 3/2018 | Dray et al. | |
| 2018/0204281 A1 | 7/2018 | Painter et al. | |
| 2019/0116187 A1 | 4/2019 | Gahnoog et al. | |
| 2019/0392418 A1* | 12/2019 | Butler | G06Q 20/36 |
| 2020/0058012 A1 | 2/2020 | Chandorkar et al. | |
| 2020/0074447 A1* | 3/2020 | Isaacson | G06Q 20/10 |
| 2020/0133955 A1 | 4/2020 | Padmanabhan et al. | |
| 2020/0167861 A1 | 5/2020 | Ramaswamy et al. | |
| 2020/0265440 A1 | 8/2020 | Albouyeh et al. | |
| 2020/0294110 A1* | 9/2020 | Sirota | G06Q 30/0603 |
| 2020/0327534 A1* | 10/2020 | Swanson | G06Q 30/0641 |
| 2021/0019808 A1* | 1/2021 | Erez | G06Q 20/12 |
| 2021/0090147 A1* | 3/2021 | Kochhar | G06Q 30/0613 |
| 2021/0142326 A1 | 5/2021 | Butler et al. | |
| 2021/0174338 A1* | 6/2021 | Isaacson | G06Q 40/02 |
| 2021/0256070 A1* | 8/2021 | Tran | G06F 16/90332 |
| 2021/0374709 A1 | 12/2021 | Suresh et al. | |
| 2022/0005020 A1* | 1/2022 | Moring | G06F 16/2379 |
| 2022/0366411 A1 | 11/2022 | Bajwa et al. | |
| 2023/0046919 A1 | 2/2023 | Dhodapkar | |
| 2023/0047509 A1 | 2/2023 | Dhodapkar | |

OTHER PUBLICATIONS

Aday, Mike, "Country Store Ledgers Provide an Intimate Look at Lives from the Past," (Year: 2018).*
Personalized Cash/Gift Cards, IP.com No. IPCOM000158071D (Year: 2007).*
Method for point of service 'automatic gift card redemption thank you', IP.com No. IPCOM000218179D (Year: 2012).*
International Search Report and Written Opinion for International Application No. PCT/US2022/040117, mailed Nov. 22, 2022.
A Framework Based on Distributed Ledger Technologies for Data Management and Services in Intelligent Transportation Systems. IEEE vol. 8, pp. 100384-100402 (Year: 2020).
Langley et al., "Approaches To Machine Learning", Carnegie-Mellon University, Feb. 16, 1984, 28 pages.
International Search Report and Written Opinion for International Application No. PCT/US2022/040114, mailed Nov. 18, 2022.

* cited by examiner

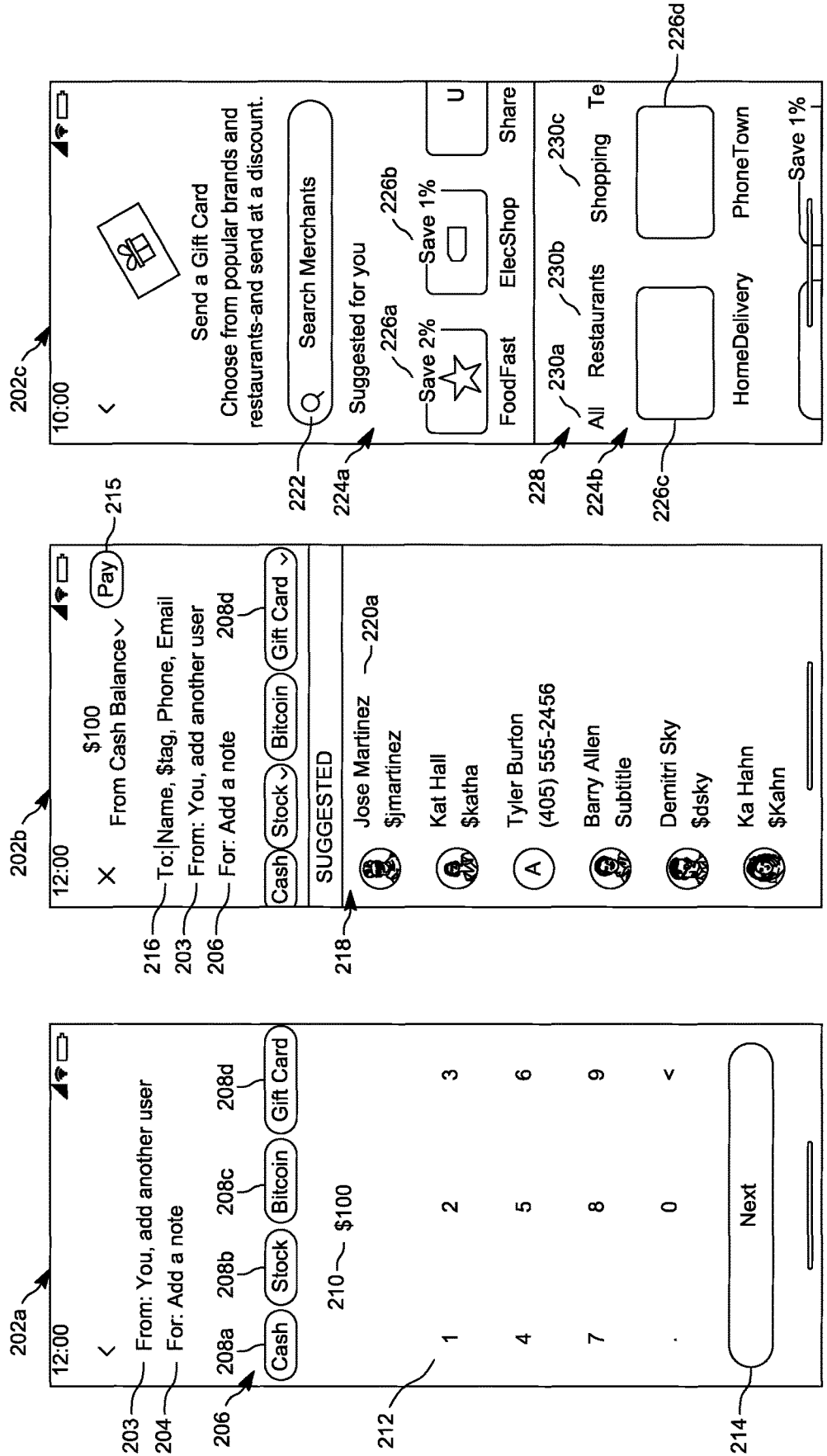

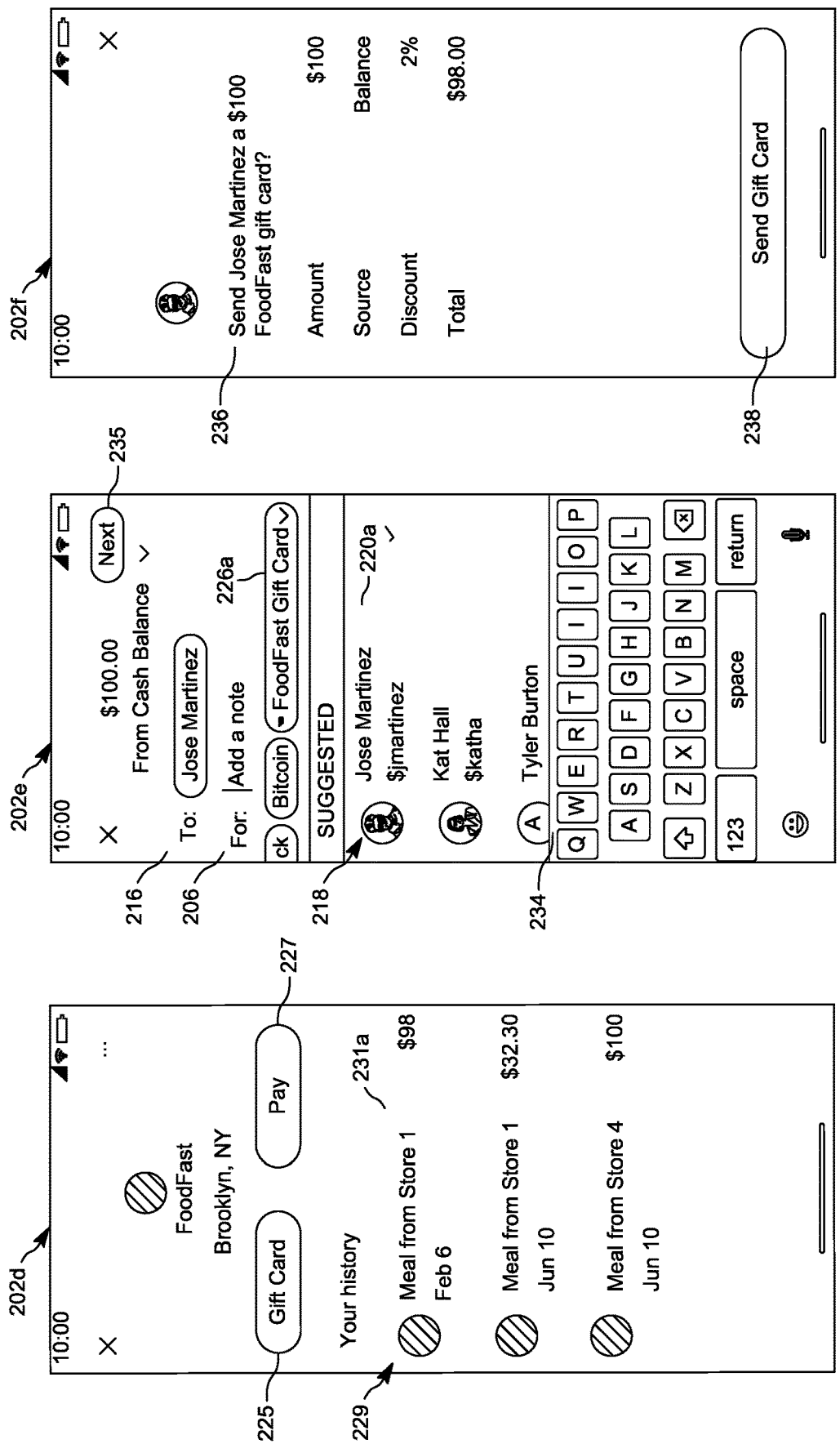

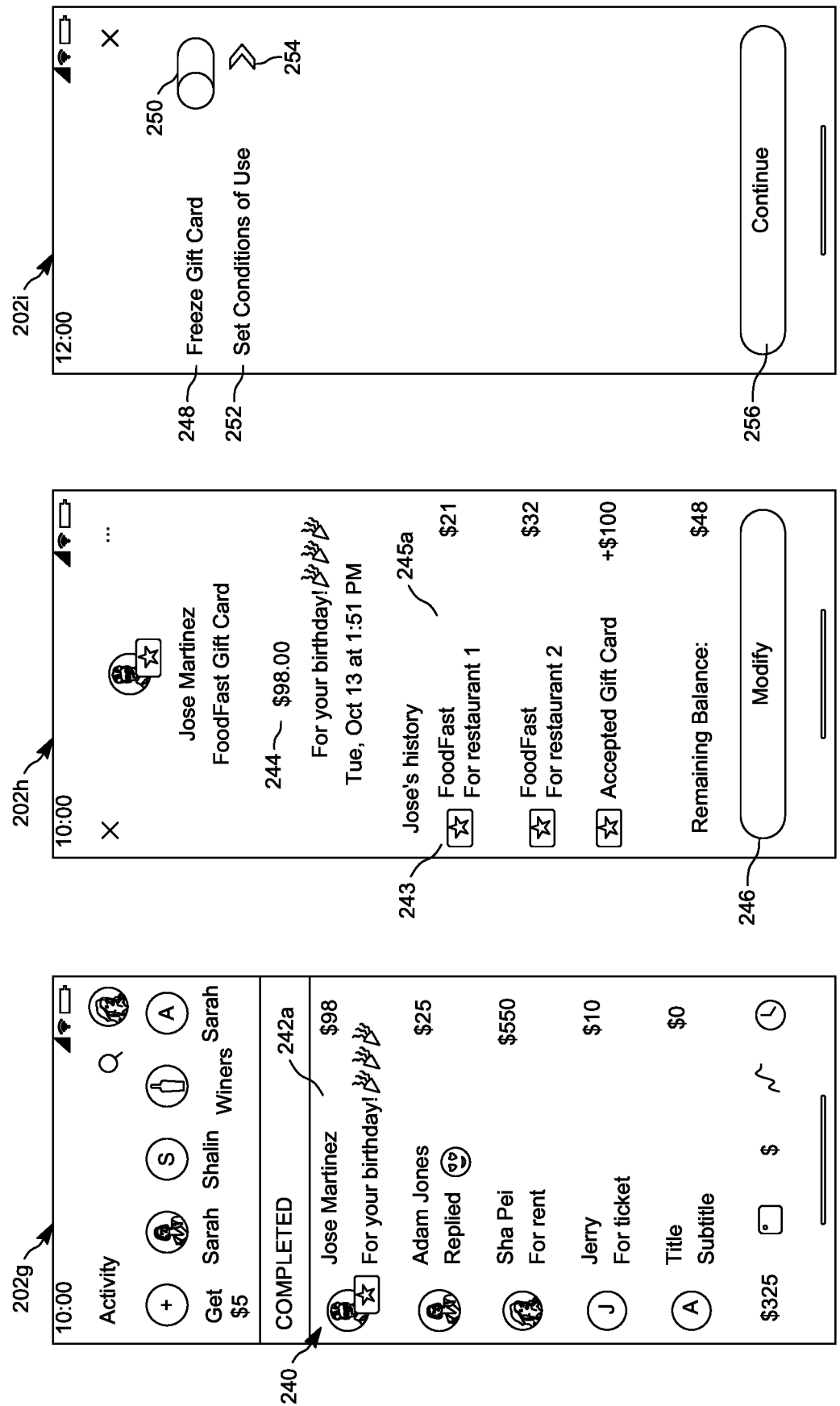

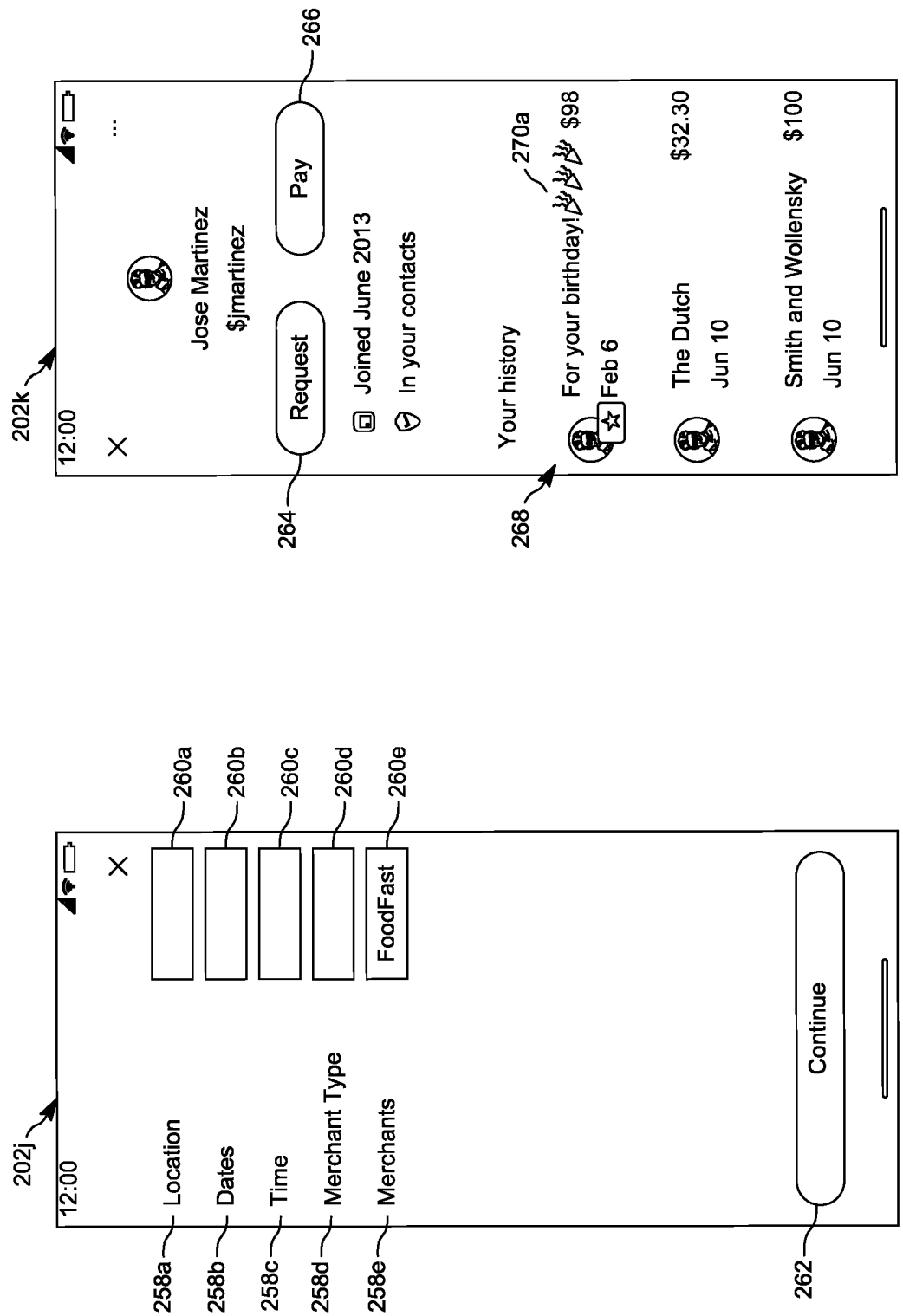

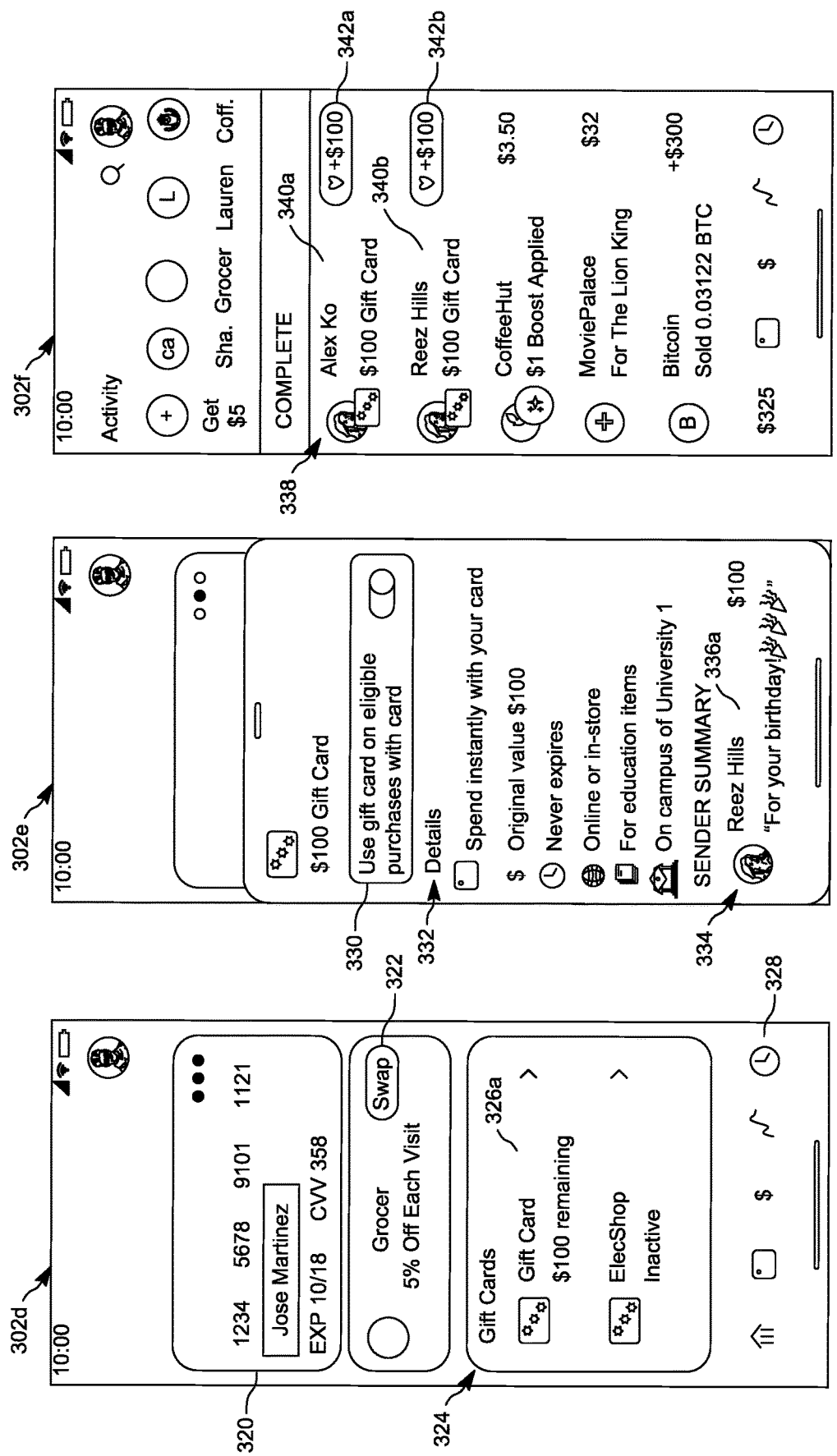

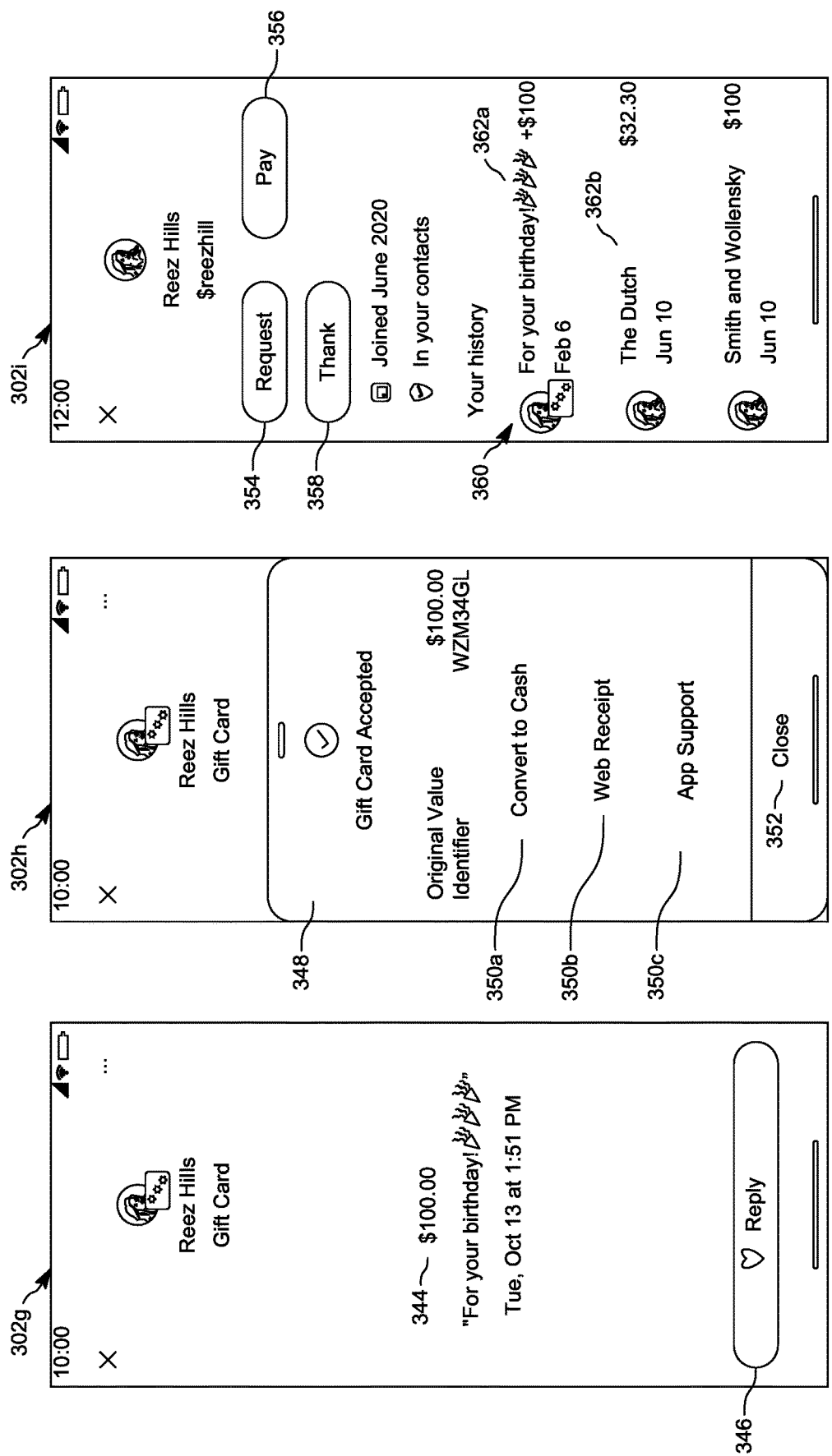

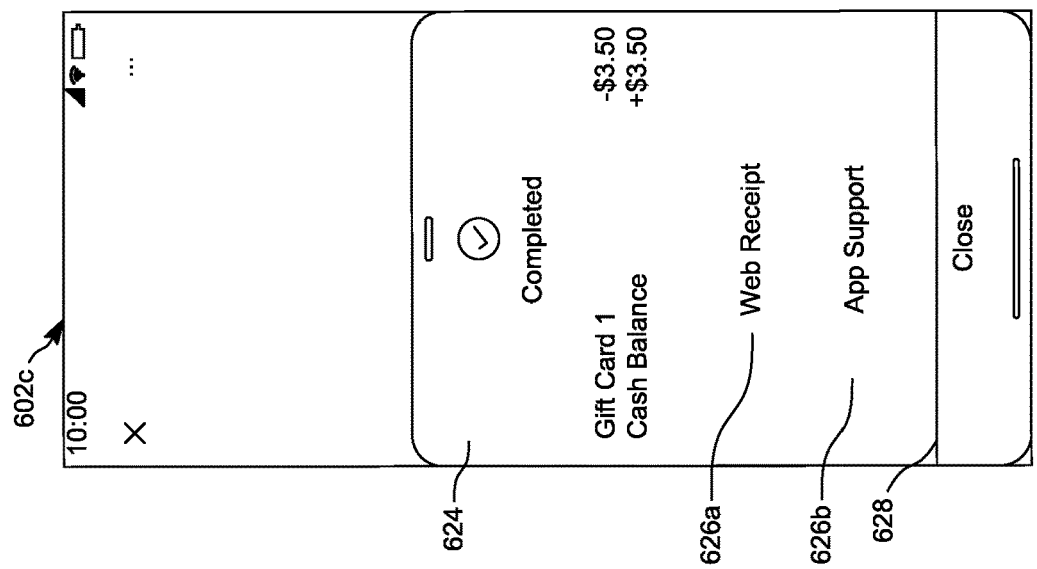
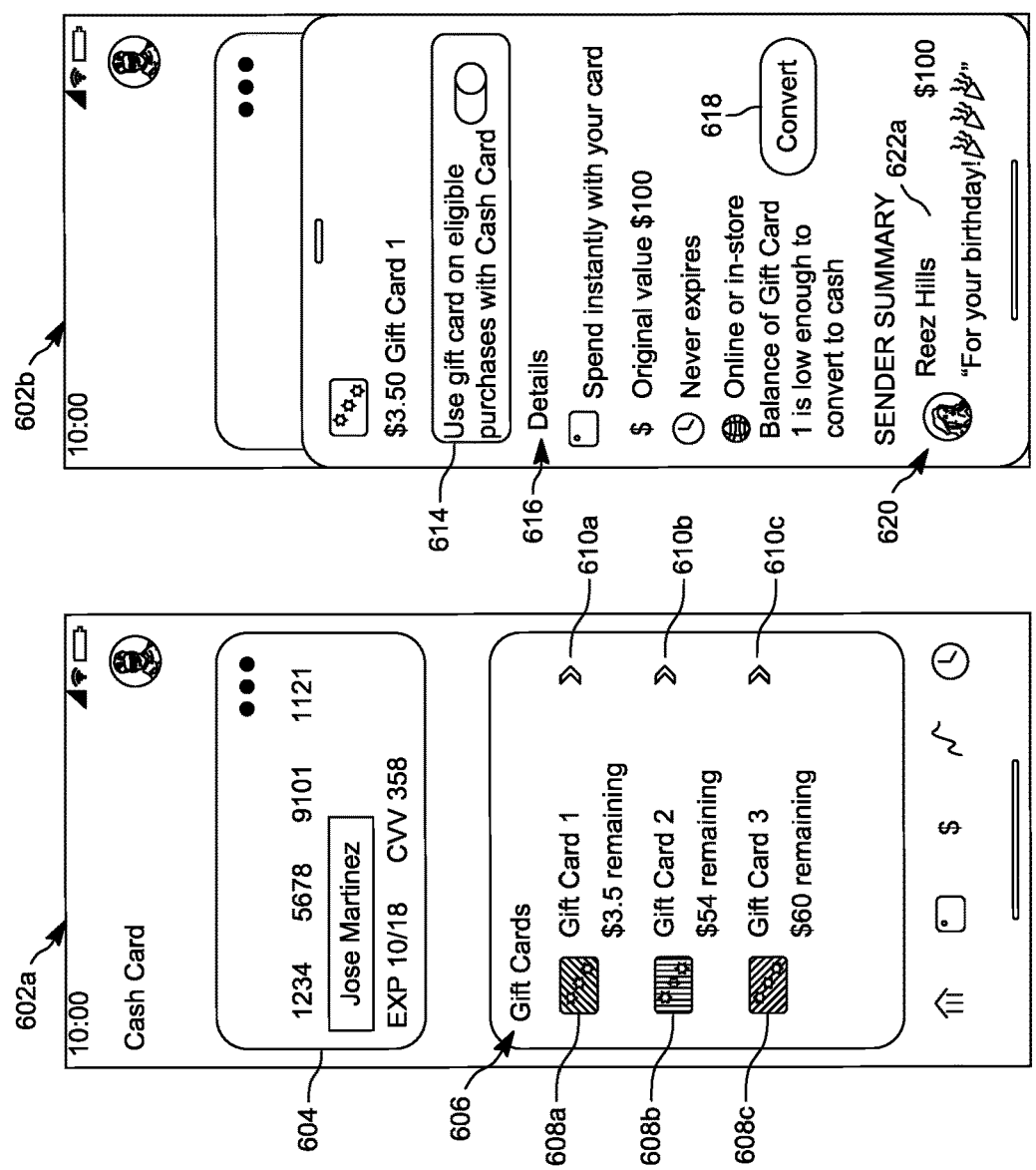
FIG. 6C
FIG. 6B
FIG. 6A

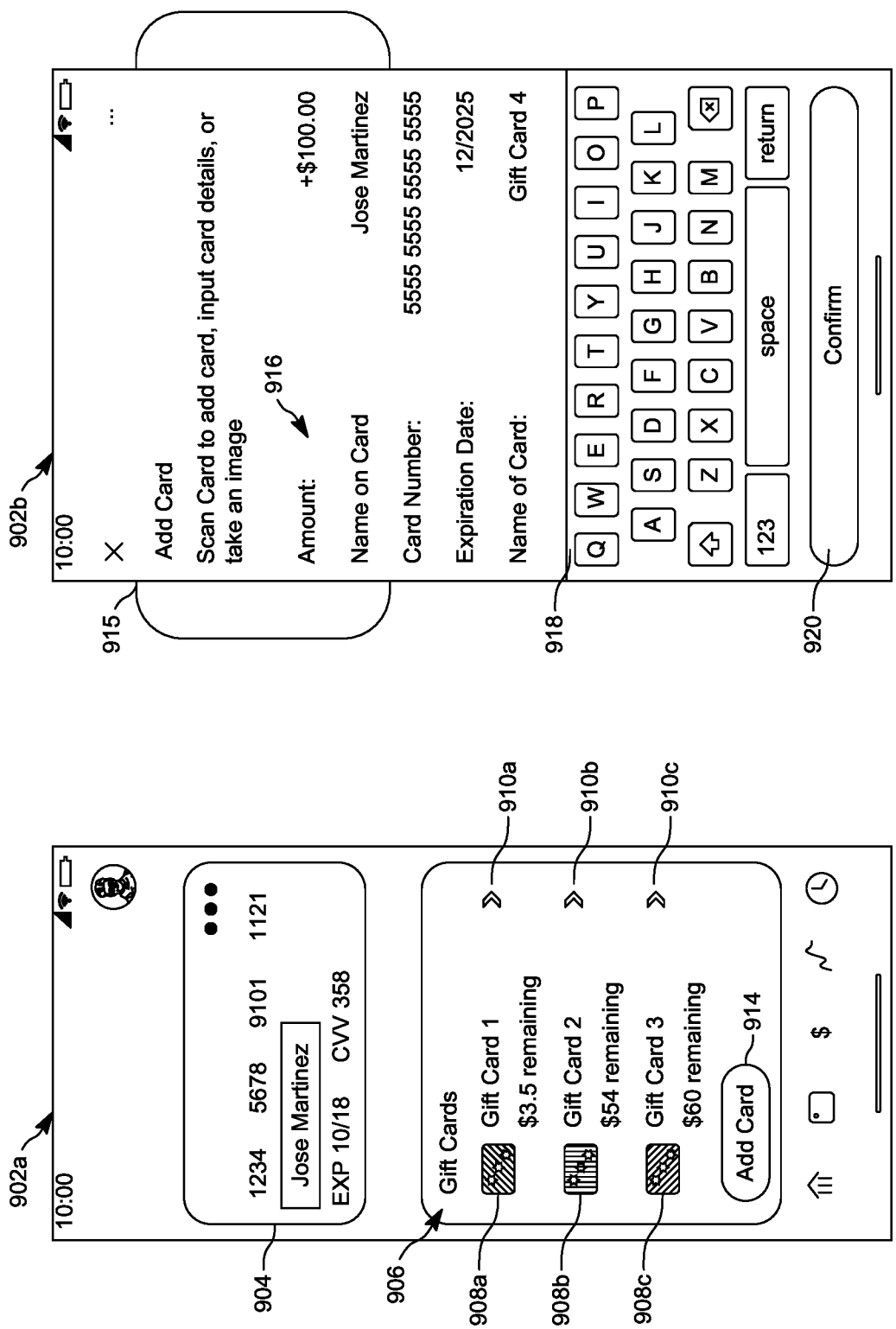

PEER-TO-PEER DATA OBJECT TRANSFER AND STATE MANAGEMENT

PRIORITY

This application claims the benefit, under 35 U.S.C. § 119(e), of U.S. Provisional Patent Application No. 63/233,187, filed 13 Aug. 2021, the entire contents of which are incorporated herein by reference and U.S. Provisional Patent Application No. 63/301,046, filed 19 Jan. 2022, the entire contents of which are incorporated herein by reference.

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical components or features. Moreover, multiple instances of the same part are designated by a common prefix separated from the instance number by a dash. The figures are not drawn to scale.

FIGS. 2A-2K are example graphical user interfaces (GUIs) for peer-to-peer data object transfer and state management as displayed on a user device of a user sending a data object according to some embodiments disclosed herein.

FIGS. 3A-3I are example GUIs for peer-to-peer data object transfer and state management as displayed on a user device of a user receiving a data object according to some embodiments disclosed herein.

FIGS. 6A-6C are example GUIs for converting an amount associated with a stored balance associated with a data object to a stored balance as displayed on a user device according to some embodiments disclosed herein.

FIGS. 9A-9D are example GUIs for adding a data object to a user account as displayed on a user device according to some embodiments disclosed herein.

DETAILED DESCRIPTION

Figure 1:
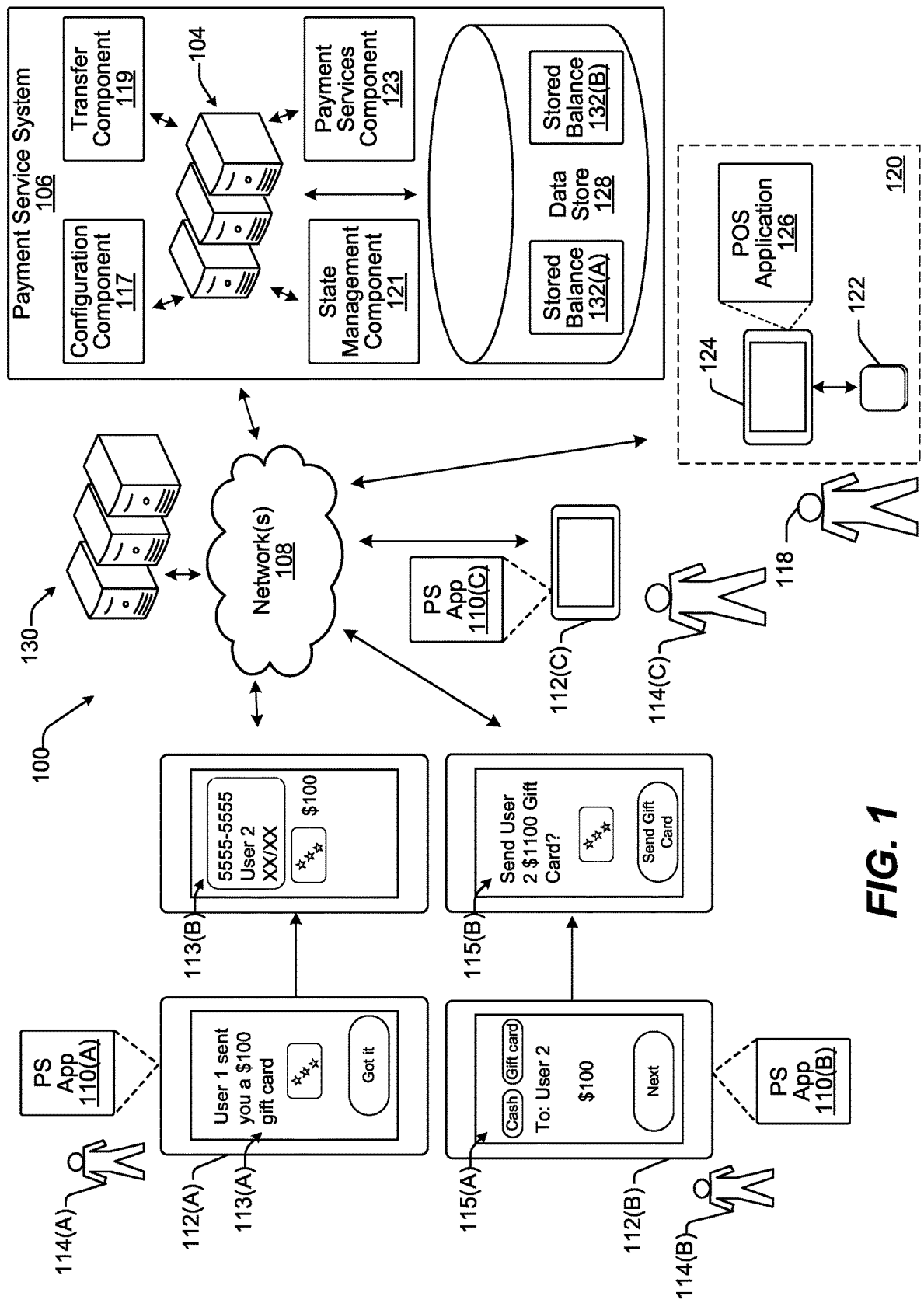
FIG. 1 is an example payment service system for providing peer-to-peer data object transfer and state management according to some embodiments disclosed herein.

Techniques described herein relate to peer-to-peer (P2P) data object transfer and state management. In at least one example, users can transfer data objects between and among one another to facilitate "peer-to-peer" data object transfers. In an example, such "data objects" can be associated with assets, such as fiat currency, stocks, cryptocurrency, or the like. In at least one example, such data objects can be transferred with one or more conditions attached thereto. That is, in some examples, techniques described herein relate to the transfer and state management of "conditional currency" using a payment service system of a payment service. "Conditional currency," as used herein, can represent a medium of exchange, such as fiat currency, stocks, cryptocurrency, or the like, that can be used when certain conditions, such as a transaction category, a geolocation, a time, an item inclusion list (e.g., using funds for items on the list is permitted), an item exclusion list (e.g., using funds for items on the list is not permitted), particular merchant(s), particular merchant category(s), or the like are satisfied. Conditional currency can be transferred between users of the payment service system using data objects maintained by the payment service system and associated with user accounts. An example of a data object includes a digital gift card that represents a value of currency that can be used when certain conditions are satisfied.

In at least one example, the payment service system may receive a request to transfer conditional currency from a first user to a second user. In at least one example, the conditional currency can be associated with a digital gift card that is associated with a merchant. That is, the "digital gift card" can be associated with a value of currency, the use of which is conditioned on transaction(s) involving the merchant. In response to receiving the request, the payment service system can create a data object, which can be associated with a stored balance. The stored balance can be associated with a value of currency, which can be withdrawn from a balance of a user account of the first user. The data object associated with the stored balance can be wrapped or otherwise associated with an image, graphic, or the like, which can be representative of the merchant, an event, an occasion, or the like. The resulting data object can represent the digital gift card, which can be transferred to the second user. In response to the transfer, the stored balance can be associated with a user account of the second user. In some examples, the stored balance can be stored as a distinct balance associated with a user account of the second user. The distinct balance can be physically or logically separate from other stored balances of the user account. For example, the user account can include a fiat stored balance, a cryptocurrency stored balance, a spending stored balance, a savings stored balance, etc. and a stored balance associated with the digital gift card. In at least one example, the stored balance can be associated with one or more conditions. In this example, a condition can be the merchant with whom the digital gift card is associated. That is, use of the stored balance can be conditional on transactions involving the merchant. The payment service system can manage access to the distinct stored balance based at least in part on whether such condition(s) have been satisfied.

In at least one example, the payment service system may manage the state of the data object and associated stored balance. "State" as used herein can refer to characteristics of a data object. For example, a state of a data object can indicate whether a data object is enabled or disabled. As an example, a data object can be "enabled," or associated with an enabled state, such that the payment service system automatically applies the stored balance associated with a data object to a transaction in response to determining that one or more conditions for use of a stored balance associated with the data object are satisfied. As another example, a data object can be "disabled," or associated with a disabled state, such that if one or more conditions for use of a stored balance associated with the data object are satisfied, and the data object is associated with a stored balance with a value greater than zero, the payment service system does not automatically apply the stored balance to a transaction. In some examples, a stored balance associated with a data object can represent a state of the data object. In an additional or alternative example, a state of a data object can indicate that a stored balance associated with the data object is associated with a "low balance" (e.g., is below a threshold). In at least one example, a state of a data object can indicate that a stored balance associated with the data object has been exhausted (e.g., is equal to zero) and thus the state can indicate that the data object has expired (e.g., is associated with an "expired state") or is otherwise disabled. In some examples, a data object can be associated with a temporal restriction such that the data object is valid until a particular date or for a particular time. In some examples, a state of a data object can indicate that the data object has expired (e.g., the particular date or particular time has passed).

In some examples, the payment service system can monitor transaction data associated with transactions between users of the payment service system and can update the state of a data object based thereon. In at least one example, transaction data, which can be received in real-time or near real-time, can be used to generate "transaction history." In at least one example, transaction history can be stored internally at the payment service system in the form of "ledger events," which can be indications of transactions that are recorded in one or more ledgers managed by the payment service system. Ledger events can, in turn, be used to update and otherwise manage states of data objects, as described above. In an example, the payment service system can monitor transaction data in real-time or near-real-time to determine when a particular transaction is associated with the data object and associated stored balance. That is, the payment service can monitor transaction data associated with a user account of a user in real-time or near-real-time to determine whether funds for a particular transaction should be withdrawn from the stored balance. In some examples, such a determination can be based at least in part on a determination of whether the particular transaction satisfies the condition(s) associated with the stored balance. For example, the payment service system can monitor transaction data to determine whether a transaction is associated with the merchant with whom the data object is associated. Based on a determination that the transaction is associated with the merchant, the payment service system can withdraw funds from the stored balance. That is, a ledger event (e.g., withdrawal) relating to the stored balance can be performed by the payment service system and the state associated with the data object can be updated to reflect the ledger event. In some examples, because the stored balance can be managed internally by the payment service system, a user can apply the stored balance to the transaction with the merchant and the merchant involved in the transaction may not be aware that a digital gift card associated with the merchant was used for payment of the transaction. In at least one example, the state of the data object can be updated based at least in part on the modification to the stored balance. Further, if the stored balance is exhausted, the state can indicate that the data object is expired.

Techniques described herein offer improvements to existing gift card, or related conditional currency, technologies. As described herein, a payment service system can facilitate an end-to-end gift card generation, transfer, and redemption process. The payment service system can internally manage, using a ledger system, stored balances associated with data objects that correspond to gift cards, thereby alleviating the need to involve multiple parties, multiple network transactions, and the like. By centralizing gift card generation, transfer, and redemption, such transactions are more secure, require less computational resources, alleviate network congestion, are faster, and avail additional efficiencies when compared to conventional gift card technologies. Additional details are provided below.

In conventional gift card technology, there are "open loop" gift cards and "closed loop" gift cards. Open loop gift cards (e.g., VISA® gift card) can be used at various merchants because they run on conventional credit card payment rails. That is, open loop gift cards utilize bank(s) that holds funds, a network to connect the bank(s) and merchant(s), a payment processor to process and route transaction(s), and merchant(s) that accept the open loop gift cards. In an example, an open loop gift card may be associated with a stored balance that is managed by a bank. When a user wants to apply the stored balance to a transaction with a merchant, they provide an identifier associated with the gift card, which initiates a communication process between the merchant and the bank using the network and payment processor to facilitate processing of the transaction. That is, the merchant communicates with the bank, via the network and payment processor, to access funds associated with the gift card. If the stored balance has enough funds to cover the cost of the transaction, the transaction is authorized. Once the transaction is authorized, the bank can deduct the total amount of the transaction from the stored balance of the gift card and transfer the funds to the merchant.

For closed loop gift cards, gift cards are only redeemable at a particular merchant (e.g., a STARBUCKS® or NORDSTROM® gift card). Funds associated with a closed loop gift card may be held by the merchant after purchase of the gift card and may be managed by the respective merchant's internal accounting. That is, the merchant's internal accounting can indicate a stored balance associated with the gift card and when a user wants to apply the stored balance to a transaction, they provide an identifier associated with the gift card to the merchant at the point of sale. The identifier can be used to identify the stored balance associated with the gift card. If the stored balance has enough funds to cover the cost of the transaction, the merchant deducts the total of the transaction from the stored balance of the gift card to process the transaction.

In conventional gift card technologies, both open and closed loop gift cards require activation when purchased to prevent theft, fraud, and inadvertent use of unloaded (i.e., zero balance) gift cards. This can be a cumbersome process that requires additional steps by the user or by the provider of the gift card. As an example, to activate a gift card sold at a merchant, the merchant provides the gift card provider (if not the merchant itself) with the identification of the gift card and the amount for the balance using computational resources and networking bandwidth. If the gift card is to be later activated by a recipient, the recipient also provides the identification of the gift card and potentially a verification value to the gift card provider. Techniques described herein can offer improvements to conventional gift card technologies by eliminating the need for activation. When a sending user requests to send a digital gift card to a recipient user, the payment service system can generate a data object with a stored balance that is usable upon acceptance of the data object by the recipient. The sending user need not engage in additional activation steps, thereby streamlining gift card generation in view of conventional gift card technologies. Furthermore, the automatic association of the stored balance with a user account of the receiving user can enable the receiving user to subsequently use the stored balance associated with the data object without requiring a separate activation. That is, verification of the sending user and receiving user can be performed efficiently using processes internal to the payment service system, thereby offering improvements to conventional gift card technologies.

Furthermore, in conventional gift card technologies, gift cards are ripe for theft and fraud. As described above, both open and closed loop gift cards are associated with identifiers that are required for use. In conventional gift card technologies, to use a gift card, a user provides the identifier at the point of sale. That is, anyone having access to an identifier associated with a gift card can redeem the gift card by providing the identifier at the point of sale. As such, in conventional technologies, a gift card can easily be stolen or fraudulently used because a bad actor only needs the identifier to use the gift card. Additionally, in conventional technologies, a common form of gift card fraud committed by cyber criminals is attacking merchant systems which store gift card data. Once the criminal has stored gift card information, they only need to check the balance through online customer portals to use associated funds.

Techniques described herein offer improvements to conventional technologies by creating associations between stored balances availed via digital gift cards and user accounts, thereby offering added layers of security and protection against theft and fraud. For example, rather than needing only an identifier of a gift card for access to associated funds, techniques discussed herein instead create an association between a data object, associated with a digital gift card, and a user account. As such, a digital gift card can be associated with a user account that is accessible via a payment instrument that is linked to the user account. When a user uses the payment instrument at a merchant associated with the digital gift card, the payment service system can access funds associated with the digital gift card.

Use of such a payment instrument can utilize one or more forms of authentication or authorization, such as one or more layers of security protocols, to mitigate theft and fraud. As such, by associating the digital gift card with the user account, access to which is subject to one or more forms of authentication or authorization, techniques described herein provide more security and protection against theft and fraud than conventional technologies.

As described above, in conventional gift card technologies, a stored balance associated with a gift card can be stored in either a database of a merchant (e.g., for a closed loop gift card) or a database of a bank (e.g., for an open loop gift card). As such, in conventional gift card technologies, an identifier is required to be presented at the time of a transaction (e.g., at the point of sale) so that the merchant or bank can access the stored balance associated with the gift card. That is, in conventional gift card technologies, transactions involving the use of gift cards can be fraught with friction such that users are required to have gift cards, or at least associated identifiers, on hand at the point of sale in order to redeem such gift cards.

Techniques described herein can offer improvements to conventional gift card technologies by reducing or eliminating friction at the point of sale. As described above, techniques discussed herein create an association between a data object, associated with a digital gift card, and a user account. As such, a digital gift card can be associated with a user account that is accessible via a payment instrument that is linked to the user account. When a user uses the payment instrument at a merchant associated with the digital gift card, the payment service system can access funds associated with the digital gift card. As such, the user need not provide an identifier associated with a gift card at the point of sale as is the case with existing gift card technologies. Further, as described herein, the payment service system can monitor transactions associated with user accounts of the payment service in real-time and determine whether a stored balance associated with a digital gift card applies to a transaction automatically without user input. That is, in some examples, techniques described herein can enable a digital gift card to be applied to a transaction without further input from a user. In some examples, users can apply digital gift cards to transactions at a time after the point of sale. For example, the payment service can identify, in transaction history associated with a user account, a transaction to which a digital gift card applies (e.g., satisfies a condition associated therewith) and can credit another stored balance associated with the user account using the stored balance associated with the digital gift card.

In conventional gift card technologies, a gift card is applied to a transaction when the gift card, or an associated identifier, is redeemed in association with the transaction. That is, in conventional gift card technologies, there is no active monitoring, by a payment service system, to determine if or when a gift card can be applied to a transaction. As described herein, the payment service system can actively monitor transaction data, in real-time or near-real-time, to determine whether a digital gift card applies to a transaction. In some examples, and as will be described herein, the payment service system can monitor transaction data and compare the transaction data to one or more conditions associated with individual stored balances associated with individual digital gift cards. When transaction data associated with a transaction satisfies a condition associated with a stored balance, the payment service system can use the stored balance, or a portion thereof, for payment of the transaction. In some examples, the payment service system can use the stored balance automatically, without further input from the user. In some examples, the payment service system can prompt the user for additional input before using the stored balance. In any event, such real-time or near-real-time monitoring can offer improvements to conventional gift card technologies.

Further, in conventional gift card technologies, multiple gift cards, and associated identifiers, can be presented for a single transaction. In such examples, in conventional gift card technologies, each gift card can be read (e.g., by a reader device) or data associated therewith input individually. This can add friction to a transaction. In examples where the stored balance of a gift card is insufficient to satisfy a total cost of a transaction, a user can be required to provide an additional or alternative payment instrument to satisfy the remainder. In examples where more than one payment instrument (e.g., multiple gift cards, a gift card and one or more other payment instruments) are presented at the point of sale, multiple transactions can be initiated (e.g., for each payment instrument), which can consume computing resources and network bandwidth.

As described herein, the payment service system can provide centralized management of stored balances associated with user accounts, which can provide improvements over conventional gift card technologies. In at least one example, centralized management can enable the payment service system to present a user interface from which a user can view, manage, or otherwise interact with each of their digital gift cards (e.g., in a single user interface). This can offer improvements over conventional gift card technologies. Further, in some examples, the payment service system can associate multiple digital gift cards with the user account such that if the user desires to use multiple gift cards for a single transaction, the payment service system can apply each of the multiple gift cards in response to a single use of the payment instrument associated with the user account. Moreover, in examples where the stored balance associated with the digital gift card is insufficient to satisfy a total cost of a transaction, the payment service system can access another stored balance associated with the user account to satisfy the remainder without another input from the user. That is, the payment service system can automatically access funds associated with another stored balance of the user account to satisfy the reminder. As such, techniques described herein eliminate the need for users to keep gift cards and associated identifiers on hand for use at points of sale and further reduce computational resources and network bandwidth by reducing the number of transactions required to be processed when multiple payment instruments are used in association with a transaction. Thus, techniques described herein offer improvements over existing gift card technologies.

In conventional gift card technology, there may be scenarios where a user does not spend the entirety of a stored balance associated with a gift card or a merchant associated with the gift card goes out of business. This "leftover" value can consume storage resources in perpetuity or, if the gift card is associated with an expiration date or condition, until the gift card expires. That is, so long as there is a stored balance associated with a gift card, in conventional gift card technologies, the bank or merchant associated with the gift card can store an indication of such in a database. In examples where the leftover value is never used, such an indication can be stored in perpetuity or until the gift card expires. Such leftover values can be frustrating for users because a leftover value can be insufficient for use in another transaction or otherwise low enough that using the gift card would be inconvenient. In some examples, when a merchant goes out of business, the leftover value may be unusable. Techniques discussed herein enable a payment service system to convert a leftover value to an unencumbered stored balance or transfer the leftover value to another stored balance associated with a user account. In some examples, the payment service system can determine that the value of a stored balance associated with digital gift card has fallen below a threshold and can convert the stored balance to unencumbered funds or transfer the stored balance to another stored balance associated with a user account. In some examples, the threshold can be dynamically determined based at least in part on transaction history of transactions associated with users of the payment service. In some examples, such determinations can be made by machine-learning model(s), as described below. By combining the stored balance of a data object with another stored balance of a user account, the indication of the stored balance of the data object need not be stored and thus, the payment service system can reduce storage requirements and therefore provide improvements to conventional gift card technologies.

In some examples, the payment service system can dynamically top off a stored balance of a gift card based at least in part on a determination that the value of the stored balance has fallen below a threshold. In such examples, the payment service system can monitor stored balances in real-time or near-real-time, and based at least in part on a determination that a particular stored balance has fallen below a threshold, the payment service system can automatically transfer funds from another stored balance of the user to the stored balance associated with the gift card. In some examples, the threshold can be dynamically determined based at least in part on transaction history of transactions associated with users of the payment service. In some examples, such determinations can be made by machine-learning model(s), as described below.

In conventional gift card technologies, gift cards are tied to a single currency, such as the currency in which they are purchased. In conventional gift card technologies, such a currency is fiat currency. This restricts the use of a gift card to certain region(s) or merchant(s) that accept the corresponding currency and have the technical infrastructure to support the use of the gift card. Techniques discussed herein can enable a payment service system to provide a dynamic conversion of a currency associated with a stored balance of a data object. In some examples, a stored balance associated with a data object representative of a digital gift card can be associated with non-fiat currency or converted, by the payment service system, into non-fiat currency for use. In some examples, such a conversion can be based at least in part on a preference or other data associated with a redeeming user, a receiving merchant or other user, a transaction, or the like. As an example, if a user has a gift card stored on a user account that is tied to the United States dollar (USD), but is attempting to perform a transaction using different currency (e.g., Euros or cryptocurrency), the payment service system can automatically convert the gift card to a requested currency to process the transaction. The use of various currencies or conversion thereof can offer improvements to conventional gift card technologies.

Conventional gift card technology does not readily support integration of intelligence. Techniques described herein enable the integration of intelligence, such as through the use of machine-learning models or rules-based decision models, to improve conventional gift card technology, thereby offering improvements thereto. For example, techniques discussed herein can use one or more machine-learning models to determine, for example, one or more conditions of use to recommend adding to a data object. The machine-learning models can make recommendations for conditions of use to recommend adding to a data object, which can be particular to a user, a group of users, or all users of the payment service. Such recommendations can be used for enabling users to send more personalized or customized digital gift cards to other users. Additionally or alternatively, techniques discussed herein can use one or more machine-learning models to determine, for example, one or more users to whom to send a data object. The machine-learning models can make predictions or recommendations regarding which users to which the sending user would like to send a data object. The machine-learning models can base predictions or recommendations on individual contexts of the sending or receiving users, a larger group of users, or all users of the payment service. As an example, the machine-learning models can determine that a user often sends a data object to a particular user as a particular time of the year and recommend or remind the user to do so again. Intelligence can be further integrated using the techniques described herein to further improve digital gift giving or to provide additional features to users of a service support digital gift cards.

As described above, techniques described herein offer a variety of technical solutions to technical problems in conventional gift card technology. Additional or alternative benefits associated with techniques described herein are described below. While this disclosure references gift cards, techniques described herein can be applicable to any conditional currency, the transfer and state tracking of which can be managed using data objects.

FIG. 1 is an example environment 100 for providing P2P data object transfer and state management as discussed herein. The example environment 100 can include a payment service system 106 that can be associated with a payment service. That is, operations described as being performed by the payment service can be performed by the payment service system 106. The payment service system 106 can include server(s) 104 and a datastore 128 that are configured to exchange electronic communications through network(s) 108 with one or more other computing devices, such as the user devices 112(A) and 112(B).

In at least one example, the server(s) 104 of payment service system 106 can exchange electronic communications through the network(s) 108 with the user devices 112(A) and 112(B) by way of the respective instances of the payment service application ("app") (shown as PS app 110(A) and 110(B)) executing thereon. In FIG. 1, a receiving user 114(A) is shown as receiving a digital gift card from a sending user 114(B) via respective instances of the PS app 110(A) and 110(B)) on their respective user devices 112(A) and 112(B). That is, the PS app 110(A) is shown as receiving a data object, associated with a stored balance, from the PS App 110(B). The data object can be wrapped or otherwise associated with an image, graphic, or the like, which can be representative of the merchant, an event, an occasion, or the like. The resulting data object can represent the digital gift card.

The datastore 128 can store data, including account information associated with user accounts of users of the payment service (e.g., the receiving user 114(A), the sending user 114(B), merchant(s), other user(s), etc.). In some examples, each of the user accounts can be associated with one or more stored balances, such as stored balance 132(A) and 132(B). The payment service system 106 may access the datastore 128 to store and update the account information of the users of the payment service. For example, with respect to the transaction represented in FIG. 1, the payment service system 106 can access the data in the datastore 128 to associate the stored balance of the data object (e.g., digital gift card) with a stored balance 132(A) of the receiving user 114(A) and modify the stored balance 132(B) of the sending user 114(B) based on a value associated with the data object. As an example, the payment service system 106 can reduce the stored balance 132(B) by an amount (e.g., the value) associated with a data object. The stored balance 132(A) can be associated with the same amount. The stored balance 132(A) can be a distinct stored balance that can be physically or logically separated from one or more other stored balances associated with the user account of the receiving user 114(A). For example, the stored balance 132(A) associated with a received data object may be separated physically or logically from a spending stored balance, a savings stored balance, a cryptocurrency stored balance, a stock stored balance, or the like that are associated with the user account of the receiving user 114(A).

The server(s) 104 may maintain functional components that enable the payment service to perform operations as described herein. As a non-limiting example, the server(s) may maintain a configuration component 117, a transfer component 119, a state management component 121, and a payment services component 123. The server(s) 104 can store additional or alternative functional components, as described below with reference to FIG. 19. In some examples, functional components can be combined or have one or more sub-components. In some examples, additional or alternative functional components can perform operations as described and the functional components described can perform additional or alternative operations than those described herein.

The configuration component 117 can facilitate creation and configuration of a data object. The configuration component 117 can be activated in response to a request to transfer a gift card to a user (e.g., the receiving user 114(A)). In some examples, such a request can originate from another user (e.g., the sending user 114(B)). In at least one example, the configuration component 117 can provide one or more user interfaces and user interaction flows to a user device of the sending user 114(B), such as through a payment service app 110(A), through which the sender can specify details relating to the data object. For example, the sending user 114(B) can indicate a value of a stored balance to be associated with the data object, a currency to be associated with the stored balance (e.g., fiat currency, a particular fiat currency, stocks, cryptocurrency, etc.), one or more conditions of use of the stored balance, a wrapper or other graphical design to be associated with the data object, or the like. As an example, as illustrated in user interface 115(A), the sending user 114(B) can interact with the user interface 115(A) to request to make a payment or send a gift to the receiving user 114(A). In some examples, the sending user 114(B) can provide an input indicating that the sending user 114(B) would like to send a payment to another user as a "gift card." The sending user 114(B) can provide an identifier associated with the receiving user 114(A) and select a value to associate with the gift card via the user interface 115(A). As illustrated in the user interface 115(B), the sending user 114(B) can confirm the details (e.g., recipient, amount, etc.) of the gift card in user interface 115(B). In at least one example, the configuration component 117 can create a data object that is associated with the indicated value. That is, the configuration component 117 can create a data object and associate a stored balance, in the indicated value, with the data object. The data object can facilitate a transfer of the gift card from the sending user 114(B) to the receiving user 114(A) and tracking of the state associated therewith.

In some embodiments, the data object can be associated one or more conditions on use of the stored balance associated with the data object. Examples of such condition(s) include, but are not limited to, a transaction category, a geolocation, a time, an item inclusion list, an item exclusion list, particular merchant(s), particular merchant category(s), or the like. In at least one example, the condition(s) can be designated by the sending user 114(B). In such an example, the configuration component 117 can cause the presentation of one or more user interfaces to facilitate the sending user 114(B) designating conditions of use with the stored balance. As an example, the sending user 114(B) can specify a condition of use, that the stored balance can be used exclusively with a particular merchant. For practical purposes, such an example can be a digital gift card to a merchant. In some examples, a gift card can be associated with an event (e.g., band camp, graduation, a trip, etc.) in which case the condition(s) associated therewith can restrict spending to event-based purposes. Condition(s) can therefore be used to regulate spending of funds associated with stored balances of gift cards, as described below. The configuration component 117 can associate a condition of use with the data object. In some examples, the condition(s) can be designated by the payment service. For example, the sending user 114(B) can select a gift card from a particular merchant or for a particular occasion, in which case, a condition can already be associated with the stored balance (e.g., the particular merchant or the particular occasion).

Configuration of the data object can be performed by or at the direction of a sending user 114(B) as described herein. In some examples, the sending user 114(B) can be a user associated with a first type of an account and the receiving user 114(A) can be a user associated with a second type of an account. For example, the sending user 114(B) can be associated with a primary account that is associated with a first set of payment functionalities provided by the payment service and the receiving user 114(A) can be associated with a secondary account. The secondary account can be mapped to, or otherwise associated with, the primary account and can be associated with a second set of payment functionalities that can be more restrictive than the first set of payment functionalities. In some examples, the sending user 114(B) and the receiving user 114(A) can be associated with the same types of accounts and the same sets of payment functionalities.

Additionally or alternatively, configuration of the data object, or a portion thereof, can be performed by or at the direction of a merchant associated with the data object. For example, a merchant 118 can receive a notification that a user would like to send a data object wherein the merchant 118 is specified as a condition of use. The notification can be sent in real-time or can be provided as part of an onboarding flow for the merchant 118 through which they become affiliated with the payment service or enable data objects specifying the merchant 118 to be used. The merchant 118 can, in return, specify additional configuration information that can be associated with any data object associated with the merchant 118. As an example, the merchant 118 can specify a minimum amount for data objects specifying the merchant 118 as a condition of use. As another example, the merchant 118 can restrict data objects specifying the merchant 118 as a condition of use to certain geographical or franchise locations or to specific times of day or time of year. As another example, the merchant 118 can specify incentives to entice users to specify the merchant 118 as a condition of use. The merchant 118 can add an additional amount to the amount associated with the data object to discount the purchase of a data object specifying the merchant 118 as a condition of use or reward a sending user 114(B) for selecting the merchant 118.

Additionally or alternatively, the payment service can configure data objects using the configuration component 117. In some examples, the request that triggers creation of a data object can be received from the payment service system 106. In such examples, the payment service can indicate a value of a stored balance to be associated with a data object, a recipient, wrapping or other graphical design, one or more conditions associated therewith, or the like. In some examples, the payment service can configure a data object in response to a determination that the receiving user 114(A) satisfied a condition associated with an incentive. Such a condition can be tied to in-app activity, banking activity, responses to marketing or promotional campaigns, or the like.

In some examples, the payment service can set restrictions or enable incentives for data objects sent or received using the payment service. Restrictions can include, by way of non-limiting example, restrictions regarding users who can send data objects, users who can receive data objects, minimum or maximum values that can be associated with stored balances associated with data objects, values that can be associated with a particular sending user or receiving user over a period of time, condition(s) that can be associated with data objects, and the like. Incentives can include, by way of non-limiting example, partial or whole reimbursement, discounts associated with past or future transactions, rewards, loyalty points, and the like. Restrictions or incentives can be set on a global level, for example to be applied to all data objects sent or received using the payment service. Restrictions or incentives can be set on increasingly granular levels. For example, restrictions and incentives for data objects originating from a sending user 114(B) in a first geographical location can be different than restrictions and incentives for data objects originating from a sending user 114(B) in a second geographical location. As another example, restrictions and incentives for data objects sent during a first time of year can be different than restrictions and incentives sent during a second time of year. Restrictions and incentives can each be associated with particular conditions of user or can otherwise be interconnected to fully customize the experience of creating and sending data objects.

In particular embodiments, configuration component 117 can provide for configuration of the data object based on recommendations generated by the payment service system 106 and presented to an end user—whether a sender prior to sending the data object or a merchant. The payment service system 106 can train and manage one or more machine-learning models to make recommendations relating to the configuration of data objects.

As an example, one or more machine-learning models can be trained to output general recommendations, which may not be based on personal data associated with individual users. The machine-learning model(s) can be trained based on characteristics of created or exchanged data objects, such as a time of day, time of year, events, geolocation, value, condition(s) associated therewith, wrapper(s) or other graphical design(s), etc. Such characteristics can be used to train the machine-learning model(s) to output recommendations for characteristics to be associated with new requests for creating data objects. For example, the machine-learning model(s) can identify that the sending user 114(B) is sending a data object during a time of year in which many users send gifts to graduating students. Based on the determinations by the machine-learning model(s), the configuration component 117 can generate recommendations to present to the sending user 114(B) to assist with the user in sending a gift for a graduating student.

As an additional or alternative example, one or more machine-learning models can be trained to make personal recommendations, which can be based on data associated with individual users (e.g., the sending user 114(B) or the receiving user 114(A)). The machine-learning model(s) can be trained based on characteristics of created or exchanged data objects associated with the individual users, such as a time of day, time of year, events, geolocation, value, condition(s) associated therewith, wrapper(s) or other graphical design(s), etc. Such characteristics can be used to train the machine-learning model(s) to output recommendations for characteristics to be associated with new requests for creating data objects. As an example, the machine-learning model(s) may identify frequently used conditions of use that the sending user 114(B) specifies for one or more recipients, including, but not limited to, the receiving user 114(A) indicated for the data object. For example, the machine-learning model(s) can identify that the sending user 114(B) prefers to send data objects with conditions of use associated with a particular merchant. The machine-learning model(s) can identify that the receiving user 114(A) prefers to receive and use data objects associated with a particular geographical location. Based on the determinations by the machine-learning model(s), the configuration component 117 can generate recommendations to present to the sending user 114(B) to assist the sending user in sending a relevant gift for the receiving user 114(A), that is also consistent with the sending user's preferences. For example, the machine-learning model(s) can recommend a data object be associated with a condition on use associated with a particular geolocation of the particular merchant.

In at least one example, after a data object has been created, a record thereof can be stored in the datastore 128. As described herein, the state management component 121 can monitor transaction data in real-time or near-real-time and can update state(s) associated with the data object in real-time or near-real-time.

The transfer component 119 can facilitate the transfer of a data object from a sender to a recipient. In some examples, the sender and recipient can be peers. In some examples, the sender can be a merchant and the recipient can be a customer, for example, when the merchant provides a bonus, gift, reward, or the like to the customer. In some examples, the sender can be the payment service and the recipient can be a user of the payment service, for example, when the payment service provides a bonus, gift, reward, or other like to user(s) of the payment service. The transfer component 119 can send the data object to a user device of the recipient, for example, the user device 112(A).

In at least one example, if the recipient has a user account associated with the payment service, the transfer component 119 can cause the data object to be associated with the user account of the recipient upon transfer to the recipient. In some examples, such an association can be automatic (e.g., without first obtaining user input or confirmation of acceptance) or in response to a user input or confirmation of acceptance. In an example, the receiving user 114(A) may use the payment service app 110(A) executing on user device 112(A) to accept the data object as shown in user interfaces 113(A), 113(B). As an example, a notification may be presented on a user interface 113(A) of a user device 112(A) where the receiving user 114(A) can confirm they have received the data object. The receiving user 114(A) may receive a notification on the user device 112(A) in one or more forms, such as a push notification, an email notification, a text notification, or the like. The sending user 114(B) may be notified after the receiving user 114(A) accepts the data object. In at least one example, after accepting the data object, the user interface 113(A) can transition to user interface 113(B), which can visually represent the association of the data object with the user account of the receiving user 114(A). For example, as illustrated in the user interface 113(B), a gift card is depicted proximate a payment instrument associated with the user account. In some examples, the gift card can be linked to, or otherwise associated with, the payment instrument such that when the payment instrument is used, the gift card can be applied to relevant transaction(s) (e.g., transaction(s) that satisfy conditions associated therewith). In some examples, if a user does not have a payment instrument associated with their user account, they may be prompted to order, configure, or otherwise set up a payment instrument.

In some examples, the receiving user 114(A) can accept the data object within a user interface of the PS app 110(A). The user interface may present the data object in a wrapper or other graphical design. In some examples, the user interface may present the data object with an animation. In some examples, the wrapper or other graphical design, or animation, can correspond to one or more conditions of use associated with the data object. As an example, if the data object has a condition of use associated with a particular merchant, then the user interface may present a graphical design corresponding to the particular merchant. In some examples, the wrapper or other graphical design, or animation, can correspond to an event. In such an example, the user interface of the PS app 110(A) may present an animation corresponding to one or more events, such as holiday events, user celebrations, user birthdays, user graduations, and the like. As an example, the user interface of the payment service app may present an animation corresponding to a user birthday, such as including an animated "Happy Birthday!"

As described herein, in the event that the receiving user 114(A) does not have a user account associated with the payment service or has not activated or approved certain features, the payment service system 106 can prompt the receiving user 114(A) to create an account with the payment service. The transfer component 119 can initiate a process of creating an account for the receiving user 114(A) by initiating an onboarding flow for the receiving user 114(A). Through the onboarding flow, the receiving user 114(A) can establish the account, perform steps such as identity verification, activate or approve features offered by the payment service, and otherwise satisfy requirements set by the payment service for receiving the data object and using a stored balance associated therewith. The receiving user 114(A) can supply user information to set up the account. The user information can include, by way of example, name, birthdate, location, preferred unique identifier, email address, phone number, social security number or other identity establishing information, and the like. Additionally, through the onboarding flow, the payment service can establish eligibility for the user to establish the user account, such as verifying the supplied information, determining that the supplied information is sufficient to qualify the receiving user 114(A) for a user account, and the like.

As described herein, if the payment service is unable to verify the user information or if the transfer component 119 determines that the receiving user 114(A) is not qualified to establish a user account, the transfer component 119 can take remedial actions. Remedial actions can include repeating one or more steps of the onboarding flow, providing alternative steps to the onboarding flow (including alternative identify verification or mapping a secondary account to a primary account of another user), returning the data object to the sending user 114(B), refunding all or a portion of the amount associated with the data object, notifying the sending user 114(B) or receiving user 114(A) of the inability of the transfer component 119 to transfer the data object to the receiving user 114(A), and the like.

In some examples, once the data object has been accepted by the receiving user 114(A), the transfer component 119 can associate the stored balance associated with the data object with the user account of the receiving user 114(A). The transfer component 119 can cause the payment service system 106 to update a user interface of the payment service app 110(A) executing on the user device 112(A) to include the data object. The user interface of the payment service app 110(A) may provide a transaction history associated with the data object, conditions of use, an amount remaining of the stored balance associated with the data object, an expiration data associated with the data object, and other parameters of the data object as described herein. The data object may be linked to one or more balances (e.g., stored balance 132(A)) of a user account associated with the receiving user 114(A). The stored balance associated with the data object is then usable by the receiving user 114(B), for example to use against transactions according to embodiments disclosed herein. The transfer component 119 can facilitate a notification to the sending user 114(B) to alert the sending user 114(B) that the receiving user 114(A) has received or accepted the data object.

While the example illustrated in FIG. 1 relates to the sending user 114(B) requesting and sending a data object associated with a stored balance as a digital gift card to the receiving user 114(A). In such an example, the sending user 114(B) can designate one or more conditions on using the stored balance. As described above, in some examples, a data object can be created by the configuration component 117, at the request of the payment service, and transferred from the payment service system 106 to the receiving user 114(A). In some examples, a data object can be created by the configuration component 117, at the request of a merchant, and transferred from the payment service system 106 to the receiving user 114(A).

In additional or alternative examples, the payment service system 106 can manage and provide a user interface to user devices 112 to interact with a data object marketplace. The data object marketplace can include one or more data objects with preset conditions of use that a sending user 114(B) can select to purchase for or transfer to a receiving user 114(A). For example, a data object can be associated with a particular merchant and can therefore be associated with a condition on use corresponding to the particular merchant. As another example, a data object can be associated with a particular event or occasion and can therefore be associated with a condition on use corresponding to the particular event or occasion. In some examples, the payment service system 106 can collaborate with one or more merchants to provide incentives to users 114. As an example, the payment service system 106 can provide a discount to one or more data objects that have a particular condition of use (e.g., a condition of use that restricts transactions to a particular merchant) based at least in part on a merchant indicating they would like to provide such a discount. For instance, to incentivize users to purchase a data object associated with the merchant (e.g., has a condition of use restricting transactions to the merchant), the merchant can provide a discount (e.g., 2%, $2, etc.).

In additional or alternative examples, the sending user 114(B) can select a data object from a user interface, presented by the PS app 110(B), that includes a merchant profile. As an example, the sending user 114(B) can perform a look up for a particular merchant and view a merchant profile corresponding to the merchant. There may be one or more activatable elements located within the user interface displaying the merchant profile to facilitate the purchase of a data object associated with the merchant. In such an example, the data object can be associated with preset condition(s). For example, the data object can be associated with a condition on use corresponding to the merchant.

In additional or alternative examples, the sending user 114(B) can select a data object from a user interface that includes a website. As an example, the sending user 114(B) can access a website associated with at least one merchant. In some examples, the website can be the merchant's ecommerce website. In some examples, the website can be a merchant marketplace associated with multiple merchants. There may be one or more activatable elements located within the user interface which can facilitate the purchase of a data object associated with the merchant. In such an example, the data object can be associated with preset condition(s). For example, the data object can be associated with a condition on use corresponding to the merchant.

In some examples, the sending user 114(B) can provide a physical instrument, such as a gift card, to the receiving user 114(A). The receiving user 114(A) can associate the gift card with their account and dispose of the gift card. Or, the physical instrument may be a token that represents the gift but is associated with the receiving user's 114(A) account without further input from the receiving user 114(A).

In at least one example, the transfer component 119 can facilitate the transfer of a data object from the sender to the recipient. In the example provided in FIG. 1, the transfer component 119 can withdraw funds, in an amount equal to the value of the data object, from the stored balance 132(B) of the sending user 114(B) and deposit the funds into the stored balance 132(A) of the receiving user 114(A). In some examples, the transfer component 119 can cause the funds to be temporarily deposited into a holding account of the payment service until the receiving user 114(A) accepts the data object. When the data object is associated with the user account of the receiving user 114(A), the stored balance associated with the data object can be associated with the user account of the receiving user 114(A). In at least one example, the stored balance associated with the data object can be distinct from other stored balances associated with the user account of the receiving user 114(A). As described above, however, in some examples, funds can be transferred from other stored balances associated with the user account to the distinct stored balance associated with the data object or funds associated with the stored balance associated with the data object can be transferred to other stored balances associated with the user account. In some examples, such transfers can be based at least in part on determinations that the balance of the stored balance falls below or otherwise satisfies a threshold.

In at least one example, stored balances associated with the user account of the receiving user 114(A) may be used to interact with other users, entities, or the payment service, for example via one or more of P2P payments, point-of-sale (POS) transactions, asset purchases, and the like, which can be facilitated by the payment service component 123. In at least one example, the user account can be associated with a payment instrument or identifier that can be used in lieu of payment data to enable the receiving user 114(A) to use stored balances associated with the user account via such interactions. In at least one example, when the payment instrument or identifier is used in association with an interaction, the payment services component 123 can receive an indication of such and can use the indication to access funds associated with such stored balances and process payments or otherwise facilitate such interactions. That is, the payment service system 106 may monitor interaction data, including transaction data, associated with the receiving user 114(A), and other users of the payment service, in real-time or near-real-time. In some examples, the payment services component 123 can provide interaction data, including transaction data, to the state management component 121 for managing state(s) associated with data object(s) as described herein.

The payment service system 106, through the interactions of the techniques and components described herein, provides multiple layers of security and identity verification to reduce the risk of theft, fraud, or misuse experienced by conventional gift cards. As an example, in conventional gift card technologies, to use a gift card, the user provides only the identifier at a point of sale. In some contexts, the identifier is also provided with a security value printed on a physical payment instrument. However, once the user has access to the identifier for the gift card, any user can redeem the gift card. As such, in conventional technologies, a gift card can easily be stolen or fraudulently used because a bad actor only needs the identifier to use the gift card. In contrast, a data object provided to a receiving user 114(A) from a sending user 114(B) using the techniques described herein, is associated directly with the user account of the receiving user 114(A). Transactions are associated with the data object by the payment service system 106 and associated with a data object automatically. Therefore, the same types of account security procedures associated with user accounts can be used to secure data objects such as digital gift cards with minimal additional burden for users or the payment service system 106 itself. As an example, multiple layers of authentication can be used to permit a receiving user 114(A) to log into a user account or to authorizing spending. If the receiving user 114(A) has a physical or digital payment instrument associated with their user account, the spending activity associated with the physical or digital payment instrument can be traced. This can enable stolen payment instruments to be remotely disabled and misused amounts associated with data objects to be recovered by the receiving user 114(A). The gift card can be linked to, or otherwise associated with, the payment instrument such that when the payment instrument is used, the gift card can be applied to relevant transactions and similarly traced.

In at least one example, a POS system 120 can be associated with a merchant 118 and include one or more of a reader 122 and a merchant device 124. The merchant 118 can interact with a merchant device 124, which can be associated with the reader device 122. The merchant device 124 can have a point-of-sale application 126 (represented as POS application 126) executing thereon to enable the merchant device 124 to exchange data with the server(s) 104.

The payment services component 123 can receive transaction data based on merchant activity or user activity. In some examples, transaction data for a given transaction can be received from a merchant 118 associated with the payment service, as the merchant 118 attempts to process the given transaction. Transaction data can result from transactions with the merchant 118 initiated via a POS application 126 associated with the payment service system 106 and facilitated by the payment service component 123. In some examples, transaction data can be based on transaction data associated with a P2P payment with another user 114(C) using an instance of a PS app 110(C) executing on a user device 112(C) associated therewith. In some examples, the transaction data can be received from third-party server(s) 130 of third-party system(s). The payment service system 106 can receive transaction data associated with a transaction, which can include an identifier, which the payment services component 123 can use to identify the corresponding user account associated with the identifier. Based at least in part on determining that the stored balance associated with the data object is to be used, the payment services component 123 can withdraw funds associated with the stored balance of the data object and can generate a ledger event for the stored balance associated with a data object indicating the withdrawal of funds. In at least one example, the state management component 121 can update the state associated with the data object and the stored balance.

In some examples, for individual transactions, the payment service component 123 can access the datastore 128 to determine whether conditions of use associated with individual stored balance(s) associated with data object(s) that are associated with a user account are satisfied to determine whether such stored balance(s) can be used for such transactions. For example, the payment service component 123 can analyze conditions of use associated with one or more stored balances associated with the user account of the receiving user 114(A). That is, the payment service component 123 may compare transaction details of a transaction, as determined from received transaction data, to the conditions of use and enable use of one or more stored balances for a transaction when a particular condition of use, associated with a particular stored balance, is satisfied. As an example, such conditions of use can include a transaction category, a geolocation, a time, an item inclusion list, an item exclusion list, particular merchant(s), particular merchant category(s), or the like.

If conditions of use are satisfied, then the payment services component 123 may process a transaction using the stored balance prior to using any other stored balance associated with the user account of the receiving user 114(A). In some examples, if multiple stored balances associated with conditions of use are applicable to the transaction (i.e., conditions associated therewith are satisfied), the receiving user 114(A) can select a particular stored balance and associated data object to use for the transaction, can select multiple stored balances and associated data objects to use for the transaction, or the like. In some examples, the payment service component 123 can utilize context data to determine which stored balance and associated data object to use if multiple stored balances are applicable to a transaction. In some examples, such context data can be analyzed by a machine-learning model, which can output a recommendation of a particular stored balance, a ranking of the one or more stored balances, or the like. In some examples, a recommended stored balance or a highestranking stored balance can be determined to be most relevant to the transaction based on the context data.

In some examples, a user account can be associated with one or more incentives, such as rewards, discounts, gifts, loyalty points, or the like. In some examples, such incentives can be associated with the user account and automatically applied based on satisfaction of one or more conditions. In some examples, the payment services component 123 can determine whether an incentive is applicable to a transaction and apply the incentive to the transaction if there is an applicable incentive. That is, if the payment services component 123 determines, using the transaction data, that one or more conditions associated with an incentive are satisfied, the payment services component 123 can apply the incentive to the transaction. In some examples, the incentive can be applied prior to the stored balance of the data object. In some examples, the incentive can be applied after the stored balance of the data object.

In some cases, the transaction data can indicate the data object is to be used with a merchant that is not associated with the payment service. The transaction data can still indicate that the transaction satisfies conditions for use of the stored balance associated with the data object. In such cases, the payment service can use the transaction as an opportunity to request the merchant to become associated with the payment service, for example, by creating a merchant account. The transaction data can include identifying information for the merchant. Upon receiving the transaction data indicating transaction activity, the payment services component 123 can contact the merchant and inform the merchant that a user is eligible to use a data object for a transaction. The payment services component 123 can initiate an onboarding flow for the merchant, through which the merchant can become affiliated with the payment service (e.g., by creating a user account). Upon completion of the onboarding flow, which can include collecting identifying information for the merchant, identity verification, creating an account with the payment service, etc., the transaction can be authorized and funds from the stored balance associated with the data object can be transferred to the merchant.

Transactions associated with a stored balance associated with the data object may be tracked and provided to a receiving user 114(A) through the payment service app 110(A) executing on the user device 112(A), for example via an activity user interface. In some embodiments, a sending user 114(B) may review the transaction history associated with a data object sent by the sending user 114(B) to the receiving user 114(A). The transaction history can be accessed by the payment service system 106 (e.g., through the state management component 121) retrieving the ledger entries associated with the stored balance of the data object. Payment services component 123 or payment service app 110(A) can convert the ledger entries to a format usable by the payment service app 110(A) before the ledger entries are displayed to the receiving user 114(A). The payment service system 106 or payment service app 110(A) can further summarize the ledger entries.

In at least one example, the payment services component 123 can provide monitoring capabilities (e.g., per-transaction notifications, summary reporting, for all transactions or for dedicated-purpose or restricted funds) to a receiving user 114(A). A receiving user 114(A) can authorize each payment, transfer, purchase, sale, etc. involving another user account. In some examples, the receiving user 114(A) or a related user can authorize some payments, transfers, purchases, sales, etc., based on restrictions and/or rules as described above. In some examples, the user can set controls or other rules that indicate when authentication of another user and/or approval by the user is a condition for performing particular interactions. In some examples, individual of the accounts can be associated with a dedicated purpose or conditional spending, such as to restrict funds associated with such accounts for particular purchases or types of purchases (e.g., access to funds in a particular account is restricted to purchases for books or tuition).

In particular embodiments, the configuration component 117 of the payment service system 106, may support creation and management of dedicated-purpose funds. A user (e.g., a receiving user 114(A) or another user acting on their behalf) may create a dedicated-purpose fund for which the creator or a contributor of the fund may place restrictions on how money contributed to the fund is spent. The restrictions may include: a designation of one or more categories of products or services on which the money may or may not be spent, a designation of one or more users in an account group who are or are not authorized to spend the money, date(s) or time(s) or days of the week or month before, during, or after which the money may or may not be spent, specific merchants or categories of merchants at which the money may or may not be spent, caps on how much money may be spent (e.g., on an hourly, daily, weekly, monthly, yearly basis), specific other users to whom peer-to-peer payments may or may not be made, or specific other users who may or may not contribute to the fund.

In particular embodiments, the creator of the fund, or possibly one or more other users associated with the fund, may be able to name the fund, send out invitations to contribute to the fund, create a special group of users who may participate in the fund, add or remove restrictions on the fund, view contributions to the fund, send out thank you notes to contributing users, and view reports on expenditures made using money from the fund.

In particular embodiments, the configuration component 117 or payment services component 123 may enable merchants 118 to provide special incentives, discounts, or promotions in connection with a dedicated-purpose fund, based on, for example: designated spending categories included in the fund; profile information, group affiliation (e.g., for students at a particular school), location, transaction history information for one or more users associated with the fund; or a name, description, or affiliation of the fund with an organization or institution.

In some examples, a user account can receive a notification, e.g., in the form of a deposit in the account's balance, a credit offering, an extended reality object, an e-gift card (e.g., resembling an envelope), a physical gift card, a data object as described herein, a separate stored balance, which may be tied to financial offering (such as stocks, cryptocurrency, fiat currency, credit, debit, etc.). The financial offering or stored balance may be contextual such that when a specific condition is satisfied (e.g., goals/chores are completed, timing, location etc.), the financial offering or stored balance is tied to a user account. In one example, the notification can take the form of alert functions that may appear on a receiving user's 114(A) link page to indicate that the receiving user 114(A) has failed to complete chores or their dedicated-purpose fund is in jeopardy or is being withheld, for example.

In some examples, the payment services component 123 can monitor transactions or other interactions of users associated with the fund to ensure that such transactions or other interactions are compliant with the restrictions associated with the fund. In some examples, the payment services component 123 can identify a particular transaction that satisfies a condition of use placed on the fund and can prompt a receiving user 114(A) associated with the fund to generate or send a notification to a contributor to the fund a notification about the purchase. As an example, such a notification can be a "thank you note." In some examples, a receiving user 114(A) can capture or associate an image or other content associated with an item purchased using at least a portion of the fund, provide text or other data to be associated with the notification, or the like to customize or personalize the notification based on the transaction or the recipient.

The payment services component 123 can facilitate additional operations and functionalities provided by the payment service, which are described below with reference to FIGS. 15-19.

Referring to FIGS. 2A-2K, example graphical user interfaces 202a-202k for P2P gift card transfer and state management are shown. In particular embodiments, the example graphical user interfaces 202a-202k may be displayed within the PS app 110(B) executing on the user device 112(B) or any user interface of the user device 112(B).

As described above, gift cards can be associated with data objects that are associated with distinct stored values. The data object creation, transfer, and state management process can be initiated from a variety of entry points provided by payment service. For example, a user can opt to send a gift card to another user via a user interface configured for initiating a payment or other transaction (e.g., FIG. 2A, as shown below). In such an example, an input indicating that a user desires to send another user a gift card can trigger configuration and transfer of a data object associated therewith. In some examples, the creation, transfer, and statement management process can be initiated from a profile of a user. A profile of a user, such as a merchant profile, can comprise a user interface presented by an instance of the PS app 110(B) that is particular to a merchant. The merchant profile can have merchant data and information relating to interactions between the sending user 114(B) and the merchant. In some examples, the merchant profile can include a mechanism to purchase a gift card, which can trigger configuration and transfer of a data object associated therewith. In some examples, the creation, transfer, and state management process can be initiated from a gift card marketplace. A gift card marketplace can comprise a user interface that is configured to present a plurality of gift cards from which a user can select a gift card. A gift card marketplace can have gift cards associated with different merchants, events, conditions, or the like. Selection of a gift card from the gift card marketplace can trigger configuration and transfer of a data object associated therewith. In some examples, the creation, transfer, and state management process can be initiated from a merchant website or via a user interface presented at a brick-and-mortar location of a merchant (e.g., via a merchant device). In some examples, the merchant website or other user interface can include a mechanism to purchase a gift card, which can trigger configuration and transfer of a data object associated therewith. In some examples, the creation, transfer, and state management process can be initiated from a gift card marketplace. In some examples, the creation, transfer, and state management process can be initiated via a physical gift card that can be purchased at a brick-and-mortar location of a merchant and associated with a user account for transfer or use. In some examples, associating the physical gift card with a user account can trigger configuration and, if appropriate transfer of, a data object associated therewith.

FIG. 2A illustrates a user interface 202a that can include an entry field 203, an entry field 204, options 206 including one or more options 208a-208d, an amount 210, a number pad 212, and an activatable element 214. The entry field 203 can be used to specify who is sending a P2P transaction. The entry field 203 may default to include an identifier of the sending user 114(B). However, in some examples, two or more users can collaborate and fund a transaction together. The entry field 204 may be a note field to specify a note corresponding to the transaction. The options 206 can enable a user to select a currency or type of P2P transaction. The options 206 can include cash 208a, stock 208b, Bitcoin 208c or another cryptocurrency, and a gift card 208d. Although this disclosure represents elements as a gift card 208d, this disclosure contemplates the gift card can generally be any data object as described herein. A sending user 114(B) may interact with the user interface 202a to select to send a gift card 208d. The sending user 114(B) may specify an amount 210 using the number pad 212 and select the activatable element 214.

In some examples, as a result of the sending user 114(B) selecting activatable element 214, the user interface 202a can transition to user interface 202b. The user interface 202b as shown in FIG. 2B can be accessed to initiate a process to send a gift card to a receiving user 114(A). The user interface 202b can include an entry field 203, an entry field 216, options 206 including one or more options 208a-208d, an entry field 216, an activatable element 215, and a list of suggested users 218 including one or more users 220. The entry field 216 can be used to specify the recipient of a P2P transaction. The sending user 114(B) can provide an email, phone number, unique identifier, or the like to identify the recipient. In some examples, the sending user 114(B) can select a contact from a contact list associated with the user account of the sending user 114(B). In FIG. 2B, the sending user 114(B) can select a particular stock or gift card, for example, using drop downs associated with the options 206. In some examples, the payment service system 106 can surface one or more contacts from which one or more recipients can be selected. As an example, and as described herein, one or more machine-learning models can be used to predict or suggest the one or more contacts. The activatable element 215 can be selected to facilitate a transaction (e.g., send money to a receiving user 114(A)).

In some examples, as a result of the sending user 114(B) selecting a gift card 208d from the options 206, the user interface 202b can transition to user interface 202c as shown in FIG. 2C. The user interface 202c can include an activatable element 222 for receiving a search query and initiating a search, a list of suggested merchants 224a, list of filtered lists 228 including filtered list(s) 230a-230c of merchants 224b. The list of suggested merchants 224a can include one or more merchants 226a, 226b. The filtered list of merchants 224b can include one or more merchants 226c, 226d. Using user interface 202c, the sending user 114(B) can select a merchant to associate with the gift card 208d. That is, the configuration component 117 can generate a data object in response to the selection of the gift card 208d. The data object can be associated with the value indicated via the number pad 212 (e.g., $100). The value can be associated with a stored balance which is associated with the data object. In at least one example, by selecting a merchant to associate with the gift card 208d, the sending user 114(B) can designate the merchant as a condition of the use of the stored balance associated with the data object. The list of merchants can be filtered or ordered based on recommendations for the sending user 114(B) generated by the configuration component 117 of the payment service system 106 using a machine-learning model or rules-based model as described herein. One or more merchants 226 in the list of merchants 224a may include an indicator that there is an incentive (e.g., a discount) associated with a gift card purchased and associated with the respective merchant. The merchant or payment service system 106 can provide the incentive. The indicator may indicate a percentage discount or value discount that a sending user 114(B) would receive when purchasing a gift card 208d associated with the particular merchant.

FIG. 2D illustrates a user interface 202d that can include an activatable element 225, an activatable element 227, and a transaction history 229 including one or more transactions 231, such as transaction 231a. The user interface 202d can represent a profile page of a merchant profile providing detailed information about the merchant or the interactions of a user with the merchant. The user (e.g., sending user 114(B) can select activatable element 225 to purchase a gift card corresponding to the merchant profile. The user can select activatable element 227 to perform a transaction corresponding to the merchant. For example, if a user performs a transaction with the merchant, the user can pay for the transaction using the activatable element 227. The transaction history 229 can include one or more transactions 231, such as transaction 231a that the user has performed with the merchant.

In response to the sending user 114(B) selecting a merchant 226a (through either user interface 202c or user interface 202d by selecting activatable element 225), the PS app 110(B) can transition to user interface 202e as shown in FIG. 2E. The user interface 202e can include an entry field 216 that that includes a user 220a identified as a recipient of the gift card 208d associated with merchant 226a. The user interface 202e can include an entry field 206, a list of suggested users 218 including one or more users 220 (e.g., to add additional receiving users), a digital keyboard 234, and an activatable element 235. As shown in user interface 202e, once the sending user 114(B) selects a merchant 226a, the activatable element associated with the gift card 208d can change to indicate that the gift card is associated with the selected merchant 226a. The sending user 114(B) can select the user 220a to be the recipient. In response, the payment service app can populate the entry field 216.

In response to the sending user 114(B) selecting the activatable element 235, the user interface 202e can transition to user interface 202f as shown in FIG. 2F. The user interface 202f can include confirmation details 236 including details of the transaction of purchasing a gift card 208d and an activatable element 238. The details of the transaction can include a final confirmation of the amount, source of payment for the transaction, any applicable discounts, and a total balance, among other information.

In response to the sending user 114(B) selecting the activatable element 238, the user interface 202f can transition to user interface 202g as shown in FIG. 2G. In some examples, the user interface 202f can be referred to as an "activity user interface" or "activity feed" representing activity associated with the user account of the sending user 114(B). The user interface 202g can include a transaction history 240 including one or more transactions 242. The one or more transactions can include a transaction 242a corresponding to the purchase of the gift card 208d for user 220a. The transaction history 240 can also indicate other previous transactions or interactions with the payment service app. These other previous transactions can include other P2P transactions (including sending or receiving funds), trans-actions with merchants (e.g., initiated via a POS or digitally), asset-related transactions, and the like. The transaction history 240 can also show a listing of users of the payment service app that the sending user 114(B) has recently interacted with.

In response to the sending user 114(B) selecting transaction 242a, the user interface 202g can transition to user interface 202h as shown in FIG. 2H. The user interface 202h can include transaction details 244, a transaction history 243 including one or more transactions 245, such as transaction 245a, and an activatable element 246. The transaction details 244 include information such as the amount paid by the sending user 114(B) for the gift card, the date and time that the sending user 114(B) sent the gift card, and a note included with the gift card if applicable. In the example illustrated in user interface 202h, the transaction history 243 corresponds to one or more transactions 245, such as transaction 245a, the recipient has performed using a stored balance associated with gift card 208d. The payment services component 123 of the payment service system 106 can monitor transaction data to identify an identifier associated with the stored balance associated with the gift card 208d. The payment service system 106 can aggregate transaction data corresponding to the identifier associated with the stored balance and store the transaction data in the datastore 128 (e.g., as transaction history). The payment service system 106 can access the transaction data in the datastore 128 to present the transaction history 243. In certain embodiments, the transactions 245, such as transaction 245a, performed by the recipient using the stored balance associated with the gift card may be shown to the sending user 114(B) if the recipient grants the sending user 114(B) permission to view the transaction history. In certain embodiments, and based in part on the relationship between the sending user 114(B) and the recipient, the sending user 114(B) can be permitted to view the transaction history by default. In certain embodiments, the user interface 202h may not show the sending user 114(B) the transaction history of the receiving user.

In an additional or alternative example, in response to the sending user 114(B) selecting transaction 242a, the user interface 202g can transition to user interface 202k as shown in FIG. 2K. FIG. 2K is an example user profile associated with the sending user 114(B). The user interface 202k can include an activatable element 264, an activatable element 266, and a transaction history 268 including one or more transactions 270, such as transaction 270a. The transaction history 268 can represent one or more transactions between the sending user 114(B) and the user 220a.

In response to the sending user 114(B) selecting activatable element 246, the user interface 202h can transition to user interface 202i as shown in FIG. 2I. The user interface 202i can include a disable feature 248 with an activatable element 250, a list of conditions of use 252 with an activatable element 254, and an activatable element 256. A user can select the activatable element 250 to disable the gift card 208d. By disabling the gift card 208d, the sending user 114(B) can temporarily or permanently prevent the receiving user from conducting transactions using the stored balance associated with the gift card 208d. In some examples, the receiving user 114(A) can enable or disable the gift card 208d via a similar user interface.

In response to the sending user 114(B) selecting activatable element 254, the user interface 202i can transition to user interface 202j as shown in FIG. 2J. Using the user interface 202j, the sending user 114(B) can set or modify the conditions of use associated with the gift card 208d. The user interface 202*j* can include a plurality of conditions of use 258*a*-258*e*, a corresponding entry field 260*a*-260*e*, and an activatable element 262. The sending user 114(B) may specify conditions of use associated with the stored balance associated with the gift card 208*d*. In some embodiments, one or more of the conditions of the use 258*a*-258*e* can be fixed such that modification is restricted, such as if a discount as applied to the purchase of the gift card based on the associated with a particular merchant.

In some embodiments, the user interface 202*j* may be presented in response to the user selecting the gift card 208*d* sending option 206 within user interface 202*b*. The selection of one or more entry fields 260*a*-260*e* may bring up user interface elements, such as a map, calendar, clock, list of merchant categories, list of merchants, a digital keyboard, a digital number pad, and the like, facilitate the specification of particular conditions of use. As an example, for a selection of the location entry field 260*a*, a map user interface may be presented for the user to select an area to restrict transactions using the gift card 208*d*. Alternatively, a digital keyboard may be presented, and the sending user 114(B) may type a location. In response to the sending user selecting activatable element 262, the configuration component 117 of the payment service system 106 can modify the conditions of use associated with the stored balance associated with the gift card.

Referring to FIGS. 3A-3I, example graphical user interfaces 302*a*-302*i* for P2P gift card transfer and state management are shown. In particular embodiments, the example graphical user interfaces 302*a*-302*i* may be displayed within the PS app 110(A) executing on the user device 112(A) or any user interface of the user device 112(A).

Figures 3A, 3B, 3C:
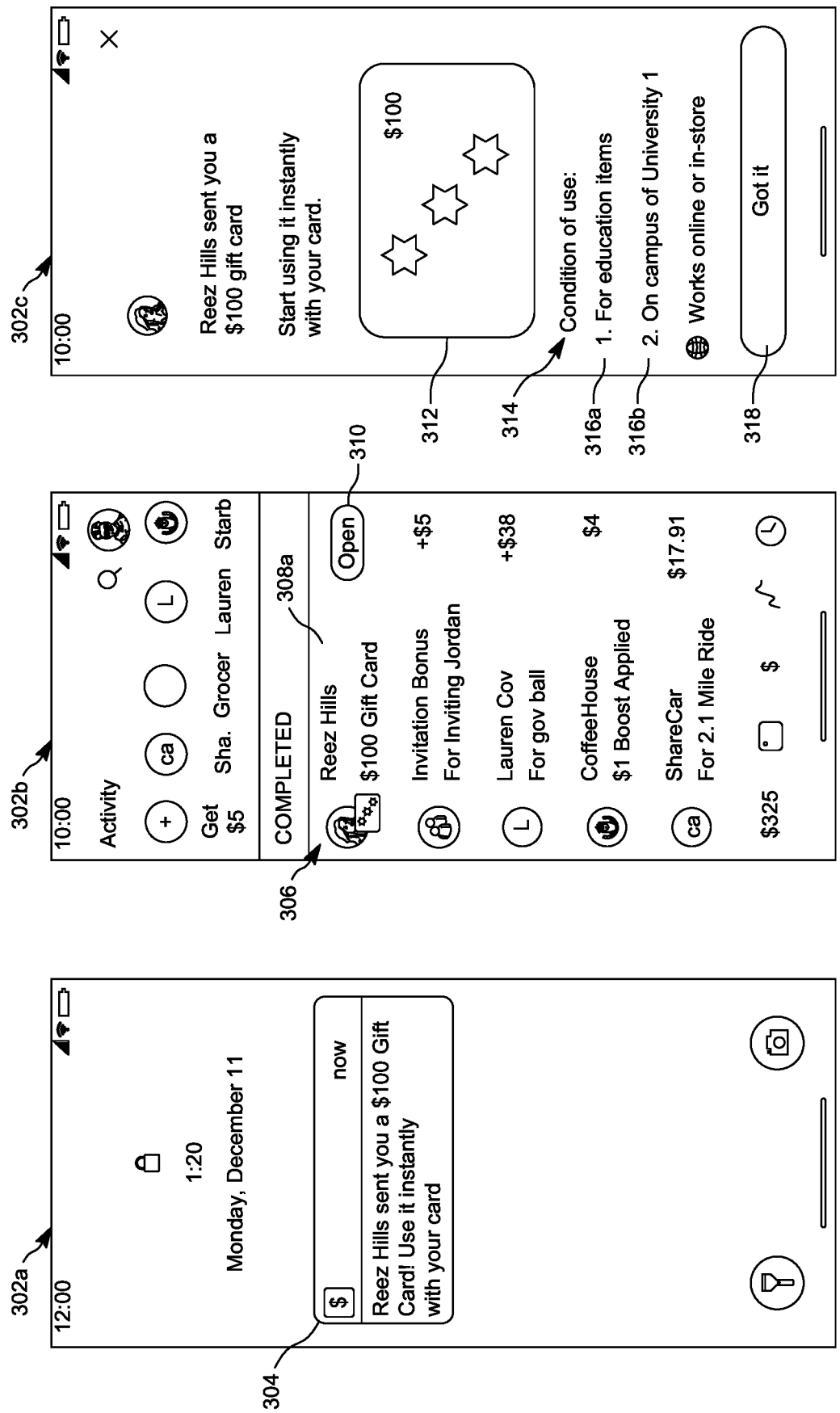

FIG. 3A illustrates a user interface 302*a* including a notification 304. In this example, the notification 304 is a push notification shown on a homescreen or lockscreen of a user device. While this disclosure presents a certain user interface 302*a* with a notification 304 in a particular manner, this disclosure contemplates other user interfaces with a notification. As an example, the notification 304 can be an email, a text message, and the like. The notification 304 can be a notification from a payment service app notifying a receiving user 114(A) that they have received a gift card, for example from the sending user 114(B).

In response to the receiving user 114(A) selecting the notification 304, the user interface 302*a* can transition to user interface 302*b* as shown in FIG. 3B. User interface 302*b* can additionally or alternatively be shown when the receiving user 114(A) opens the payment service app or navigates to a transaction history portion of the PS app 110(A). The user interface 302*b* can include a transaction history 306 including one or more recent transactions 308, an activatable element 310, and indications of one or more users of the payment service system 106 that the receiving user 114(A) has recently interacted with. The transaction history 306 can include recent P2P transactions (including sending or receiving funds), transactions with merchants (e.g., initiated via a POS or digitally), asset-related transactions, and the like. The transaction history 306 can include a recent transaction corresponding to a receipt 308*a* of a gift card.

In response to the receiving user 114(A) selecting the activatable element 310, or in response to the receiving user 114(A) selecting the notification 304 in certain embodiments, the user interface 302*b* can transition to user interface 302*c* as shown in FIG. 3C. The user interface 302*c* can include information relating to a gift card 312 that the receiving user 114(A) has received. In some examples, the user interface 302*c* further includes a list 314 of one or more conditions of use associated with the stored balance associated with the gift card 312, including one or more conditions of use 316, and an activatable element 318. The one or more conditions of use 316 can be specified by the sending user 114(B), the payment service, a merchant, or the like. In the example illustrated in FIG. 3C, the sending user 114(B) has elected to send an "education" gift card, which has been associated with a condition of use 316*a* restricting the type of goods that can be purchased using the stored balance associated with the gift card 312 and a condition of use 316*b* restricting the geographical location at which the stored balance associated with the gift card 312 can be used. As described above, a data object associated with the gift card 312 can be associated with a stored balance having a value as determined by the sending user 114(B) and one or more conditions associated therewith. In certain embodiments, the configuration component 117 of the payment service system 106 may automatically determine appropriate conditions of use based on the receiving user 114(A).

In response to the receiving user 114(A) selecting activatable element 318, the user interface 302*c* can transition to user interface 302*d* as shown in FIG. 3D. The user interface 302*d* can include a payment instrument 320 associated with the user account of the receiving user 114(A), an activatable element 322 associated with an incentive, a list 324 of one or more gift cards 326 associated with the user account of the receiving user 114(A), and an activatable element 328. The gift cards 326 can be linked to, or otherwise associated with, the payment instrument 320 such that when the payment instrument 320 is used, one of the gift cards 326 can be applied to relevant transactions. The activatable element 322 can be used to select or exchange incentive (e.g., a promotion, a discount, a reward, or a gift, etc.) associated with use of the payment instrument 320. In some examples, the list 324 of one or more gift cards 326 can include each gift card associated with the user account, a subset of gift cards associated with the user account, groups of gift cards associated with the user account (e.g., which can be grouped based on same or similar conditions), or the like. In some examples, if the receiving user 114(A) has multiple gift cards associated with a same or similar condition(s) of use (e.g., same merchant, same event, etc.), the gift cards can be combined such that the stored balances associated with each of the multiple gift cards are combined in a single, distinct stored balance associated with the same or similar condition(s) of use. In some examples, the user interface 302*d* can include additional or alternative information associated with a user account of the receiving user 114(A), such as stored balances, owned assets, transaction history or the like.

In some examples, a payment service app 110(A) executing on a user device 112(A) of a user 114(A) who has received one or more gift cards can present a user interface that includes a transaction history for the one or more gift cards. A recipient 114(A) can view the one or more gift cards they have received to determine the various types of conditions associated with spending the one or more stored balances, view the one or more stored balances associated with their user account, or review which users have sent them the one or more gift cards. Gift cards can be grouped by a person or by a condition. The receiving user 114(A) may select a gift card to view a transaction history corresponding to that particular gift card. The transaction history may identify users who have sent one or more gift cards with similar conditions of use or one or more transactions performed using the stored balance associated with the selected gift card. As an example, if the selected gift card includes a condition of use that specifies a geographic location of use, the transaction history can identify users who have sent the recipient a gift card with the same condition of use.

The state management component 121 of the payment service system 106 can identify similar gift cards and aggregate the stored balances associated with the similar gift cards together. As an example, the state management component 121 may identify that two gift cards share a condition of use (e.g., a particular merchant) and aggregate them together, such that a recipient 114(A) can view the transaction history of both gift cards and view the combined stored balance associated with both gift cards. If a recipient 114(A) receives another gift card with the same condition of use, as a previously removed gift card, the payment service app 110(A) can read the transaction history associated with the removed gift card to the user interface of the payment service app 110(A). The state management component 121 may maintain the previous transaction history or delete the transaction history after a stored balance associated with a gift card has been depleted.

In response to the receiving user 114(A) selecting the gift card 326a, the user interface 302d can transition to user interface 302e as shown in FIG. 3E. The user interface 302e can be, for example, an overlay of the user interface 302d. The user interface 302e can include an activatable element 330, gift card details 332, and a transaction history 334 including one or more transactions 336, such as transaction 336a. The activatable element 330 can be used to enable automatic use of the stored balance associated with the gift card for qualifying transactions, such as spending the stored balance of the gift card whenever a transaction satisfies the condition(s) of use of the gift card. The gift card details 332 can include a summary of the conditions of use of the stored balance associated with the gift card 312. The transaction history 334 can be a transaction history corresponding to transactions conducted, at least in part, using the stored balance associated with the gift card.

In response to the receiving user 114(A) selecting activatable element 328 in user interface 302d, the user interface 302d can transition to user interface 302f as shown in FIG. 3F. The user interface 302d can be a "activity user interface" or an "activity feed." The user interface 302f can include a transaction history 338 including one or more transactions 340 and activatable elements 342a, 342b that correspond to transactions 340a, 340b, respectively. The activatable elements 342a, 342b can be selected to acknowledge receipt of a gift card or to thank a sending user 114(B) for the gift card.

In response to the receiving user 114(A) selecting transaction 340b, user interface 302f can transition to user interface 302g as shown in FIG. 3G. The user interface 302g can include transaction details 344 and an activatable element 346.

Additionally or alternatively, as shown in FIG. 3H, in response to the receiving user 114(A) selecting transaction 340b, user interface 302f can transition to user interface 302h, which may be an overlay of the payment service app. The user interface 302h can include an overlay 348, activatable elements 350a-350c, and activatable element 352. Activatable element 350a can be selected to request that the stored balance associated with the gift card 312 be converted to an unencumbered balance (e.g., a stored balance with no conditions of use) or transferred to another stored balance as described herein. In such an example, the configuration component 117 of the payment service system 106 can remove the condition(s) associated with the stored balance of the gift card 312 or add the stored balance associated with a gift card 312 to another stored balance associated with the user account of a receiving user 114(A). In some examples, the receiving user 114(A) can opt to convert the stored balance associated with the gift card 312 to cryptocurrency, stocks, or another asset type and associate the resulting value with the corresponding stored balance. Activatable element 350b can be used to generate or review a web-based receipt associated with the gift card 312. Activatable element 350c can be used to contact support associated with the payment service system 106. The activatable element 350c can also be used to access a self-help flow that can retroactively apply a stored balance associated with the gift card 312 to a previous transaction.

Additionally or alternatively, in response to the receiving user 114(A) selecting transaction 340a in user interface 302f, the payment service app can transition to user interface 302i as shown in FIG. 3I. In user interface 302i, the receiving user 114(A) can view the user profile of a selected user, such as the sending user 114(B). The user interface 302i can include an activatable element 354, an activatable element 356, an activatable element 358, and a transaction history 360 including one or more transactions 362 between the receiving user 114(A) and the sending user 114(B). The activatable element 354 can be selected to request funds from the user associated with the user profile. The activatable element 356 can be selected to pay the user associated with the user profile. The activatable element 358 can be selected to thank the user associated with the user profile. In some examples, interaction with the activatable element 358 can cause a camera to open to capture an image, video, or the like of an item purchased using the gift card 312, a receipt associated with a transaction, or the like. In some examples, interaction with the activatable element 358 can cause a text box to open to enable the user to draft a thank you note. The transaction history 360 can include one or more transactions 362 between the receiving user 114(A) and the user associated with the user profile including, for example, receipt of a gift card 362a or sending funds 362b.

Figure 4C:
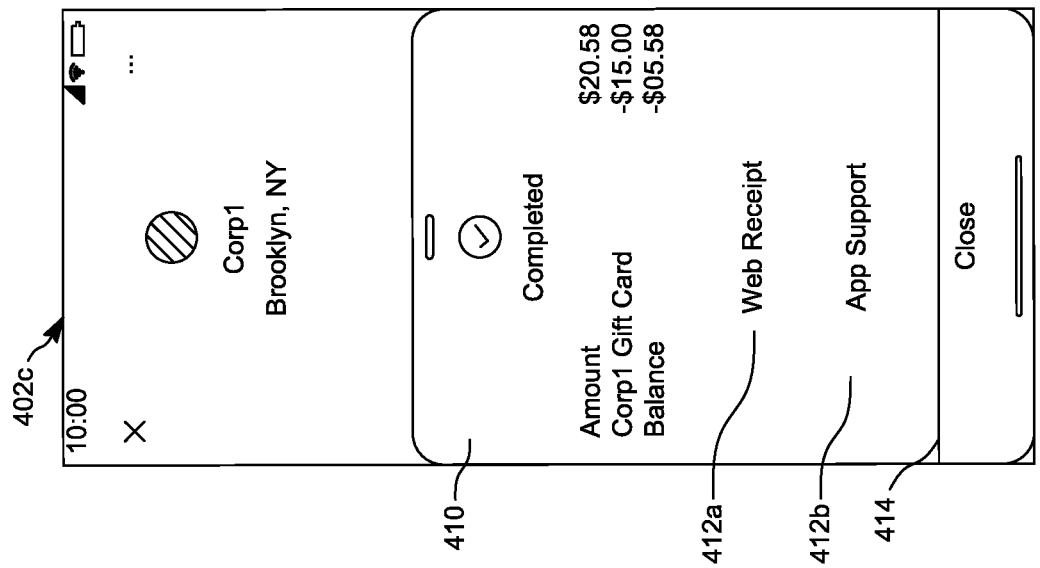
FIGS. 4A-4C are example GUIs for performing a transaction using a data object as displayed on a user device according to some embodiments disclosed herein.
Figure 4B:
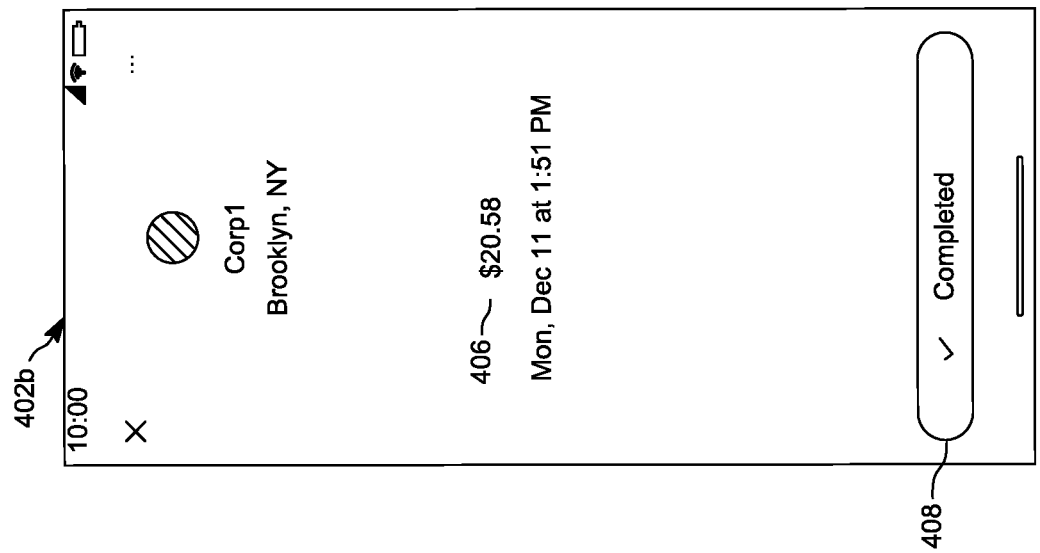
Figure 4A:
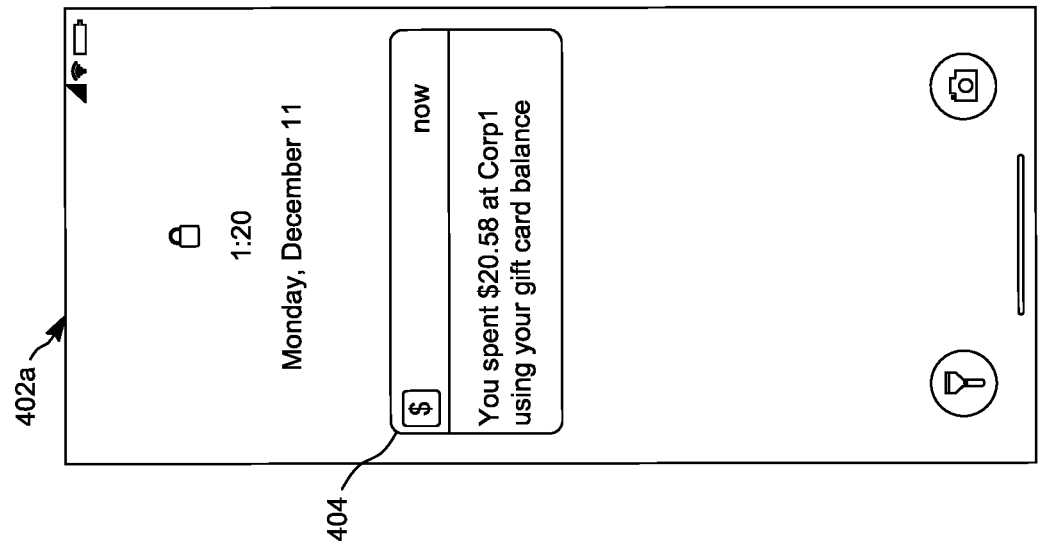

Referring to FIGS. 4A-4C, example graphical user interfaces 402a-402c for performing or confirming a transaction using a gift card are shown. In particular embodiments, the example graphical user interfaces 402a-402c may be displayed within a PS app 110(A) executing on the user device 112(A) or any user interface of the user device 112(A).

FIG. 4A illustrates a user interface 402a that includes a notification 404. The notification 404 illustrated in user interface 402a is illustrated as a push notification on a lockscreen or homescreen of the user device of a user. While this disclosure presents a certain user interface 402a with a notification 404 in a particular manner, this disclosure contemplates other user interfaces with a notification. As an example, the notification 404 can be an email, a text message, and the like. The notification 404 can be a notification from the PS app 110(A) indicating that a transaction has been performed using a stored balance associated with a gift card associated with the user account.

In response to the receiving user 114(A) selecting the notification 404, the payment service app can transition to user interface 402b as shown in FIG. 4B. The user interface 402b can include transaction details 406 and an activatable element 408. The transaction details can include, by way of non-limiting example, the amount of the transaction, the date and time of the transaction, the location of the transaction, the merchant or other user involved in the transaction, the items associated with the transaction, the conditions of use satisfied by the transaction that allowed for the stored balance associated with the user account of the receiving user 114(A) to be used for the transaction, and the like.

In some examples, the user may perform a transaction at a merchant device 124. The merchant device 124 may send transaction data to the payment services component 123 of the payment service system 106. The transaction data can include an identifier that is associated with at least one of a payment instrument linked to the user account or the user account. The transaction data can include additional or alternative data including, but not limited to, an amount of the transaction (i.e., the "cost" of the transaction), a date and time of the transaction, a location of the transaction, a merchant or other user involved in the transaction, item(s) associated with the transaction, etc. In some examples, transaction data can be received from a third-party merchant. The transaction details 406 can be determined based at least in part on the transaction data.

As described herein, the user account may be associated with one or more gift cards, which can correspond to one or more data objects that each have respective condition(s) of use and a stored balance. Upon receiving the transaction data, the payment services component 123 of the payment service system 106 may identify whether any of the one or more stored balances associated with the one or more data objects are to be applied to the transaction. To do so, the payment services component 123 of the payment service system 106 may compare the transaction data to the condition(s) of use for each of the one or more stored balances associated with the user account. The payment services component 123 of the payment service system 106 may identify one or more stored balances for which associated condition(s) are satisfied. If a single stored balance is eligible for use, the payment services component 123 of the payment service system 106 can use funds associated with the stored balance for processing payment for the transaction.

In some examples, if more than one stored balance is applicable (e.g., condition(s) associated therewith are satisfied), the payment services component 123 of the payment service system 106 may select one or more stored balances to be applied to the transaction based on a determined order (e.g., payment services component 123 of the payment service system 106 determines an order based on parameters associated with each stored balance or an order selected by the user of the user account) as described herein. After the payment services component 123 of the payment service system 106 selects one or more stored balances to be applied to the transaction, the payment services component 123 of the payment service system 106 can facilitate processing the transaction using the one or more stored balances. In some examples, portions of each of the stored balances that are applicable for a transaction can be applied to the transaction.

In response to the receiving user 114(A) selecting activatable element 408, the user interface 402b can transition to user interface 402c as shown in FIG. 4C. The user interface 402c can include an overlay 410, activatable elements 412a, 412b, and an activatable element 414. Activatable element 412a can be used to generate or review a web-based receipt of for the gift card. Activatable element 412b can be used to contact support associated with the payment service system 106. The activatable element 412b can also be used to access a self-help flow that can retroactively apply a stored balance associated with a gift card to a purchase. As shown in the transaction details presented in the overlay 410, the payment services component 123 of the payment service system 106 can apply the available amount of a stored balance to the transaction.

In some examples, the payment services component 123 of the payment service system 106 may apply an incentive prior to applying the funds associated with the stored balance. In some examples, if the stored balance does not have sufficient funds to satisfy the entire cost of the transaction, the payment services component 123 of the payment service system 106 can access and use another stored balance to satisfy the remaining cost of the transaction. As illustrated, in FIG. 4C, the payment services component 123 of the payment service system 106 has applied a stored balance associated with the gift card and another stored balance (e.g., associated with a spending account) to cover the cost of the transaction. If there are no other stored balances to cover the remaining cost of the transaction, the payment services component 123 of the payment service system 106 may pull funds from a linked bank account or decline the transaction.

Figures 5A, 5B, 5C:
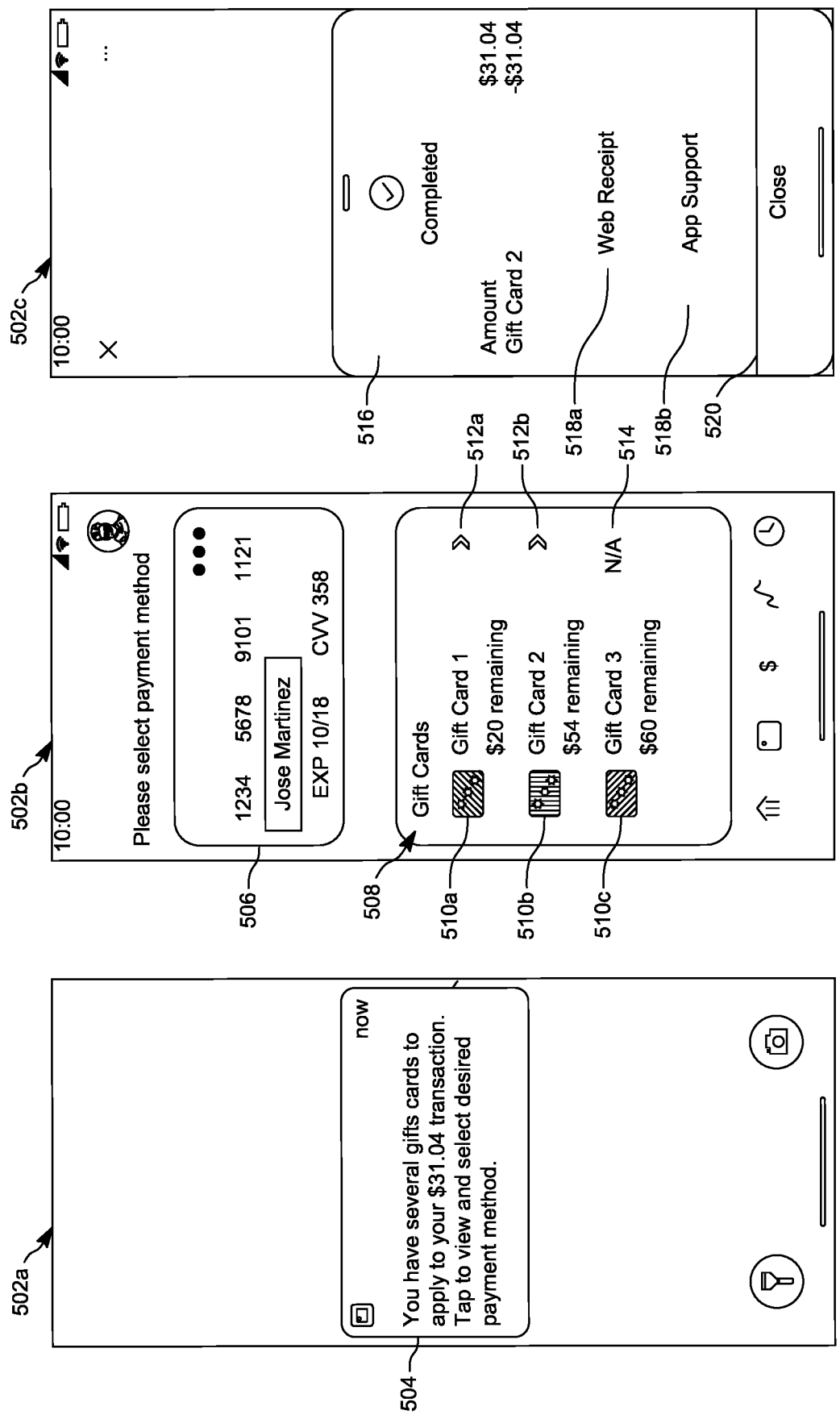
FIGS. 5A-5C are example GUIs for performing a transaction using one or more data objects as displayed on a user device according to some embodiments disclosed herein.

Referring to FIGS. 5A-5C, example graphical user interfaces 502a-502c for performing or confirming a transaction using one or more gift cards are shown. In particular embodiments, the example graphical user interfaces 502a-502c may be displayed within the PS app 110(A) executing on the user device 112(A) or any user interface of the user device 112(A).

FIG. 5A illustrates a user interface 502a that includes a notification 504. The notification 504 illustrated in user interface 502a is illustrated as a push notification on a lockscreen or homescreen, for example, of the user device 112(A) of the receiving user 114(A). While this disclosure presents a certain user interface 502a with a notification 504 in a particular manner, this disclosure contemplates other user interfaces with a notification. As an example, the notification 504 can be an email, a text message, and the like. The notification 504 can be a notification from the PS app 110(A) indicating that a transaction has been or is being processed and that one or more stored balances associated with a user account are eligible for payment of the transaction. The notification 504 can prompt the user to select one of the eligible stored balance(s). In some examples, the payment services component 123 of the payment service system 106 can select one or more of the eligible stored balance(s) without user input (i.e., automatically), for example using machine-learning model(s) or the like.

In response to the receiving user 114(A) selecting the notification 504, the PS app 110(A) can transition to user interface 502b as shown in FIG. 5B. The user interface 502b can include a payment instrument 506 associated with the user account, a list 508 of one or more gift cards, including one or more gift cards 510a-510c, that are associated with the user account, activatable elements 512a, 512b, and an indicator 514. As described above, the payment service system 106 can provide centralized management of gift cards and other conditional currency. As illustrated in FIG. 5B, the payment service system 106 can cause a user interface to be presented via the PS app 110(A) that enables the receiving user 114(A) to view, manage, or otherwise interact with their gift cards in a single user interface. In some examples, gift cards to the same merchant or having the same or similar conditions associated therewith can be grouped together in the user interface 502b and represented by a single indication of a gift card. In some examples, the various gift cards presented via the user interface 502b can be presented in an order based on value, recency of use, frequency of use, relevancy, or the like. In some examples, the payment service system 106 can use one or more machine-learning models for determining the order. For example, the machine-learning model(s) can be trained using express or inferred user preference data for the users of the payment service system 106 and can be further refined using express or inferred user preference data for the user.

The payment services component 123 of the payment service system 106 may receive transaction data associated with the transaction indicated by the notification 504. The payment services component 123 of the payment service system 106 can determine that one or more stored balances associated with the gift cards 510 are in condition to be applied to the transaction based on their respective conditions of use as described herein. For a stored balance associated with a gift card that is determined not to be applicable to the transaction (e.g., the condition(s) of use are not satisfied), the PS app 110(A) can provide an indicator 514 to indicate that the corresponding gift card 510c associated with the stored balance cannot be applied to the transaction.

In some examples, the payment services component 123 of the payment service system 106 can preselect a gift card 510 to be used for the transaction, for example, based on a determined order as described herein. The receiving user 114(A) can perform a selection of a gift card 510 by selecting a respective activatable element 512 to choose the stored balance to apply to the transaction. In some examples, the receiving user 114(A) may select multiple gift cards 510 to apply to the transaction. In some examples, the receiving user 114(A) can determine a portion of each selected gift card to apply to the transaction and the payment services component 123 of the payment service system 106 can facilitate processing the transaction using the portions of the stored balances associated with the selected gift cards 510. In some examples, the payment services component 123 of the payment service system 106, without user input from the receiving user 114(A), can determine which gift cards 510 and respective portions of stored balances that are associated with the gift cards 510 that are to be used for processing payment for the transaction. In such examples, the payment services component 123 of the payment service system 106 can use one or more machine-learning models for making such determinations. For example, the machine-learning model(s) can be trained using express or inferred user preference data for the users of the payment service system 106 and can be further refined using express or inferred user preference data for the user.

In response to the receiving user 114(A) selecting activatable element 512b, the user interface 502b can transition to user interface 502c as shown in FIG. 5C. The user interface 502c can be, for example, an overlay of the user interface 502b. Although not shown, a user interface element can be displayed in response to the selection of the activatable element 512b to request confirmation of the selection of the activatable element 512b. The user interface 502c can include an overlay 516, activatable elements 518a, 518b, and an activatable element 520. Activatable element 518a can be used to generate or review a web-based receipt associated with the selected gift card and the transaction. Activatable element 518b can be used to contact support associated with the payment service system 106. The activatable element 518b can also be used to access a self-help flow that can retroactively apply a stored balance associated with a gift card to a purchase. As shown in the transaction details presented in the overlay 516, the payment services component 123 of the payment service system 106 can apply the available amount of a stored balance associated with gift card 510b to the transaction.

Referring to FIGS. 6A-6C, example graphical user interfaces 602a-602c for converting a stored balance associated with a gift card to an unencumbered balance or transferring the stored balance to another stored balance are shown. In particular embodiments, the example graphical user interfaces 602a-602c may be displayed within the PS app 110(A) executing on the user device 112(A) or any user interface of the user device 112(A).

The conversion of a stored balance to a stored balance process can be initiated from a variety of entry points provided by payment service system 106. Example entry points include, but are not limited to a payment instrument user interface, a user interface associated with an individual gift card, or the like.

FIG. 6A illustrates a user interface 602a that can include a payment instrument 604 associated with the user account, a list 606 of gift cards 608a-608c associated with the user account, and activatable elements 610a-610c. The receiving user 114(A) can select activatable elements 610 to access user interfaces to view details corresponding to the stored balances associated with the gift cards 608a-608c. The user interface 602a may present a remaining stored balance associated with each of the gift cards 608a-608c. Although not shown, the user interface 602a can present an indicator that identifies a gift card that is available to convert to a stored balance. The state management component 121 of the payment service system 106 may identify a stored balance as eligible to transfer to another stored balance, for example, if the remaining value of the stored balance falls below a threshold value (e.g., $5). In such an example, the state management component 121 of the payment service system 106 can transfer the remaining funds to another stored balance (e.g., via a ledger event) or may remove conditions associated with the remaining funds so they can be used for any transaction. In some examples, the threshold value to trigger transfer or removal of conditions may be based on the conditions of use associated with a stored balance. That is, threshold values can be dynamically determined based on transaction history of the user or other users of the payment service. In some examples, the state management component 121 of the payment service system 106 can use machine-learning model(s) for determining such threshold values. As an example, for a stored balance that has a condition of use associated with a coffee merchant, the threshold value may be determined to be $5 because that may be the average transaction cost at the coffee merchant. As another example, for a stored balance that has a condition of use associated with a restaurant merchant, the threshold value may be determined to be $15 because that may be the average transaction cost at the restaurant merchant.

In response to the receiving user 114(A) selecting activatable element 610a, the user interface 602a can transition to user interface 602b as shown in FIG. 6B. The user interface 602b can be, for example, an overlay of the user interface 602a. The user interface 602b can include an activatable element 614, stored balance details 616 including an indication that the stored balance is below a threshold value and is eligible to convert to a stored balance, an activatable element 618, a transaction history 620 including one or more transactions 622, such as transaction 622a. The activatable element 614 can be used to enable automatically using the stored balance associated with the gift card 608a whenever conditions of use are satisfied. That is, the activatable element 614 can be toggled on or off to enable or disable the use of the stored balance associated with the gift card 608a. In some examples, the state of the data object associated with the gift card 608a can be determined based on the position of the activatable element 614.

The activatable element 618 can be selected to request that the stored balance associated with the gift card 608a be converted to an unencumbered balance (e.g., a stored balance with no conditions of use) or transferred to another stored balance as described herein. The conversion to an unencumbered balance can remove conditions associated with the stored balance. Transfer of the stored balance can cause the remaining value of the stored balance to be added to another stored balance associated with the user account of the receiving user 114(A). The transaction history 620 can include one or more transactions 622, such as transaction 622a, using the stored balance associated with the gift card 608a.

In response to the receiving user 114(A) selecting the activatable element 618, the user interface 602b can transition to user interface 602c as shown in FIG. 6C. The user interface 602c can include an overlay 624, activatable elements 626a, 626b, and an activatable element 628. Activatable element 626a can be used to generate or review a web-based receipt of for the gift card. Activatable element 626b can be used to contact support associated with the payment service system 106. The activatable element 626b can also be used to access a self-help flow that can retroactively apply a stored balance associated with a gift card to a purchase. As shown in the transaction details presented in the overlay 624, the state management component 121 of the payment service system 106 can convert the remaining amount of a stored balance associated with gift card 608a to an unencumbered stored balance or transfer the stored balance to another stored balance associated with the user account.

In some examples, such a conversion or transfer can be performed automatically (e.g., without user input) by the state management component 121 of the payment service system 106 based at least in part on a determination that the value stored balance of the gift card 608a falls below the threshold value or satisfies some other condition (e.g., the age of the stored balance exceeds a threshold). In such examples, the state management component 121 of the payment service system 106 can automatically convert or transfer a stored balance upon satisfaction of certain criteria and application of a set of hierarchical rules or machine-learning models. Furthermore, in some examples, the state management component 121 of the payment service system 106 can generate a recommendation to convert the stored balance associated with a gift card to an unencumbered balance or otherwise transfer the stored balance to another stored balance. In such examples, the recommendation can be made based on application of a set of hierarchical rules to the amount of the stored balance, conditions of use associated with the stored balance, or the like. The recommendation can be further made based on a determination made using one or more machine-learning models trained to generate recommendations regarding when a stored balance is still useful as a stored balance associated with conditions of use.

Referring to FIGS. 7A-7D, example graphical user interfaces 702a-702d for sending an acknowledgement of a gift card are shown. In particular embodiments, the example graphical user interfaces 702a-702d may be displayed within the PS app 110(A) executing on the user device 112(A) or any user interface of the user device 112(A).

The sending an acknowledgement of a gift card process can be initiated from a variety of entry points provided by payment service system 106. Example entry points include, but are not limited to a transaction user interface associated with the gift card, a user interface of a stored balance associated with the gift card, an acceptance user interface associated with the gift card, and the like.

Figures 7A, 7B:
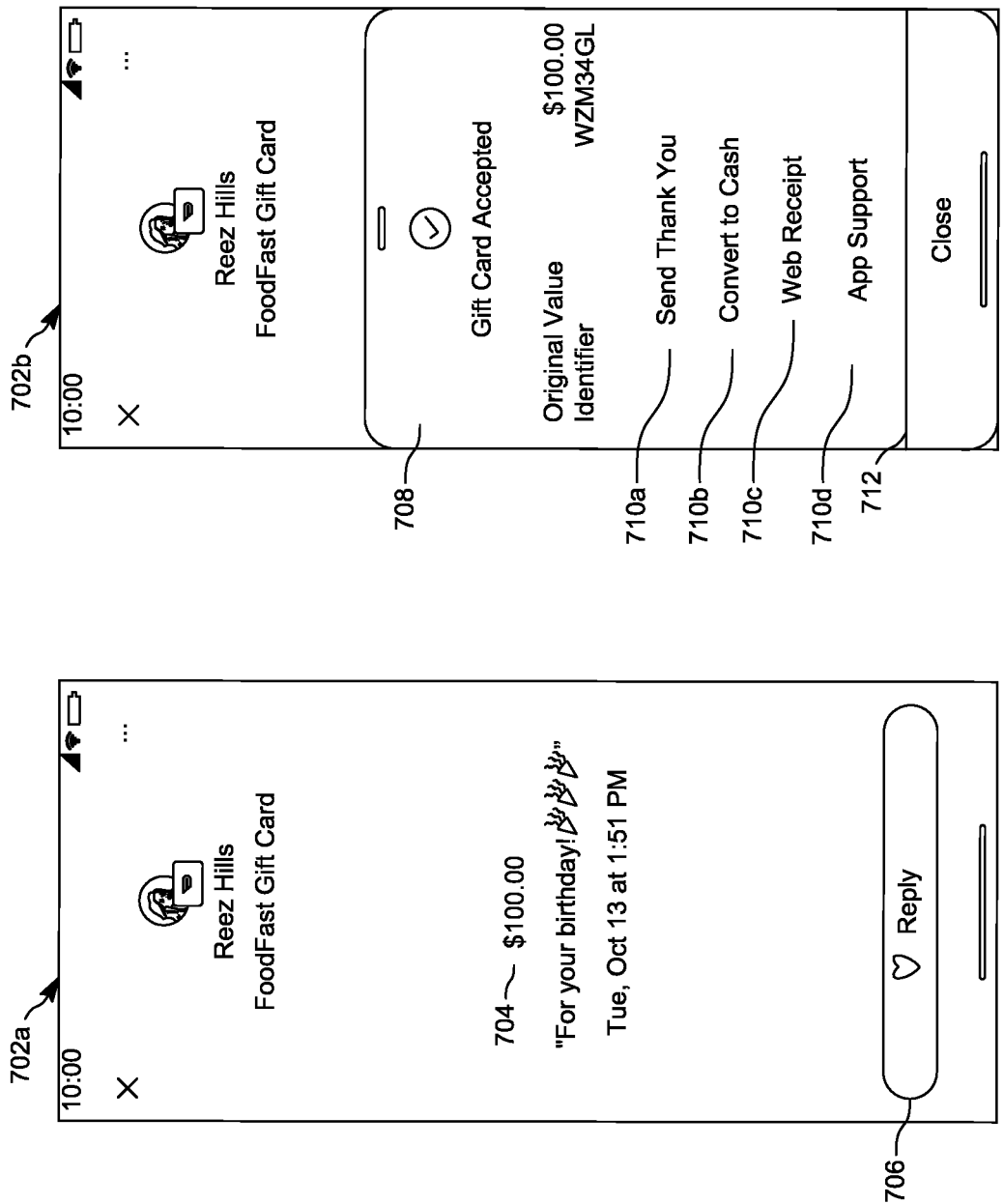
FIGS. 7A-7D are example GUIs for sending an acknowledgement of a data object as displayed on a user device of a user receiving a data object according to some embodiments disclosed herein.

FIG. 7A illustrates a user interface 702a that can include a transaction details 704 associated with a gift card and an activatable element 706. The transaction details 704 can include an amount associated with the stored balance associated with the gift card, a note written by the sending user 114(B), and a date and time associated with purchase or transfer of the gift card. The activatable element 706 can be selected to respond or acknowledge receipt of the gift card.

In response to the receiving user 114(A) selecting activatable element 706, the user interface 702a can transition to user interface 702b as shown in FIG. 7B. The user interface 702b can be, for example, an overlay of the user interface 702a. The user interface 702b can include an overlay 708, activatable elements 710a-710d, and an activatable element 712. The overlay 708 can include details corresponding to the stored balance associated with the gift card, such as an original value of the stored balance and an identifier. Activatable element 710a can be selected to send an acknowledgement of receiving the gift card, such as an emoji, reactji, an image, a message, or the like. Activatable element 710b can be selected to request that the stored balance associated with the gift card be converted to an unencumbered balance (e.g., a stored balance with no conditions of use) or transferred to another stored balance as described above with reference to FIGS. 6A-6C. Activatable element 710c can be used to generate or review a web-based receipt of for the gift card. Activatable element 710d can be used to contact support associated with the payment service system 106. The activatable element 710d can also be used to access a self-help flow that can retroactively apply a stored balance associated with the gift card to a purchase.

Figures 7C, 7D:
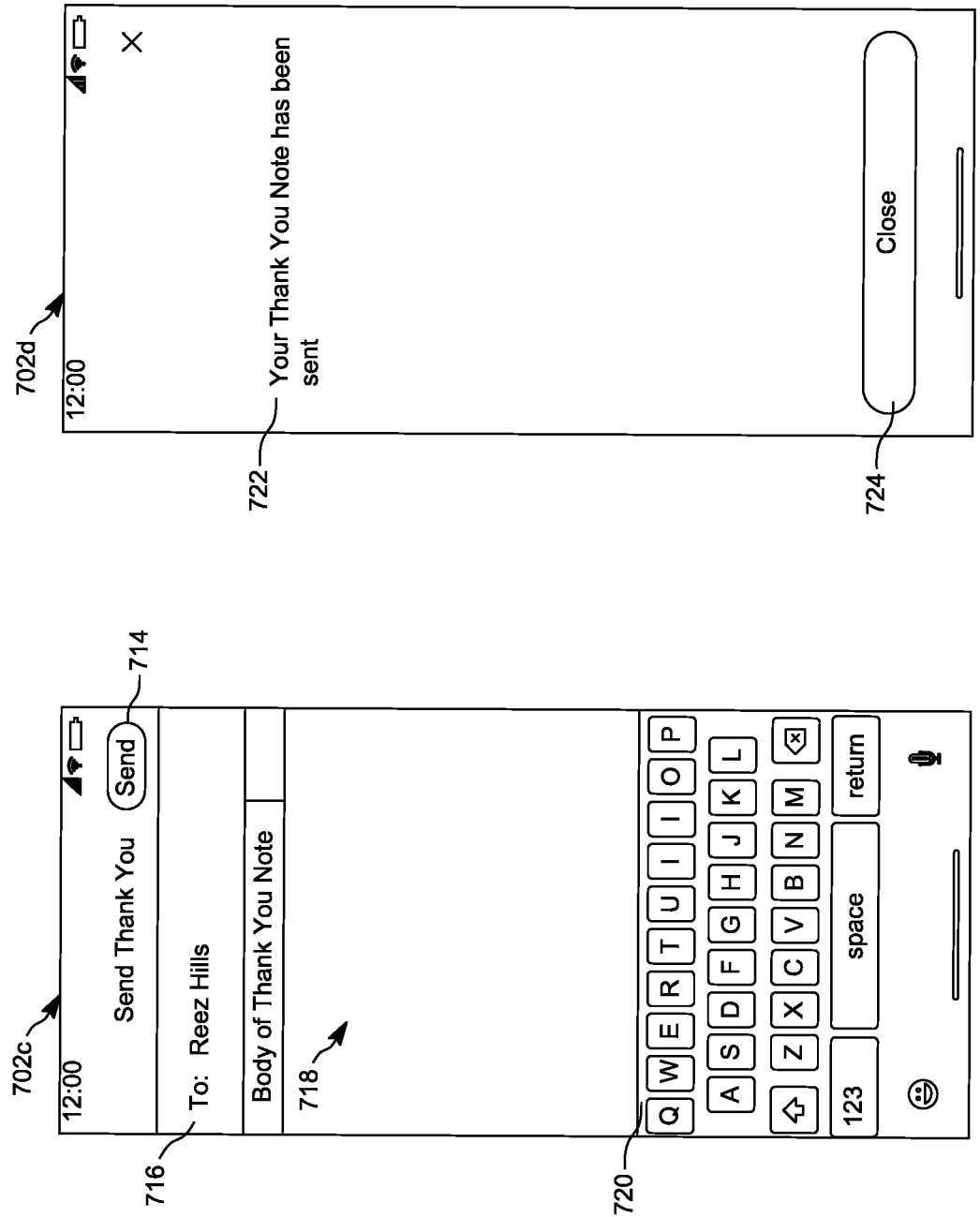

In response to the receiving user 114(A) selecting activatable element 710a, the user interface 702b can transition to user interface 702c as shown in FIG. 7C. The user interface 702c can include an activatable element 714, an entry field 716, an entry field 718, and a digital keyboard 720. The activable element 714 can be selected to send a message to the sending user 114(B) including the contents of entry field 718. The entry field 716 can specify a recipient of the message. The entry field 716 can automatically be populated by the payment service app using the one or more sending users 114(B) associated with the gift card. The entry field 718 can be a body of a message to send to the one or more users identified in entry field 716. The digital keyboard 720 can be used to input text into the entry field 718. In some examples, the user interface 702c can include a mechanism from which a camera can be activated to capture an image, video, or other representation of an item, to scan a receipt, or the like. A user can capture an image, video, or other representation to attach to or otherwise associate with the message. In some examples, the user interface 702c can include a mechanism to attach a file to the message.

In response to the receiving user 114(A) selecting activatable element 714, the user interface 702c can transition to user interface 702d as shown in FIG. 7D. The user interface 702d can include a confirmation 722 and an activatable element 724. The confirmation 722 can indicate that the message has been sent to the one or more users identified in the entry field 716.

In particular embodiments, the transfer component 119 of the payment service system 106 can automatically send a message to the sending user 114(B) who sent the gift card to the receiving user 114(A), for example without the user interacting with user interfaces described in FIGS. 7A-7D. For example, the transfer component 119 of the payment service system 106 can automatically generate and send a message based at least in part on a determination that a stored balance associated with a particular gift card has been used. That is, the transfer component 119 of the payment service system 106 can monitor transaction data, as described above, and upon determining that a stored balance associated with a gift card is used for a particular transaction, the transfer component 119 of the payment service system 106 can generate and send a message to the sending user 114(B). In some examples, the transfer component 119 of the payment service system 106 can generate and send a message indicating that all or a threshold amount of the stored balance has been used, the stored balance has been used a threshold number of times (including on first use), or the stored balance after a threshold amount of time has passed. In particular embodiments, the message can further notify the sending user 114(B) as to how the receiving user 114(A) used or is using the gift card.

Figure 8C:
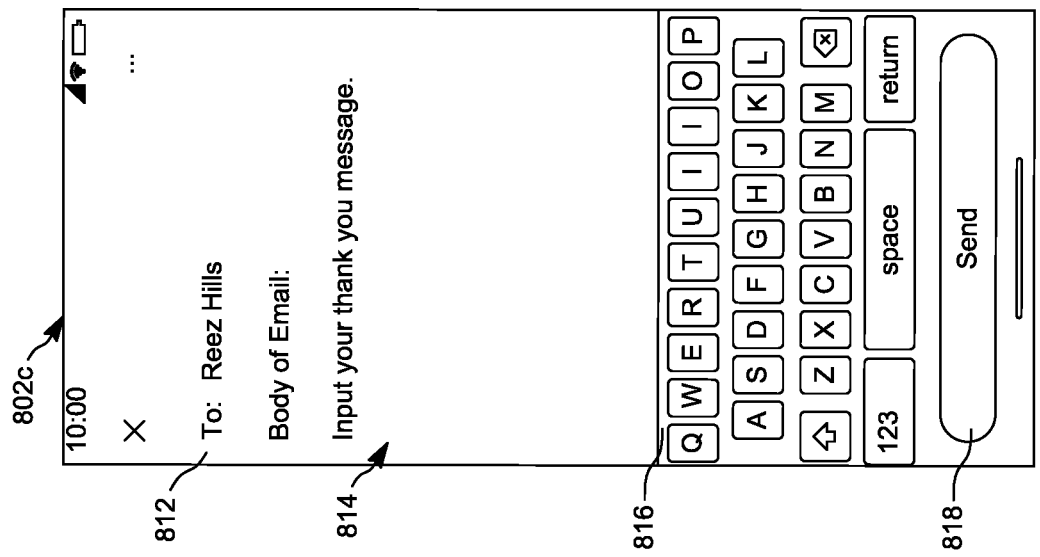
FIGS. 8A-8C are example GUIs for sending an acknowledgement of a data object as displayed on a user device of a user receiving a data object according to some embodiments disclosed herein.
Figure 8B:
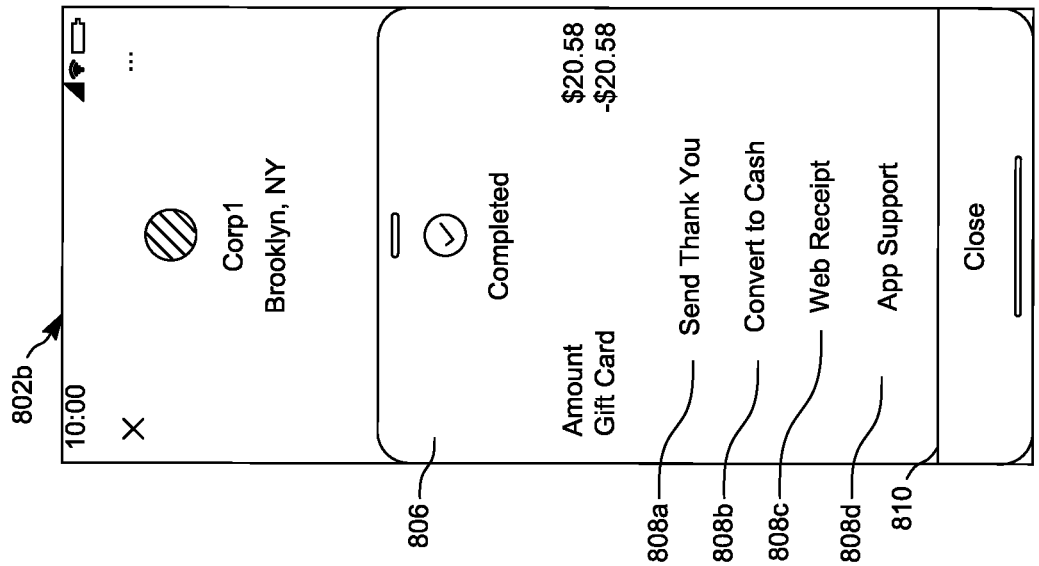
Figure 8A:
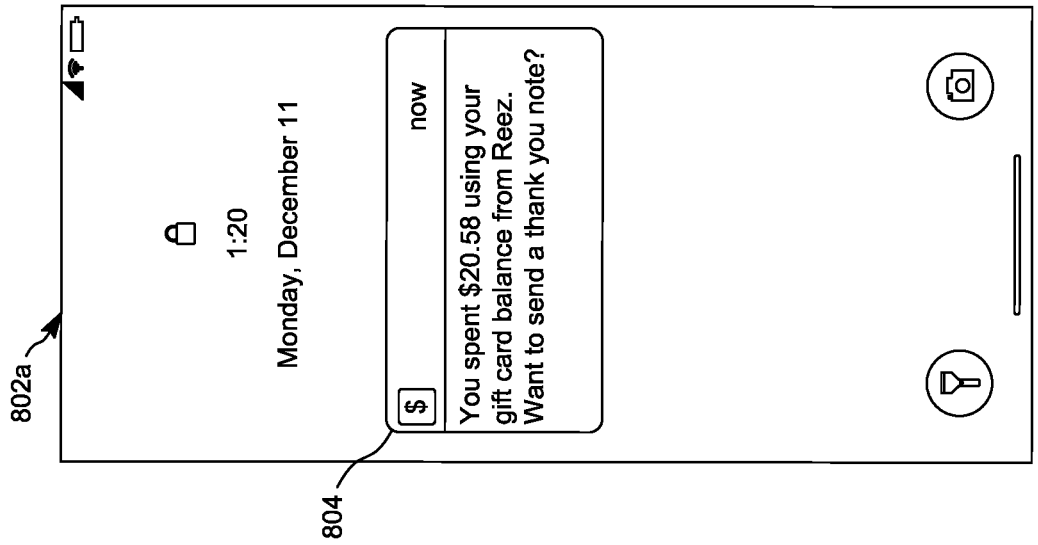

Referring to FIGS. 8A-8C, example graphical user interfaces 802a-802c for sending an acknowledgement of a gift card are shown. In particular embodiments, the example graphical user interfaces 802a-802c may be displayed within a PS app 110(A) executing on the user device 112(A) or any user interface of the user device 112(A).

FIG. 8A illustrates a user interface 802a that includes a notification 804. The notification 804 illustrated in user interface 802a is illustrated as a push notification on a lockscreen or homescreen of the user device 112(A). While this disclosure presents a certain user interface 802a with a notification 804 in a particular manner, this disclosure contemplates other user interfaces with a notification. As an example, the notification 804 can be an email, a text message, and the like. The notification 804 can be a notification from a payment service app indicating that a transaction has been performed and requesting the receiving user 114(A) to send an acknowledgement (e.g., a thank you note) of the gift card to the sending user 114(B).

In response to the receiving user 114(A) selecting the notification 804, the user interface 802a can transition to the user interface 802b as shown in FIG. 8B. The user interface 802b can include an overlay 806, activatable elements 808a-808d, and an activatable element 810. The overlay 806 can include details corresponding to the transaction, such as an amount of the transaction and the amount deducted from the stored balance. Activatable element 808a can be selected to send an acknowledgement of receiving the gift card (e.g., sending a thank you note). Activatable element 808b can be selected to request that the stored balance associated with the gift card be converted to an unencumbered balance (e.g., a cash balance with no conditions of use) or transferred to another stored balance, as described above with reference to FIGS. 6A-6C. Activatable element 808c can be used to generate or review a web-based receipt of for the gift card. Activatable element 808d can be used to contact support associated with the payment service system 106. The activatable element 808d can also be used to access a self-help flow that can retroactively apply a stored balance associated with the gift card to a purchase.

In response to the receiving user 114(A) selecting activatable element 808a, the user interface 802b can transition to user interface 802c as shown in FIG. 8C. The user interface 802c can include an entry field 812, an entry field 814, a digital keyboard 816, and an activatable element 818. The entry field 812 can specify a recipient of the message (e.g., thank you note). The entry field 812 can automatically be populated by the payment service app using the one or more sending users 114(B) associated with the gift card corresponding to the stored balance that was used for the transaction. The entry field 814 can be a body of a message to send to the one or more users identified in entry field 812. The digital keyboard 816 can be used to input text into the entry field 814. The activable element 818 can be selected to send a message to the sending user 114(B) including the contents of entry field 814. In some examples, the user interface 702c can include a mechanism from which a camera can be activated to capture an image, video, or other representation of an item, to scan a receipt, or the like. A user can capture an image, video, or other representation to attach to or otherwise associate with the message. In some examples, the user interface 702c can include a mechanism to attach a file to the message.

In particular embodiments, the transfer component 119 of the payment service system 106 can automatically send a message to the sending user 114(B) who sent the gift card to the receiving user 114(A), for example without the user interacting with user interfaces described in FIGS. 8A-8C. For example, the transfer component 119 of the payment service system 106 can automatically generate and send a message based at least in part on a determination that a stored balance associated with a particular gift card has been used. That is, the transfer component 119 of the payment service system 106 can monitor transaction data, as described above, and upon determining that a stored balance associated with a gift card is used for a particular transaction, the transfer component 119 of the payment service system 106 can generate and send a message to the sending user 114(B).

Referring to FIGS. 9A-9D, example graphical user interfaces 902a-902d for associating a value associated with a physical gift card to a user account are shown. The association of the value associated with a physical gift card to a user account provides added layers of security and protection against theft and fraud. In particular embodiments, the example graphical user interfaces 902a-902d may be displayed within the PS app 110(A) executing on the user device 112(A) or any user interface of the user device 112(A).

FIG. 9A illustrates a user interface 902a that can include a payment instrument 904 associated with the user account, a list 906 of gift cards 908a-908c associated with the user account, activatable elements 910a-910c, and activatable element 914. The receiving user 114(A) can select activatable elements 910 to access user interfaces to view details corresponding to stored balances associated with the gift cards 908a-908c. The user interface 902a may present a remaining stored balance associated with each of the gift cards 908a-908c. The activatable element 914 can be selected to add an additional gift card to be associated with the user account.

In response to the user selecting activatable element 914, the user interface 902a can transition to user interface 902b as shown in FIG. 9B. The user interface 902b can include gift card details 916, a digital keyboard 918, and an activatable element 920. The user interface 902b can specify instructions to associate the gift card with the user account. As an example, the user can scan a physical gift card 915 to add the gift card 915 to the user account, such as using an NFC chip to retrieve data corresponding to the gift card 915. As another example, the user can manually input details corresponding to a gift card 915 using digital keyboard 918. As another example, the user can take an image of the physical gift card 915 using an activatable element (not shown). The image can be sent to the payment service system 106 or analyzed by the user device 112(A) to identify relevant details corresponding to the gift card 915 (e.g., using optical character recognition or other data processing mechanisms). The gift card details 916 can include one or more of an amount associated with the gift card 915, a name on the gift card 915, a card number or other identifier associated with the gift card 915, an expiration date associated with the gift card 915, etc. The activatable element 920 can be selected to confirm the details of the gift card 916, which can trigger creation of a gift card 915 associated with the gift card 915 if one does not already exist.

In response to the user selecting the activatable element 920, the transfer component 119 of the payment service system 106 can initiate a transaction to transfer funds from the holding account associated with the physical gift card 915 to the stored balance associated with the data object. In some examples, the gift card 915 can be associated with a data object and stored balance and in such examples, the transfer component 119 of the payment service system 106 can transfer the data object to the user account for association with the user account. As another example, the gift card 915 can be associated with a merchant associated with the payment service system 106. In such an example, a data object may already exist and be associated with a user account of the merchant. In such an example, the transfer component 119 of the payment service system 106 can transfer the data object from the user account of the merchant to the user account of the receiving user 114(A). As another example, if the gift card 915 is associated with a merchant not associated with the payment service system 106 or another third-party, the transfer component 119 of the payment service system 106 can process a transaction for the amount using the provided gift card details 916 and associated the received funds with a newly created data object.

Figure 9D:
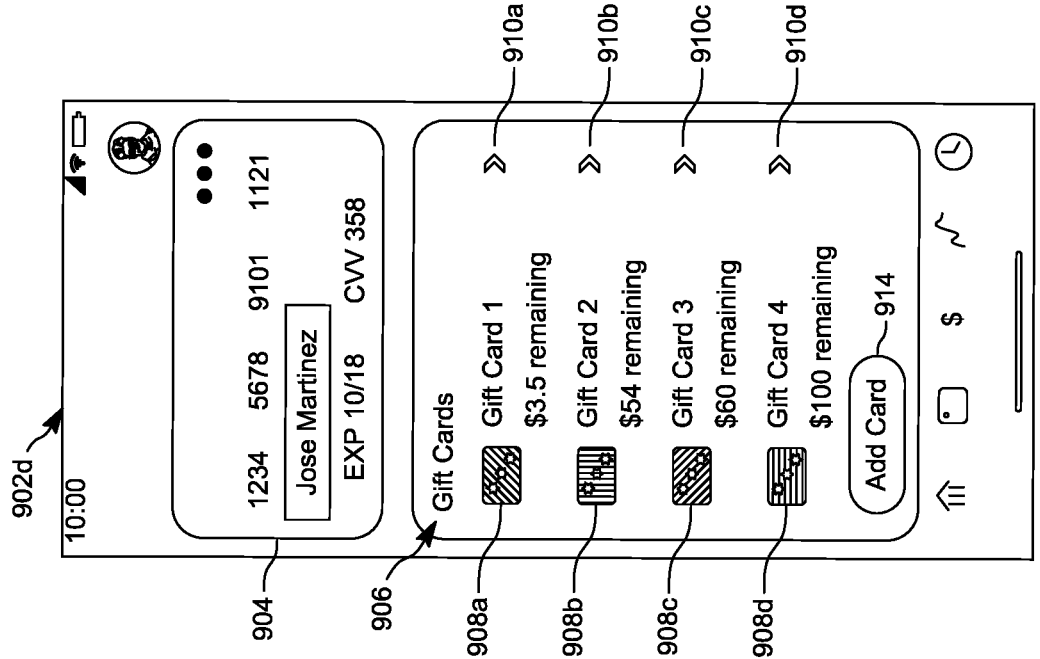
Figure 9C:
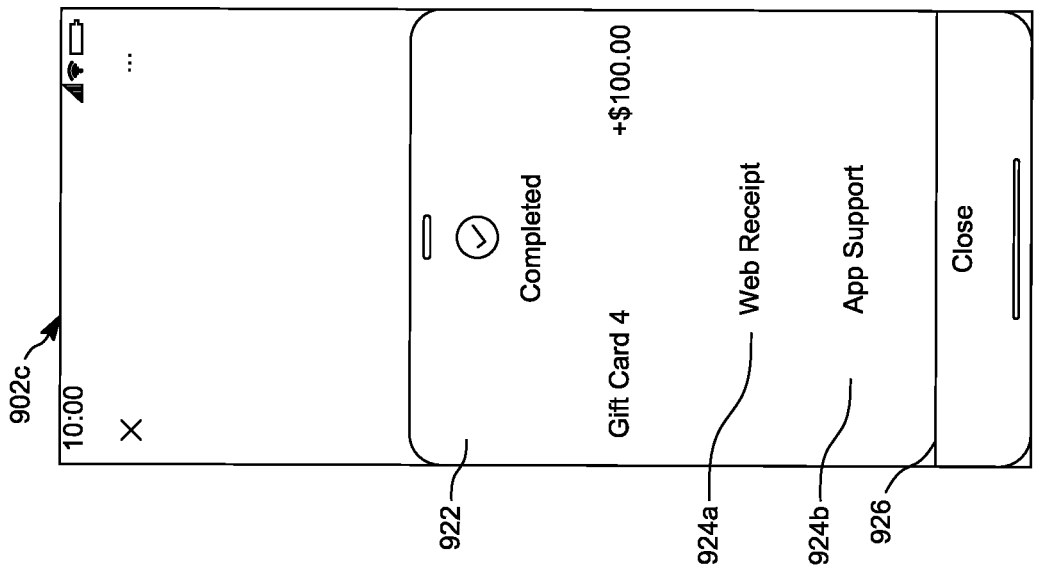

In response to the user selecting the activatable element 920, the user interface 902b can transition to user interface 902c as shown in FIG. 9C. The user interface 902c can include an overlay 922, activatable elements 924a, 924b, and an activatable element 926. The overlay 922 can include details of the gift card that has been added to the user account, where the gift card 915 is associated with a stored balance useable by the user account. In some examples, the stored balance can be associated with fiat currency, cryptocurrency, stocks, or the like. In some examples, the receiving user can request to transition the type of currency associated with the gift card 915 into a different type of currency (e.g., fiat to cryptocurrency, cryptocurrency to fiat, or the like). Activatable element 924a can be used to generate or review a web-based receipt for the gift card 915. Activatable element 924b can be used to contact support associated with the payment service system 106. The activatable element 924b can also be used to access a self-help flow that can retroactively apply a stored balance associated with a gift card 915 to a purchase. Activatable element 926 can be used to close the overlay 922.

In response to the user selecting the activatable element 926, the user interface 902c can transition to user interface 902d as shown in FIG. 9D. The user interface 902d can include similar user interface elements as user interface 902a. The user interface 902d can include a payment instrument 904 associated with the user account, a list 906 of gift cards 908a-908d associated with the user account, activatable elements 910a-910d, and activatable element 914. The user interface 902d includes the newly added gift card 908d (e.g., gift card 915) with a corresponding activatable element 910d to view details of the stored balance associated with the gift card 908d.

In particular embodiments, while FIGS. 2A-9D show a certain configuration of elements represented by the user interfaces, this disclosure contemplates other configurations of the elements represented by the user interfaces shown in FIGS. 2A-9D. As an example, a user interface may include additional elements or may remove several elements. The examples shown in FIGS. 2A-9D are merely example flows and one or more user interfaces may be optional, can be accessed from different access points (e.g., from a different selection of an activatable user interface element), can have more or less elements, same or different layouts, and the like. While this disclosure describes interacting with the user interfaces through a selection (e.g., via a touch input), this disclosure contemplates using alternative inputs, such as a speech input.

FIGS. 10A-14 are example processes according to embodiments described herein. The processes shown in FIGS. 10A-14 may be performed utilizing one or more processing devices (e.g., first user device 112(B), second user device 112(A), payment service system 106) associated with the recited entities that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

Figure 10A:
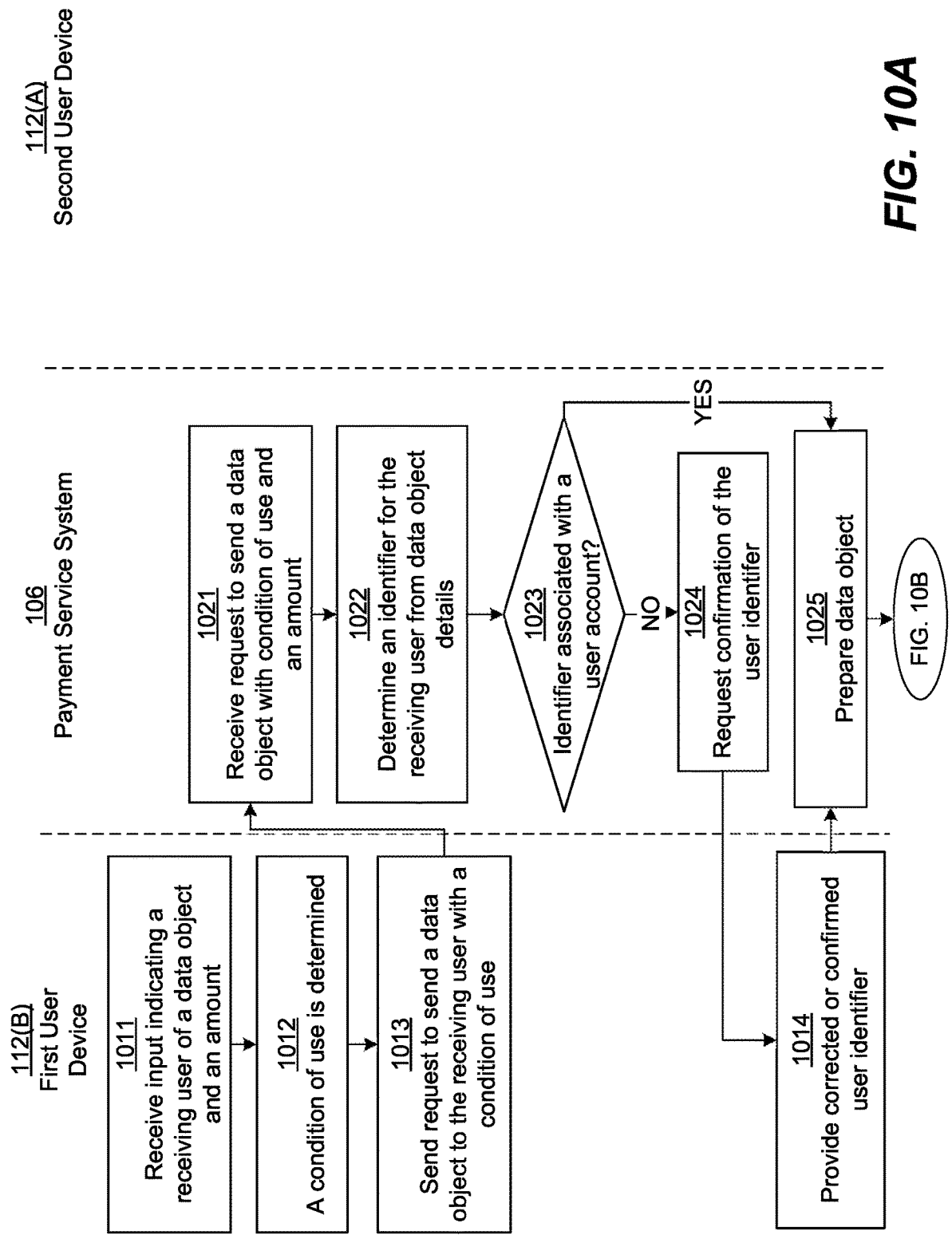
FIGS. 10A and 10B are a process for managing creation and transfer of a data object according to some embodiments disclosed herein.
Figure 10B:
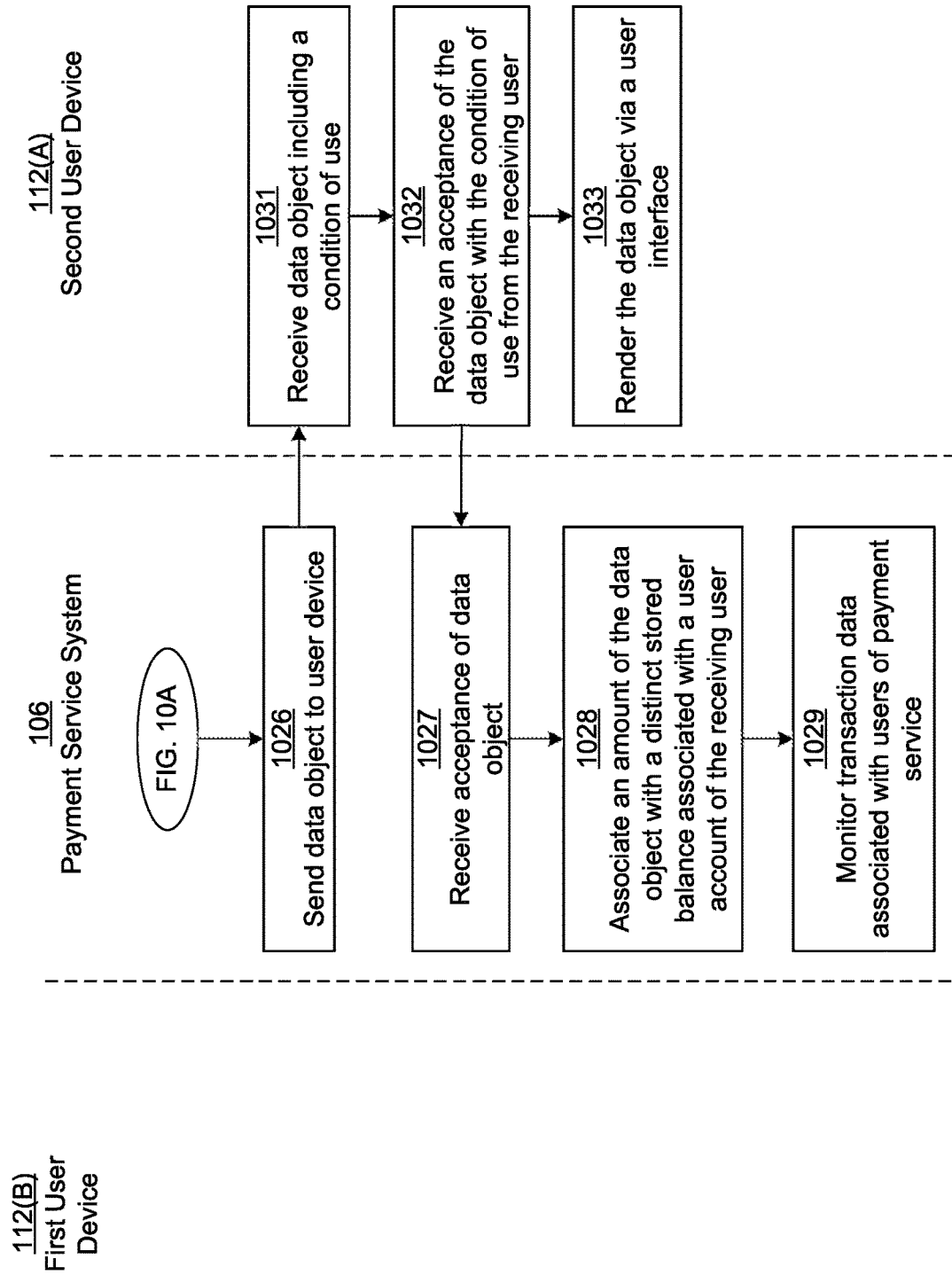

FIGS. 10A and 10B is an example process for managing creation and transfer of a data object according to an embodiment described herein. At step 1011, an input indicating a receiving user of a data object and an amount can be received. As an example, a sending user (e.g., a sending user 114(B)) can select or otherwise designate, via a first user device 112(B), a second user (e.g., a receiving user 114(A)) to receive a data object and an amount to associate with the data object. For example, the first user device 112(B) can execute a payment service app 110(A) associated with a payment service system 106. The first user may navigate to a user interface to send a data object to a second user.

At step 1012, a condition of use for the data object is determined. As an example, the first user device 112(B) can receive a selection of one or more conditions of use from a sending user. For example, the first user device 112(B) can receive a selection of a condition such as a transaction category, a geolocation, a time, an item inclusion list (e.g., using funds for items on the list is permitted), an item exclusion list (e.g., using funds for items on the list is not permitted), particular merchant(s), particular merchant category(s), or the like. The condition can therefore be determined based on such a selection. That is, in some examples, the input received at step 1011 can be associated with a pre-configured or partially pre-configured data object, which can have one or more conditions already associated therewith. In such examples, the condition(s) can be determined based at least in part on such configurations. While FIGS. 10A-10B describe a process using a single condition of use, this disclosure contemplates using multiple conditions of use.

In some examples, when a sending user 114(B) requests to send a data object to a receiving user 114(A), the configuration component 117 of the payment service system 106 may use one or more machine-learning models to determine one or more conditions of use to recommend adding to a data object. The one or more conditions of use can comprise one or more of a transaction category, a geolocation, a time, an item inclusion list, an item exclusion list, one or more merchants, or one or more merchant categories. An item inclusion list may specify particular items that are permitted to be purchased using a stored balance associated with the data object. As an example, a user that requests to send a data object to a recipient can specify a grocery list of items that are available for purchase using the stored balance associated with the data object. An item exclusion list can specify particular items that are not permitted to be purchased using a stored balance associated with the data object. As an example, a sending user 114(B) that requests to send a data object to a receiving user 114(A) can specify the stored balance associated with the data object is not allowed to be used for purchases including cigarettes, alcohol, and the like. The machine-learning model may be trained using a plurality of conditions of use that are specified by users of a payment service. As an example, the machine-learning model may identify frequently used conditions of use that the sending user specifies for one or more recipients, including the particular recipient of the data object. For example, the sending user frequently specifies an expiration date of one year for data objects. The machine-learning model may generate recommendations on which conditions of use to associate with a data object. Based at least in part on the machine-learning model, the payment service system may recommend a condition of use specifying an expiration date of one year for a subsequently sent data object. The machine-learning model may process data corresponding to generated data objects by request of many or all users of the payment service, and their corresponding conditions of use, to determine one or more conditions of use to recommend adding to a data object. For example, the machine-learning model can determine that during the start of the school year a popular condition of use for a data object is a geographical area associated with a school location. Based at least in part on the machine-learning model, the configuration component 117 of the payment service system 106 can recommend a condition of use specifying a geographic location. In some examples, the user can select a condition from one or more recommended conditions.

At step 1013, a request to send a data object to the receiving user with a condition of use is sent. As an example, a sending user can send, via the first user device 112(B), a request to send a data object to a user account associated with a receiving user (e.g., a receiving user of the second user device 112(A)). For example, the first user device 112(B) can send the request to the configuration component 117 of the payment service system 106 including the amount to be associated with a stored balance associated with the data object, an identifier of a receiving user, and one or more conditions of use.

At step 1021, the request to send a data object with a condition of use and an amount is received. As an example, the configuration component 117 of the payment service system 106 receives the request to send a data object with a condition of use and an amount to be associated with a stored balance. The request may also specify the receiving user. For example, the configuration component 117 of the payment service system 106 can receive a request to send a data object to the receiving user, where the data object is associated with a stored balance of $100 and is for a particular restaurant merchant. The request can specify the receiving user by specification of an identifier for the receiving user (e.g., email address, phone number, unique alpha numeric identifier, etc.). The identifier can include, in some examples, an identifier of the user device of the user (e.g., a device unique identifier, International Mobile Equipment Identity (IMEI), SIM card number) or an identifier the payment service app executing on the device of the user (e.g., an application identifier).

In some examples, based at least in part on receiving the request, the configuration component 117 of the payment service system 106 can create or configure the data object. Additional details are provided above with reference to FIG. 1. The data object can be associated with the amount, which can correspond to a value of a stored balance associated therewith. The condition(s) of use associated with the stored balance can additionally be associated with the data object. The data object can be wrapped or otherwise associated with an image, graphic, or the like. As described herein, the data object can be used to facilitate the transfer and state management of a digital gift card.

At step 1022, an identifier for the receiving user may be determined from the data object details. As an example, the transfer component 119 of the payment service system 106 can identify the identifier of a recipient of the data object as specified by the sending user.

At step 1023, it is determined whether the identifier is associated with a user account. As an example, the transfer component 119 of the payment service system 106 can use the identifier of the recipient to identify the user account of the recipient. For example, the transfer component 119 of the payment service system 106 can query a datastore 128 to determine if the identifier is associated with a user account.

If the identifier is not associated with a user account, at step 1024, confirmation of the user identifier is requested. As an example, if the transfer component 119 of the payment service system 106 is unable to determine if the identifier is associated with a user account, the transfer component 119 of the payment service system 106 can prompt the sending user to confirm the identifier. For example, the transfer component 119 of the payment service system 106 can prompt the sending user to request the sending user to correct an error in the identifier or to provide an alternative identifier.

At step 1014, the user identifier is corrected or confirmed and provided to the transfer component 119 of the payment service system 106. For example, the user can provide confirmation of the user identifier, correct an error in the identifier, or provide an alternative identifier in response to the prompt.

At step 1025, the data object is prepared. As an example, the transfer component 119 of the payment service system 106 can prepare the data object. Once the sending user confirms that the identifier is correct, the transfer component 119 of the payment service system 106 can use the identifier to prepare a data object to be sent to the user. The payment service system 106 can request the receiving user to create an account with the payment service system 106 to receive the data object. As described, the payment service system 106 can require that the receiving user have an account with the payment service system 106 in order to receive a data object. For example, if the identifier is a phone number, the transfer component 119 of the payment service system 106 can send a message to the second user device 112(A) (e.g., using a short message service (SMS) message), to invite the receiving user to create an account with the payment service system using an onboarding flow (not illustrated). In some examples, as described above, the receiving user may not need to have an account with the payment service system 106 and the user can accept the data object and funds associated therewith via a deposit into another account of the user (e.g., such as a bank account) by providing account information associated with the other account.

If, at step 1023, it is determined that the identifier associated with a user account, the method proceeds to step 1025 directly. The transfer component 119 does not necessarily request confirmation or correction of the identifier. The transfer component 119 of the payment service system 106 can use the identifier or other information associated with the user account and stored in the datastore 128 to prepare the data object. As an example, the user associated with the user account may have indicated a preferred method of contact. The user identifier may have been an email address, while the user may have previously indicated they prefer to be notified by SMS message. The transfer component 119 can use this information in preparing the data object. The process can continue from FIG. 10A to FIG. 10B.

As shown in FIG. 10B, at step 1026, the data object can be sent to a user device. As an example, the transfer component 119 of the payment service system 106, having identified the user account of the receiving user using the identifier, can identify the second user device 112(A) and a method of contact for the receiving user. The transfer component 119 of the payment service system 106 can prepare a message for notifying the receiving user that they've received a data object (e.g., in-app or push notification, SMS message, email message, etc.). The message can contain the data object or a reference to the data object for access by the receiving user. In some examples, the message can include a link, a quick response (QR) code, a barcode, or the like which can include an identifier associated with the data object or otherwise enable the receiving user to accept the data object. The transfer component 119 of the payment service system 106 can send the message to the second user device 112(A) associated with the receiving user.

At step 1031, a data object including a condition of use is received. As an example, a receiving user can receive, via a second user device 112(A), a data object including a condition of use. For example, a payment service app 110(A) associated with the payment service system 106 can be executed on the second user device 112(A). The receiving user can receive a notification from the payment service app 110(A) indicating receipt of a data object including a condition of use.

At step 1032, an acceptance of the data object is received. As an example, the second user device 112(A) can optionally receive an acceptance of the data object with the condition of use from the receiving user. The receiving user can select an activatable element within a user interface of the payment service app 110(A) to accept the data object to be added to the user account of the receiving user. In certain embodiments, the data object can be automatically accepted on behalf of the receiving user without further input. The receiving user can further select an activatable element within a user interface of the payment service app 110(A) to reject the data object and prevent the data object from being added to the user account of the receiving user.

At step 1033, the data object is rendered via a user interface. As an example, the second user device 112(A) can present a representation of the data object within a user interface of the payment service app 110(A). In some examples, the user interface can include a virtual payment instrument associated with the user account, additional data objects associated with the user account, an indication of any available incentives associated with the user account, indications of one or more stored balances associated with the user account, transaction activity associated with the user account, or the like.

At step 1027, an acceptance can be received. As an example, the transfer component 119 of the payment service system 106 can receive an acceptance of the data object from the second user device 112(A). For example, the second user device 112(A) can send an indication to the payment service system 106 once the receiving user selects to accept the data object via the second user device 112(A).

At step 1028, an amount of the data object with a distinct stored balance can be associated with a user account. In at least one example, based at least in part on the receiving user accepting the data object, the transfer component 119 of the payment service system 106 can associate the data object with the user account of the receiving user. In examples where the transfer component 119 of the payment service system 106 automatically accepts on behalf of the user, the transfer component 119 of the payment service system 106 can associate the data object with the user account of the receiving user. As described above, when associated, the stored balance of the data object can be a distinct stored balance associated with the user account. That is, the stored balance can be physically or logically separate from other stored balances of the user account.

In some examples, the transfer component 119 of the payment service system 106 can require that a receiving user have an account with the payment service system 106 in order to receive and use a stored balance associated with a received data object. As such, in examples where the receiving user does not have a user account associated with the payment service, before the second user device 112(A) can receive the data object, the transfer component 119 of the payment service system 106 can initiate an onboarding flow for the receiving user through which the receiving user can create a user account.

The transfer component 119 of the payment service system 106 can access a datastore 128 to update the stored balance 132(B) of the sending user 114(B) to reflect the reduction of funds in accordance with the amount associated with the data object. The transfer component 119 of the payment service system 106 can access the datastore 128 to update the stored balance 132(A) of the receiving user 114(A) to reflect the association of the distinct stored balance associated with the data object with the user account of the receiving user 114(A). Therefore, the transfer component 119 of the payment service system 106 can cause transfer of funds from the stored balance 132(B) associated with the user account of the sending user to the stored balance 132(A) associated with the user account of the receiving user. In some examples, such a transfer can be represented by one or more ledger events, as described herein.

As described above, in some examples, funds associated with the data object can be associated with fiat currency, or an otherwise stable asset. In some examples, funds associated with the data object can be associated with cryptocurrency, stocks, or an otherwise volatile asset. In examples where the funds associated with the data object are volatile, the payment service system 106 can determine the value of the funds using internal or external markets or exchanges. In some examples, where a user desires to send a gift card associated with cryptocurrency funds, in the value of $25 fiat currency, to another user, the amount of the gift card can change based on when the conversion from fiat currency to cryptocurrency is performed. In some examples, the conversion can happen at the time the request to send the data object is received by the payment service system 106. In some examples, the conversion can happen at the time the data object is accepted. In some examples, if the value of cryptocurrency changes from when the data object is generated, sent, or received, the receiving user can receive a gift card with more or less value than intended (e.g., more or less than $25 fiat currency worth of cryptocurrency). In some examples, the payment service system 106 can compare the relative value of the data object when accepted to determine whether the value corresponds to the value originally intended by the sending user. In some examples, the payment service system 106 can withdraw or deposit funds into the account of the sending user to ensure that the value of the data object is the same value as intended when the sending user requested the data object to be generated or sent. In some examples, the payment service system 106 can transfer the funds as valued at the time the data object is accepted. That is, the receiving user may receive a data object with a value that is more than or less than the value originally sent from the sending user. In some examples, the payment service system 106 can monitor conversion rates or other factors to determine optimal times to convert currency from one type to another, for example, to minimize the cost to the sending user and maximize the value for the receiving user.

In some examples, the receiving user can request to receive the funds in a different currency type than originally gifted. That is, in some examples, if a data object is associated with fiat currency and the receiving user would rather have cryptocurrency, the receiving user can request to convert the funds into a different currency type. In some examples, the payment service system 106 can utilize intelligence to determine preferences of the receiving user and can convert the funds into a preferred currency type without input from the receiving user.

At step 1029, transaction data can be monitored. As an example, as described herein, the payment services component 123 of the payment service system 106 can monitor the transaction data associated with users of the payment service as described above with respect to at least FIG. 1. That is, the payment services component 123 of the payment service system 106 can receive transaction data and use the transaction data to determine whether the stored balance associated with the data object is to be used for payment or partial payment of a transaction. In at least one example, in response to a determination that the stored balance associated with the data object is to be used (e.g., condition(s) associated therewith are satisfied), the payment services component 123 of the payment service system 106 can use at least a portion of the stored balance for payment of the transaction. Additional details are provided above and below with reference to FIG. 11.

Figure 11:
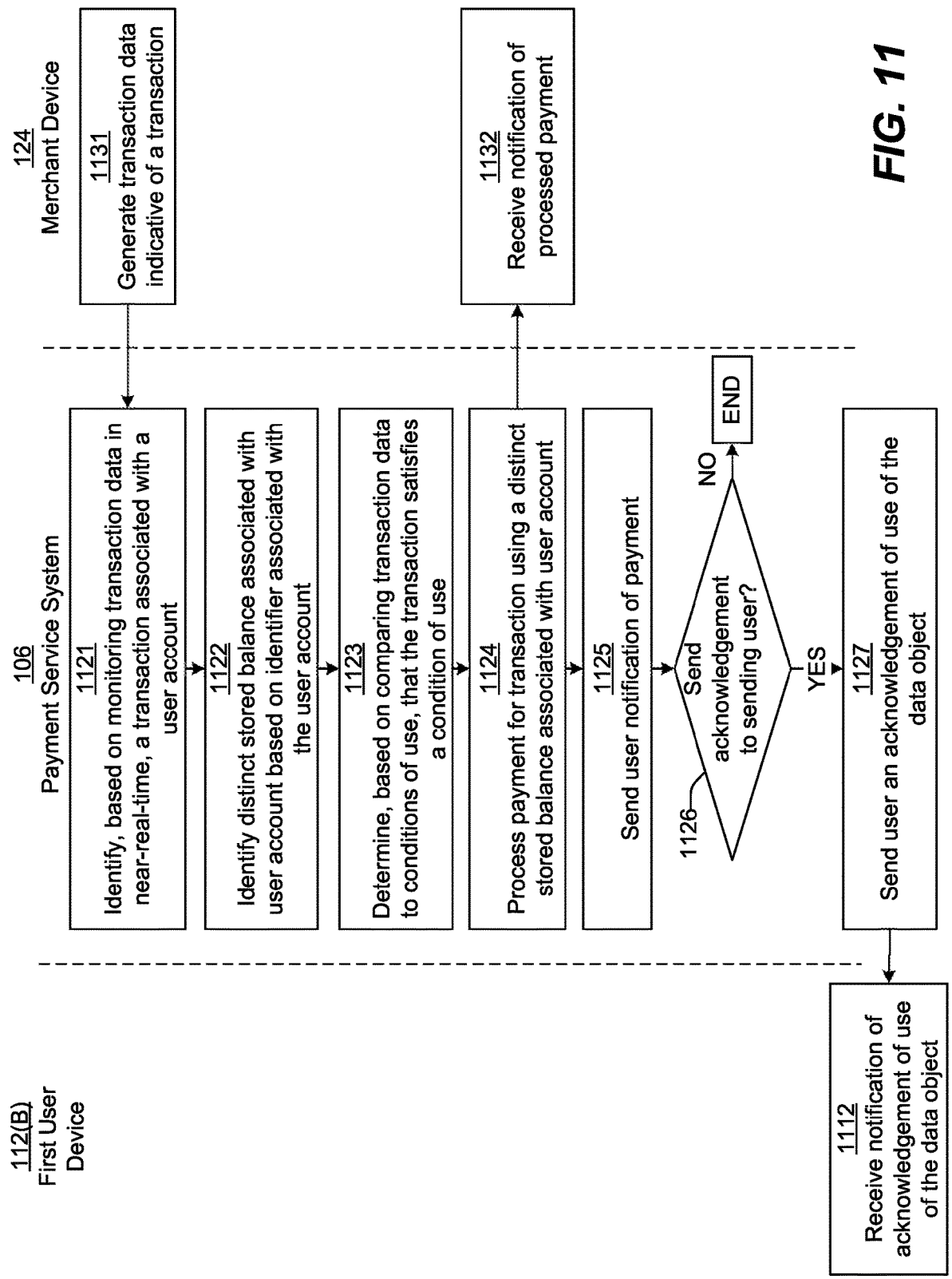
FIG. 11 is a process for using a data object with a transaction according to some embodiments disclosed herein.

FIG. 11 illustrates a process for using a data object with a transaction. FIG. 11 may occur at any time after the process of FIGS. 10A-10B. That is, the receiving user of the second user device 112(A) can perform a transaction using the data object that is received. The payment services component 123 of the payment service system 106 may be monitoring transactions associated with user accounts of the payment service in real-time or near-real-time. At step 1131, transaction data indicative of a transaction is generated. As an example, a merchant device 124 may generate transaction data associated with a transaction with a customer. The merchant device 124, using a POS application 126 associated with the payment service system 106 can receive a payment instrument associated with a user (e.g., a receiving user 114(A). The merchant device 124 can initiate a request for the payment service system 106 to process a transaction and record transaction data associated with the transaction. The merchant device 124 may send the request with the transaction data to a payment services component 123 of the payment service system 106. The transaction data can specify an identifier associated with the user account of the user, including, by way of example, a phone number, email address, alphanumeric identifier. The identifier can be an identifier of a payment instrument associated with the user, which may be associated with the user account. The identifier can further be an identifier of the user device of the user (e.g., a device unique identifier, International Mobile Equipment Identity (IMEI), SIM card number). The identifier can further be an identifier the payment service app executing on the device of the user (e.g., an application identifier). Although illustrated and described as a merchant device 124, a transaction can be initiated from other devices and types of devices, including devices of other users of the payment service system 106 (e.g., in a P2P transaction). Additionally, the merchant device may not necessarily be a merchant device associated with a merchant that is associated with the payment service system 106. For example, the payment services component 123 of the payment service system 106 can receive the transaction data indicative of a transaction as a result of the user using a payment instrument associated with the payment service system 106 to conduct a transaction.

At step 1121, a transaction associated with a user account is identified. The transaction can be identified based on monitoring transaction data in near-real-time. As an example, the payment services component 123 of the payment service system 106 can be monitoring transactions associated with user accounts of the payment service. The payment services component 123 of the payment service system 106 can access transaction data associated with each transaction. The payment services component 123 of the payment service system 106 can identify a transaction that is associated with an identifier associated with a user account. For example, for each transaction received, the payment services component 123 of the payment service system 106 can scan transaction data associated with the transactions for identifiers. The identifiers can include identifiers associated with the user (e.g., email address, phone number, alphanumeric identifier), identifiers associated with a payment instrument of the user (if applicable), an identifier of the user device of the user involved in the transaction (e.g., a device unique identifier, International Mobile Equipment Identity (IMEI), SIM card number), or an identifier the payment service app executing on the device of the user (e.g., an application identifier). Upon determining an identifier, the payment services component 123 of the payment service system 106 can proceed to step 1122.

At step 1122, a distinct stored balance can be identified based at least in part on the identifier associated with the user account. As an example, the payment services component 123 of the payment service system 106 can query the datastore 128 using the identifier to identify a user account associated with the identifier identified from the transaction data. After identifying the user account, the payment services component 123 of the payment service system 106 can determine one or more distinct stored balance associated with the user account. Each distinct stored balance can be associated with one or more conditions of use. As described herein, the conditions of use can be associated with the distinct stored balances when the distinct stored balances are associated with the user account of the user when a corresponding data object is sent to the user.

At step 1123, it is determined if the transaction satisfies a condition of use. As an example, the payment services component 123 of the payment service system 106 can compare the transaction data associated with the transaction with the conditions of use associated with the distinct stored balances associated with the user account. The transaction data, and conditions of use, can relate to a transaction category, a geolocation, a time, an item inclusion list (e.g., using funds for items on the list is permitted), an item exclusion list (e.g., using funds for items on the list is not permitted), particular merchant(s), particular merchant category(s), or the like. The payment services component 123 of the payment service system 106 can determine whether transaction data satisfies the conditions of use of one or more distinct stored balances. If none of the conditions of use associated with any of the distinct stored balances are satisfied, the payment services component 123 of the payment service system 106 can process payment for the transaction using a stored balance associated with the user account identified using the identifier from the transaction data (e.g., a spending stored balance or the like). If the conditions of use associated with more than one distinct stored balance are satisfied, the payment services component 123 of the payment service system 106 can initiate a process (not illustrated) to select one or more of the distinct stored balances to apply to the transaction. As described with respect to at least FIGS. 5A-5C, the payment services component 123 of the payment service system 106 can request the user to select which of the distinct stored balances to apply, can recommend which of the distinct stored balances to apply, or can automatically select which distinct stored balances to apply based on, e.g., application of a set of hierarchical rules or a machine-learning model.

At step 1124, the payment for the transaction can be processed using a distinct stored balance associated with the user account. As an example, the payment services component 123 of the payment service system 106 can process payment for a transaction using the distinct stored balance for which the conditions of use are satisfied by the transaction data. In particular embodiments, the user may not use the distinct stored balance to process the entire balance of the payment. As an example, the distinct stored balance for which the conditions of use are satisfied by the transaction data may not be sufficient to cover the full amount of the transaction or the user may opt not to use the full amount of the distinct stored balance. As described above with respect to at least FIGS. 4A-4C, the payment services component 123 of the payment service system 106 can use an additional balance associated with the user account, such as another distinct stored balance for which the conditions of use are satisfied by the transaction data or a stored balance associated with the user account. The payment services component 123 of the payment service system 106 can allow the user to specify which additional balance to use.

At step 1132, a notification of processed payment using is received. As an example, a merchant device 124 can receive a notification of a processed payment related to the transaction data generated by the merchant device during step 1132. In particular embodiments, the merchant device 124 is not notified that a distinct stored balance was used to process the transaction. This is because the distinct stored balance is maintained by the payment service system 106 on behalf of the user. The merchant device 124 can be completely agnostic to the source of funds used by the payment service system 106 on behalf of the user. In some embodiments, the merchant device 124 may be further notified that a distinct stored balance was used. For example, the merchant associated with the merchant device 124 may wish to thank or reward users who uses data objects associated with distinct stored balances at the merchant.

At step 1125, a user notification of payment can be sent. As an example, the payment services component 123 of the payment service system 106 can send a notification of payment using the distinct stored balance to the user whose user account was identified in the transaction data. The notification of processed payment using the distinct stored balance can be sent to a user device 112(A) of the user (e.g., receiving user 114(B)) as a push notification or in-app notification displayed by a payment service app executing on the user device 112(A). Additionally or alternatively, the notification may be sent using another contact method, such as automated phone call, email, or SMS message.

At step 1126, it is determined whether an acknowledgement of is to be sent to the sending user. As an example, the transfer component 119 of the payment service system 106 determines whether the sending user (e.g., sending user 114(B) of the data object associated with the distinct stored balance used for the transaction is to receive an acknowledgement of use of the data object. The transfer component 119 of the payment service system 106 can determine whether to send the acknowledgement based on user input from the user associated with the user account identified from the transaction data (e.g., receiving user 114(A)). Alternatively, the transfer component 119 of the payment service system 106 can determine whether to send the acknowledgement based on a previously set preference of the user. For example, the receiving user 114(A) of the data object can enable a setting to thank a sending user 114(B) for a data object in response to a transaction that is performed using the distinct stored balance associated with the data object.

If acknowledgement is to be sent, then the process can continue to step 1127, where an acknowledgement of use of the data object is sent. As an example, the transfer component 119 of the payment service system 106 can send a notification to the user (e.g., sending user 114(B)) who sent the data object associated with the distinct stored balance used in the transaction. The notification may be an acknowledgement of use of the data object. The acknowledgement may be a thank you note to the sending user 114(B) who sent the data object to the receiving user 114(A).

At step 1112, a notification of acknowledgement of use of the data object is received. As an example, the first user device 112(B) (e.g., of the sending user 114(B)) can receive a notification of acknowledgement of use of the data object from the transfer component 119 of the payment service system 106 on behalf of the sending user 114(A). The notification may appear as an alert from a payment service app 112(B) executing on the first user device 112(B), as a text message, an email, or the like.

If acknowledgement is not to be sent, then the process can terminate.

Figure 12:
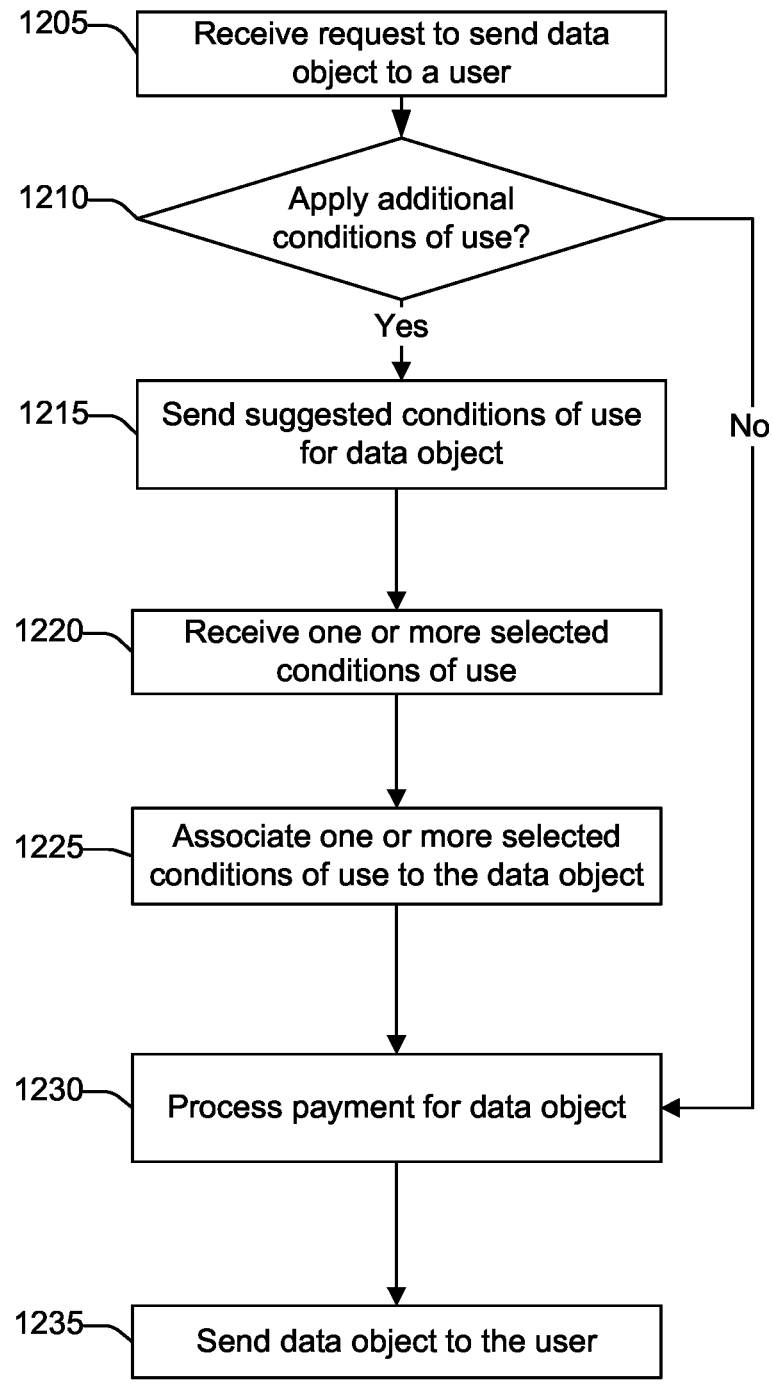
FIG. 12 is a process for sending a data object to a user associated with a payment service according to some embodiments disclosed herein.

FIG. 12 illustrates an example process 1200 for sending a data object to a user associated with a payment service. Example graphical user interfaces corresponding to steps depicted in FIG. 12 are illustrated in FIGS. 2A-2K. The process 1200 may be initiated by a sending user 114(B) who sends a request to the payment service system 106 to send a data object to a receiving user 114(A). At step 1205, a request to send a data object to a user is received. For example, a configuration component 117 of a payment service system 106 receives a request to send a data object to a user. This request can have been initiated by a sending user 114(B) using a payment service app 110(B) installed on a user device 112(B). The request may also have been initiated by a sending user 114(B) using an instant application, which can be a wrapper on a web page. Upon receiving this request, the configuration component 117 can request the sending user 114(B) to provide information as illustrated by FIGS. 2A-2K to specify details of a data object.

At step 1210, whether one or more additional conditions of use are to be applied to the data object may be determined. For example, the configuration component 117 may receive, with the request to send the data object, an initial specification of a condition of use, such as a merchant. The sending user 114(B) may specify whether they wish to add additional conditions of use. As another example, the configuration component 117 may receive further details of the data object from the sending user 114(B) via the user device 112(B) to add one or more conditions of use to be applied to the data object. If there are no additional conditions of use to be applied to the data object (e.g., the initial request included a condition of use that is sufficient for the purposes of the sending user 114(B)), the process 1200 can continue to step 1230, where a transfer component 119 of the payment service system 106 can process the payment for the data object using the initial condition of use. For example, the transfer component 119 can associate the merchant indicated in the initial specification with a distinct stored balance. The transfer component 119 can facilitate the transfer of funds from a stored balance associated with the user account of the sending user to the distinct stored balance to be associated with a user account of a recipient (e.g., receiving user 114(A)).

If the configuration component 117 determines that one or more additional conditions of use are to be applied to a data object, the process 1200 can continue to step 1215, where suggested conditions of use for a data object are sent. For example, the configuration component 117 can use a machine-learning model to process transactions involving data objects to determine one or more conditions of use to suggest for a sending user 114(B) to select as described herein. The configuration component 117 can send the suggested conditions of use for a data object to a user device 112(B) of a sending user 114(B).

At step 1220, one or more selected conditions of use are received. For example, the configuration component 117 can receive one or more selected conditions of use to be applied to a data object. As an example, the configuration component 117 can receive a merchant to restrict transactions using a stored balance associated with the data object. The configuration component 117 can receive the selected conditions of use from a user device 112(B) of the sending user 114(B).

At step 1225, one or more selected conditions of use can be associated with a data object. For example, the configuration component 117 can associate one or more selected conditions of use to a data object. As an example, the configuration component 117 can store the conditions of use associated with the data object within a datastore to be reviewed and checked when performing transactions.

In particular embodiments, the condition can be checked for whether it is associated with a merchant. For example, a configuration component 117 can determine whether the one or more conditions of use associated with the data object is associated with a particular merchant. If the condition is associated with a merchant, the configuration component 117 can determine if a discount for purchasing the data object associated with the merchant is available. As an example, if a restaurant merchant is promoting a special, the restaurant merchant may add a discount to be applied to data objects that have a condition of use associated with the restaurant merchant. If there is a discount for purchasing a data object associated with a merchant, then the configuration component 117 can apply the discount to the purchase of the data object when processing the payment for the data object. The discount can reduce the amount paid by sending user 114(B), but not the amount the sending user 114(B) initially set to send with a data object. For example, the transfer component 119 can facilitate transfer of a distinct stored balance to a user account of receiving user 114(A) based on the amount the sending user 114(B) specified, but only reduce a stored balance 132(B) of the sending user 114(B) by the specified amount subtracting the discount applied to the purchase of the data object.

At step 1230, payment for the data object can be processed. For example, the transfer component 119 can process the payment for the data object using the additional conditions of use. For example, the transfer component 119 can associate all conditions of use indicated to the payment service system 106 with a distinct stored balance. The transfer component 119 can facilitate the transfer of funds from a stored balance associated with the user account of the sending user to the distinct stored balance to be associated with a user account of a recipient (e.g., receiving user 114(A)).

At step 1235, a data object can be sent to a user. For example, the transfer component 119 can send a notification to a user device 112(A) of a receiving user 114(A) indicating that the user received a data object from the sending user 114(B). The transfer component 119 can hold a distinct stored balance associated with the data object until acceptance of the data object is received.

Figure 13:
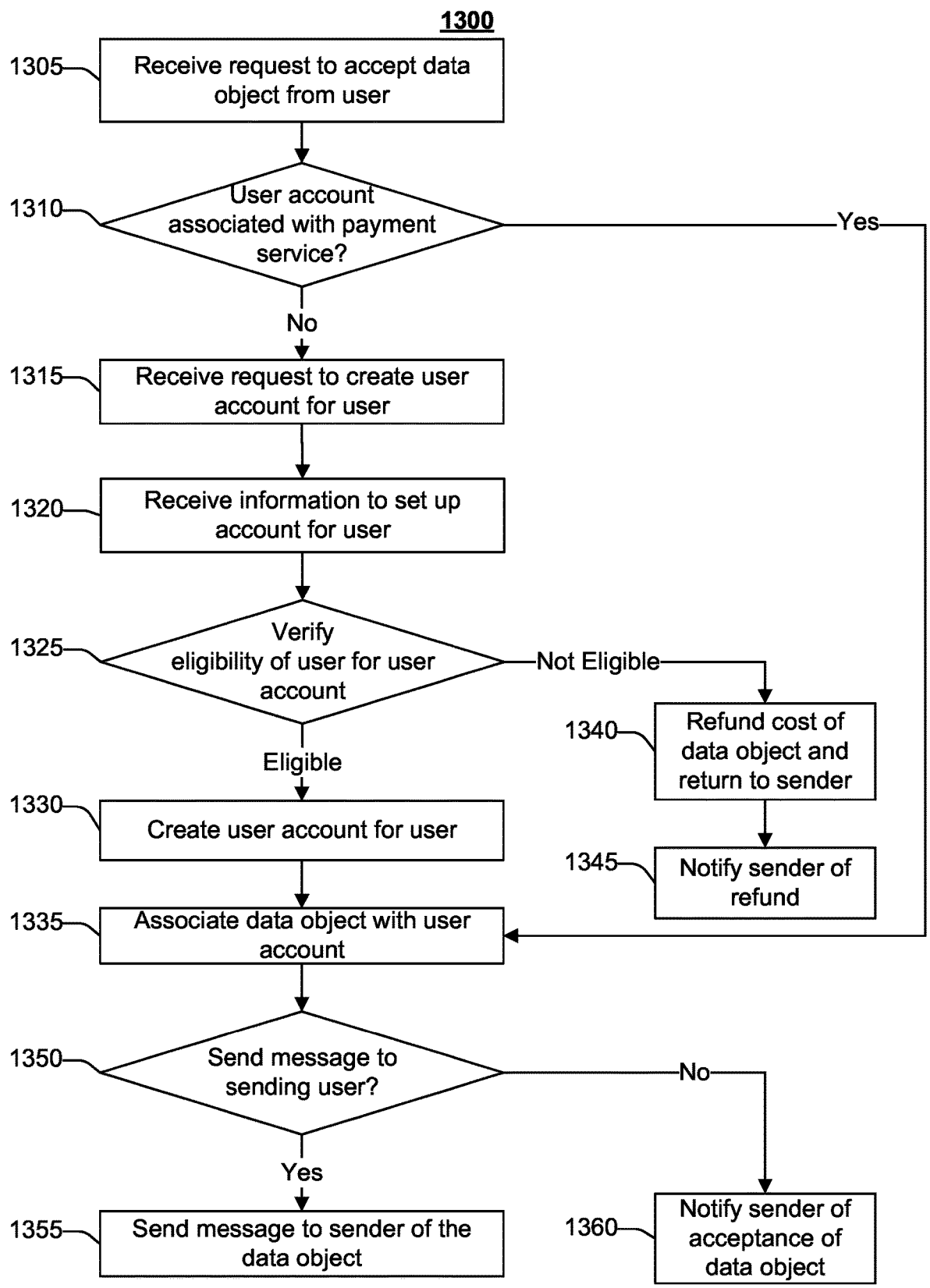
FIG. 13 is a process for receiving a data object according to some embodiments disclosed herein.

FIG. 13 is an example process 1300 for receiving a data object. The process 1300 shown in FIG. 13 may be performed utilizing the payment service system 106 which may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. Example graphical user interfaces corresponding to steps depicted in FIG. 13 are illustrated in FIGS. 3A-3I. the process 1300 may be initiated by a receiving user 114(A) who sends a request to the payment service system 106 to accept a data object from a sending user 114(B).

FIG. 13 is an example process 1300 for receiving a data object. Example graphical user interfaces corresponding to steps depicted in FIG. 13 are illustrated in FIGS. 3A-3I. the process 1300 may be initiated by a receiving user 114(A) who sends a request to the payment service system 106 to accept a data object from a sending user 114(B). At step 1305, a request to accept a data object is received. For example, a transfer component 119 of a payment service system 106 receives a request to accept a data object sent by a sending user 114(B) from a receiving user 114(A). This request can have been initiated by a receiving user 114(A) using a payment service app 110(A) installed on a user device 112(A). The request may also have been initiated by a receiving user 114(A) who downloaded a payment service app 110(A), or a portion thereof, provided by payment service system 106 and installed the payment service app 110(A), or a portion thereof, on the user device 112(A). The request may also have been initiated by a receiving user 114(A) using an instant application, which can be a wrapper on a web page. In some examples, the download can be initiated based on an interaction with an interactive element, such as a quick response (QR) code, barcode, etc.

At step 1310, a determination on whether the receiving user 114(A) has a user account associated with the payment service is made. For example, the transfer component 119 may determine whether the receiving user 114(A) has a unique identifier and a respective user account associated with the payment service. The transfer component 119 can access a datastore 128 to make that determination. The receiving user 114(A) may use a payment service app 110(A) executing on user device 112(A) to receive the data object. If the transfer component 119 determines that the receiving user 114(A) has a user account associated with the payment service, then the process 1300 continues to step 1335, where the transfer component 119 associates a data object with a user account of the receiving user 114(A).

If the transfer component 119 determines that the receiving user 114(A) does not have a user account, then the process 1300 can continue to step 1315. At step 1315, a request to create a user account for a user is received. For example, the transfer component 119 can receive a request from user device 112(A) to create a user account for the receiving user 114(A). The transfer component 119 can initiate an onboarding flow within the payment service app 110(A) for the receiving user 114(A).

At step 1320, information to set up an account is received. For example, the transfer component 119 can receive information from a receiving user 114(A), via a user device 112(A), to set up a user account associated with the payment service. The information may include information required for an onboarding process, such as birthdate, location, email address, phone number, social security number, and the like.

At step 1325, a verification of eligibility of a user for a user account can be made. For example, the transfer component 119 can determine whether the receiving user 114(A) is eligible for a user account, such as verifying information of the receiving user 114(A). The transfer component 119 can create a user account for the receiving user 114(A). If the transfer component 119 determines that the receiving user 114(A) is not eligible to create a user account, then the process 1300 continues to step 1340, where the transfer component 119 can refund the cost of the data object and return the funds to the sender. For example, the transfer component 119 may return the funds to the stored balance 132(B) associated with the user account of the sending user 114(B). After step 1340, the process 1300 can continue to step 1345, where the sending user is notified of the refund. For example, the transfer component 119 can send a notification to a user device 112(B) of the sending user 114(B) notifying the refund of the data object because of the ineligibility of the receiving user 114(A) to create a user account.

If the transfer component 119 determines that the receiving user 114(A) is eligible for a user account, then the process 1300 can continue to step 1330, where a user account for the receiving user 114(A) is created. For example, the transfer component 119 can set up a user account for the receiving user 114(A) by creating a stored balance 132(A) to be associated with the user account of the receiving user 114(A).

At step 1335, the data object can be associated with the user account. For example, the transfer component 119 can associate the data object with the user account of the receiving user 114(A). The transfer component 119 can add a distinct stored balance associated with the stored balance 132(A) of the user account of the receiving user 114(A).

At step 1350, a determination of whether a message should be sent to the sending user. For example, the transfer component 119 may send a notification requesting the receiving user 114(A) to provide an indication on whether the user would like to send a thank you note to the sending user 114(B). As an example, a notification may be pushed to the payment service app 110(A) executing on the user device 112(A) of the receiving user 114(A).

If the transfer component 119 determines that the receiving user 114(A) wishes to send a message to the sending user 114(B), then the process 1300 can continue to step 1355, where a message is sent to the sending user 114(B). For example, the receiving user 114(A) may follow the steps shown in FIGS. 7A-7D to prepare a thank you message to send to the sending user 114(B). After the thank you message is prepared, the user device 112(A) can send the thank you message to the transfer component 119 to send to the user device 112(B) of the sending user 114(B).

If the transfer component 119 determines that the receiving user 114(A) does not want to send a thank you note, then the process 1300 can continue to step 1360, where the sending user 114(B) is notified of an acceptance of the data object. For example, the transfer component 119 can send a notification to the user device 112(B) of the sending user 114(B) to notify the sending user 114(B) of an acceptance of the data object by the receiving user 114(A).

Figure 14:
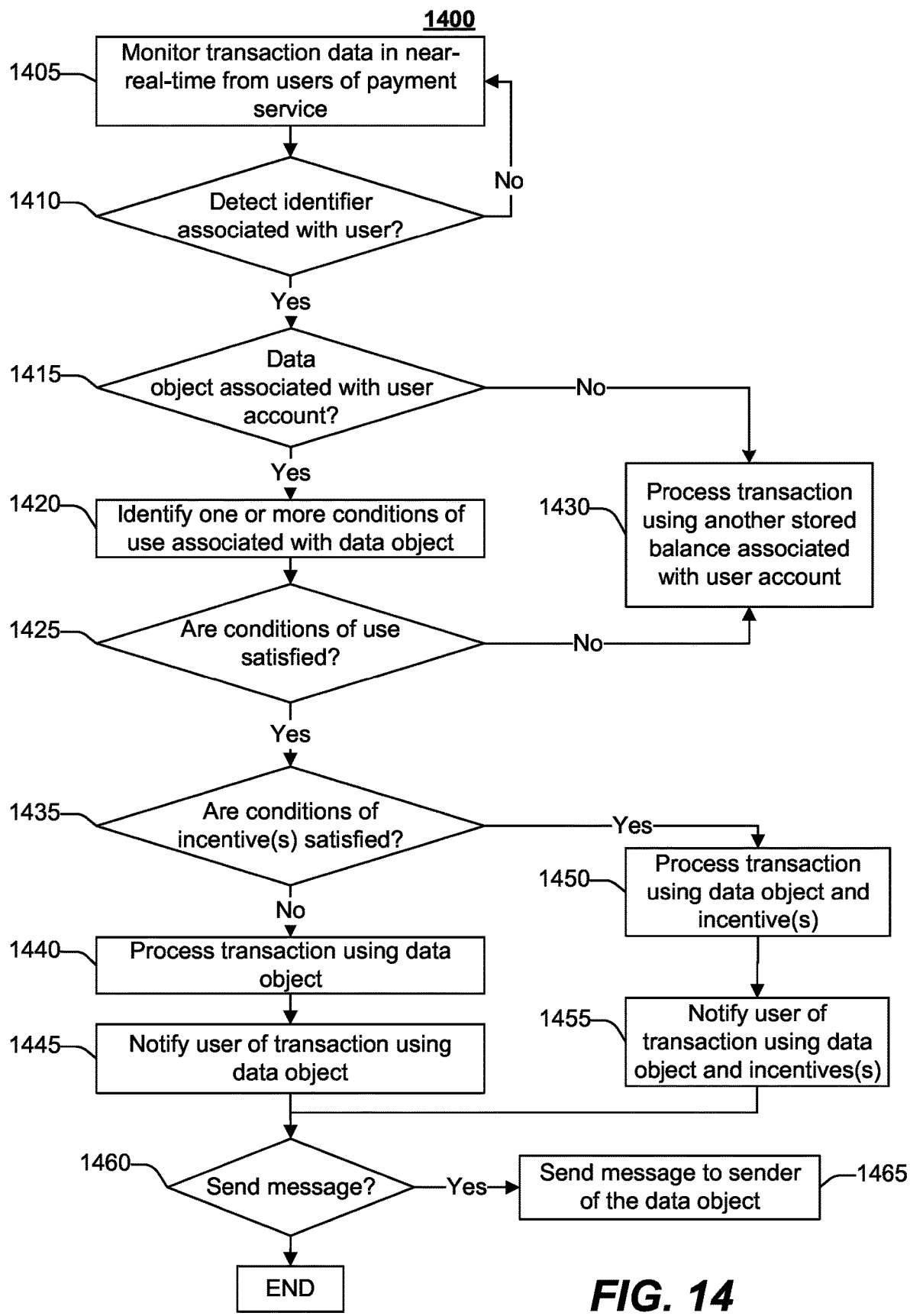
FIG. 14 is a process for using a data object with a transaction according to some embodiments disclosed herein.

FIG. 14 illustrates an example process 1400 for using a data object with a transaction. Example graphical user interfaces corresponding to steps depicted in FIG. 14 are illustrated in FIGS. 4A-5C. the process 1400 may be initiated by a receiving user 114(A) who performs transactions using the data object. At step 1405, transaction data from users of a payment service may be monitored in near-real-time. For example, a payment services component 123 of a payment service system 106 can monitor transaction data from transactions performed by users of the payment service. When a transaction involves a user account associated with the payment service occurs, a ledger event can occur. The transaction history can be stored internally at the payment service system 106 (e.g., a datastore 128) in the form of ledger events attributed to the stored balance and associated with a user account.

At step 1410, a determination of whether an identifier associated with a user of the payment service is detected. For example, the payment services component 123 can monitor the transaction occurring and detect when an identifier associated with particular users is used for a transaction. As an example, the payment services component 123 can specifically detect identifiers associated with users who have a data object associated with their respective user accounts.

If the payment services component 123 does not detect an identifier associated with a user, then the process 1400 can return to step 1405, where the payment services component 123 can continue to monitor transaction data.

If the payment services component 123 does detect an identifier associated with a user, then the process 1400 can continue to step 1415, where a determination of whether a data object is associated with the user account is made. For example, the payment services component 123 may use the identifier to perform a lookup of the user account associated with the identifier and determine whether a data object is associated with the user account. If there is no data object associated with the account, then the process 1400 can continue to step 1430, where the payment services component 123 can process the transaction using another stored balance associated with the user account. For example, the payment services component 123 can deduct an amount associated with the transaction from the stored balance associated with the user account.

If there is a data object associated with the account, then the process 1400 can continue to step 1420, where one or more conditions of use associated with the data object are identified. For example, the payment services component 123 can perform a lookup of the data object to identify one or more conditions of use associated with the stored balance of the data object.

At step 1425, a determination of whether the conditions of use are satisfied is made. For example, the payment services component 123 can identify one or more conditions associated with a transaction based on the transaction data. The payment services component 123 can compare the one or more conditions associated with the transaction to the one or more conditions of use to determine whether the conditions of use have been satisfied. As an example, if a condition of use specifies a merchant, then the payment services component 123 can check to see if the transaction occurred with the specified merchant. If the conditions of use are not met, then the process 1400 can continue to step 1430, where the payment services component 123 can process the transaction using the stored balance associated with the user account.

If the conditions of use have been met, then the process 1400 can continue to step 1435, where a determination of whether the conditions of use associated with use of one or more incentives is satisfied is made. For example, the payment services component 123 can identify one or more conditions associated with use of an incentive with a transaction. The inventive can include, for example, an additional discount for a transaction in which a data object is being used. The payment services component 123 can compare the one or more conditions associated with the incentive with the conditions associated with the transaction to determine whether the conditions of use have been satisfied. As an example, if a condition of use associated with the incentive specifies a minimum amount of the transaction, then the payment services component 123 can check to see if the transaction includes the minimum amount.

If the conditions of use for the one or more incentives are not met, then the process can continue to step 1440, where the transaction is processed using at least a portion of a stored balance associated with the data object. For example, the payment services component 123 can process the transaction by applying an amount of a stored balance associated with the data object towards paying the transaction. The payment services component 123 can update ledgers corresponding to the merchant and the user account when processing the transaction. In particular embodiments, if the transaction uses the entire amount of the stored balance associated with the data object, then the payment services component 123 can use additional sources of funding to pay for the transaction. As an example, the payment services component 123 can use a stored balance associated additional data objects to cover the leftover amount associated with the transaction. In such a case, the process 1400 can return to step 1415 to determine additional data objects associated with the user account. As another example, the payment services component 123 can progress to step 1430 to use a stored balance associated with the user account to pay the leftover amount associated with the transaction.

At step 1445, a user can be notified of the transaction using the data object. For example, the payment services component 123 can send a notification to a user device of the user associated with the user account notifying the user of a transaction using the data object. The notification can appear as a push notification on the user device of the user or can be delivered using another contact method (e.g., automated SMS message, phone call, email, etc.).

If, at step 1435, the conditions of use for the one or more incentives are met, then the process can continue to step 1450, where the transaction is processed using at least a portion of a stored balance associated with the data object and the incentive. As in step 1440, the payment services component 123 can apply an amount of the stored balance associated with the data object towards paying the transaction. Before applying the amount of the stored balance, the payment services component 123 can apply the incentive to, e.g., reduce the amount of the transaction.

At step 1455, a user can be notified of the transaction using the data object and the one or more incentives. For example, the payment services component 123 can send a notification to a user device of the user associated with the user account notifying the user of a transaction using the data object and the one or more incentives. The notification can appear, in some embodiments, as a push notification on the user device of the user or can be delivered using another contact method (e.g., automated SMS message, phone call, email, etc.).

At step 1460, a determination of whether a message should be sent to the sending user is made. For example, the transfer component 119 may send a notification requesting the user to provide an indication on whether the user would like to send a thank you note to the user that sent them the data object as described with respect to step 1350 of process 1300.

If the transfer component 119 determines that the user wishes to send a message to the user, then the process 1400 can continue to step 1465, where a message is sent to the sender of the data object. For example, the user may follow the steps shown in FIGS. 7A-7D to prepare a thank you message to send to the sender of the data object. After the thank you message is prepared, the user device of the user can send the thank you message to the transfer component 119 to send to the user device of the sender of the data object.

If the transfer component 119 determines that the user does not want to send a thank you note, then the process 1400 can terminate.

Particular embodiments may repeat one or more steps of the methods of FIGS. 10A-14, where appropriate. Although this disclosure describes and illustrates particular steps of the methods of FIGS. 10A-14 as occurring in a particular order, this disclosure contemplates any suitable steps of the methods of FIGS. 10A-14 occurring in any suitable order. Moreover, although this disclosure describes and illustrates an example method as described above, including the particular steps of the methods of FIGS. 10A-14, this disclosure contemplates any suitable method for using a data object with a transaction, including any suitable steps, which may include all, some, or none of the steps of the methods of FIGS. 10A-14, where appropriate. Furthermore, although this disclosure describes and illustrates particular components, devices, or systems carrying out particular steps of the methods of FIGS. 10A-14, this disclosure contemplates any suitable combination of any suitable components, devices, or systems carrying out any suitable steps of the methods of FIGS. 10A-14.

Figure 15:
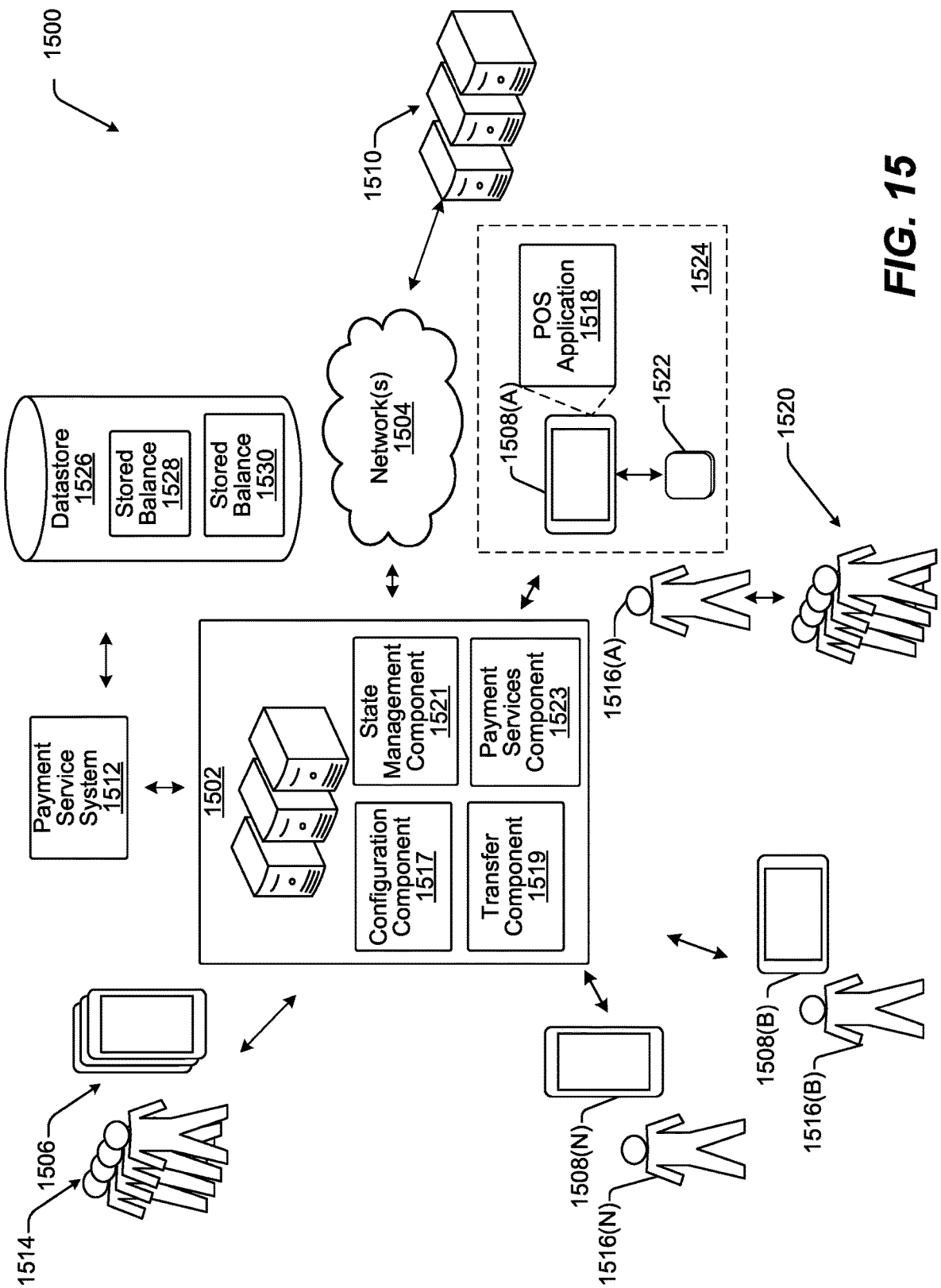
FIG. 15 is an example environment for providing embodiments described herein.

FIG. 15 illustrates an example environment 1500. Individual components of the example environment can correspond to components described above with reference to FIG. 1. In some examples, such corresponding reference numbers are shown in parenthesis following the components of FIG. 15. The environment 1500 includes server(s) 1502 that can communicate over a network 1504 with user devices 1506 (which, in some examples can be merchant devices 1508 (individually, 1508(A)-1508(N))) or server(s) 1510 associated with third-party service provider(s). The server(s) 1502 can be associated with a payment service system 1512 that can provide one or more services for the benefit of users 1514, as described below. Actions attributed to the payment service system 1512 can be performed by the server(s) 1502. As described above, certain elements of the payment service system described with respect to FIG. 1 correspond to similar elements described herein with respect to FIG. 15.

Certain elements of the environment 100 described with respect to FIG. 1 correspond to similar elements described herein with respect to FIG. 15. For example, the server(s) 1502 can correspond to the server(s) 104, the network(s) 1504 can correspond to the network(s) 108, the user device(s) 1506 can correspond to any of the user device(s) 112, the servers 1510 associated with the third-party service provider(s) can correspond to third-party servers 130, the user(s) 1514 can correspond to user(s) 114, merchant(s) 1516 can correspond to merchant(s) 118, merchant device(s) 1508 can correspond to merchant device 124, reader device 1522 can correspond to reader device 122, etc.

Similar to server(s) 104, servers 1502 can store one or more functional components that enable the payment service to perform operations as described herein. For example, the server(s) 104 can store a configuration component 1517 that can correspond to configuration component 117, a transfer component 1519 that can correspond to transfer component 119, a state management component 1521 that can correspond to state management component 121 and a payment services component 1523 that can correspond to payment services component 123. Each component can function similarly to the respective components described in FIG. 1.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as customers, buyers, merchants, sellers, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the payment service system 1512 or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

As described above, in at least one example, the users 1514 can include merchants 1516 (individually, 1516(A)-1516(N)). In an example, the merchants 1516 can operate respective merchant devices 1508, which can be user devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations or can have franchise/franchisee relationships. In additional or alternative examples, the merchants 1516 can be different merchants. That is, in at least one example, the merchant 1516(A) is a different merchant than the merchant 1516(B) or the merchant 1516(C).

For the purpose of this discussion, "different merchants" can refer to two or more unrelated merchants. "Different merchants" therefore can refer to two or more merchants that are different legal entities (e.g., natural persons or corporate persons) that do not share accounting, employees, branding, etc. "Different merchants," as used herein, have different names, employer identification numbers (EIN)s, lines of business (in some examples), inventories (or at least portions thereof), or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations or different commerce channels.

Each merchant device 1508 can have an instance of a POS application 1518 stored thereon. The POS application 1518 can configure the merchant device 1508 as a POS terminal, which enables the merchant 1516(A) to interact with one or more customers 1520. As described above, the users 1514 can include customers, such as the customers 1520 shown as interacting with the merchant 1516(A). For the purpose of this discussion, a "customer" can be any entity that acquires items from merchants. While only two customers 1520 are illustrated in FIG. 15, any number of customers 1520 can interact with the merchants 1516. Further, while FIG. 15 illustrates the customers 1520 interacting with the merchant 1516(A), the customers 1520 can interact with any of the merchants 1516.

In at least one example, interactions between the customers 1520 and the merchants 1516 that involve the exchange of funds (from the customers 1520) for items (from the merchants 1516) can be referred to as "transactions." In at least one example, the POS application 1518 can determine transaction data associated with the POS transactions. Transaction data can include payment information, which can be obtained from a reader device 1522 associated with the merchant device 1508(A), user authentication data, purchase amount information, point-of-purchase information (e.g., item(s) purchased, date of purchase, time of purchase, etc.), etc. The POS application 1518 can send transaction data to the server(s) 1502 such that the server(s) 1502 can track transactions of the customers 1520, merchants 1516, or any of the users 1514 over time. Furthermore, the POS application 1518 can present a UI to enable the merchant 1516(A) to interact with the POS application 1518 or the payment service system 1512 via the POS application 1518.

In at least one example, the merchant device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication based payment instruments, and the like, as described below. In at least one example, the reader device 1522 can plug in to a port in the merchant device 1508(A), such as a microphone port, a headphone port, an audio-jack, a data port, or other suitable port. In additional or alternative examples, the reader device 1522 can be coupled to the merchant device 1508(A) via another wired or wireless connection, such as via a Bluetooth®, BLE, and so on. Additional details are described below with reference to FIG. 18. In some examples, the reader device 1522 can read information from alternative payment instruments including, but not limited to, wristbands and the like.

In some examples, the reader device 1522 may physically interact with payment instruments such as magnetic stripe payment cards, EMV payment cards, or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1522, and communicate with the server(s) 1502, which can provide, among other services, a payment processing service. The server(s) 1502 associated with the payment service system 1512 can communicate with server(s) 1510, as described below. In this manner, the POS terminal and reader device 1522 may collectively process transaction(s) between the merchants 1516 and customers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the customers 1520. In additional or alternative examples, the POS terminal can have a display integrated therein for presenting information to the customers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a customer 1520 and his or her payment instrument are physically present at the time of the transaction. Card-present transactions may be processed by swipes, dips, taps, or any other interaction between a physical payment instrument (e.g., a card), or otherwise present payment instrument, and a reader device 1522 whereby the reader device 1522 is able to obtain payment data from the payment instrument. A swipe is a card-present transaction where a customer 1520 slides a card, or other payment instrument, having a magnetic strip through a reader device 1522 that captures payment data contained in the magnetic strip. A dip is a card-present transaction where a customer 1520 inserts a payment instrument having an embedded microchip (i.e., chip) into a reader device 1522 first. The dipped payment instrument remains in the payment reader until the reader device 1522 prompts the customer 1520 to remove the card, or other payment instrument. While the payment instrument is in the reader device 1522, the microchip can create a one-time code which is sent from the POS system 1524 to the server(s) 1510 (which can be associated with third-party service providers that provide payment services, including but not limited to, an acquirer bank, an issuer, or a card payment network (e.g., Mastercard®, VISA®, etc.)) to be matched with an identical one-time code. A tap is a card-present transaction where a customer 1520 may tap or hover his or her payment instrument (e.g., card, user device such as a smart phone running a payment service app, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file datastore, to complete the transaction.

The POS system 1524, the server(s) 1502, or the server(s) 1510 may exchange payment information and transaction data to determine whether transactions are authorized. For example, the POS system 1524 may provide encrypted payment data, user authentication data, purchase amount information, point-of-purchase information, etc. (collectively, transaction data) to server(s) 1502 over the network(s) 1504. The server(s) 1502 may determine whether user accounts of users involved in the transaction are authorized to perform the transaction. The server(s) 1502 may send the transaction data to the server(s) 1510. As described above, in at least one example, the server(s) 1510 can be associated with third-party service providers that provide payment services, including but not limited to, an acquirer bank, an issuer, or a card payment network (e.g., Mastercard®, VISA®, etc.)

For the purpose of this discussion, the "payment service systems" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1510 associated therewith) can send a fund transfer request to a server computing device of a card payment network (e.g., Mastercard®, VISA®, etc.) to determine whether the transaction is authorized or deficient. In at least one example, the payment service system 1512 can serve as an acquirer and connect directly with the card payment network.

The card payment network (e.g., the server(s) 1510 associated therewith) can forward the fund transfer request to an issuing bank (e.g., "issuer"). The issuer is a bank or financial institution that offers a financial account (e.g., credit or debit card account) to a user. An issuer can issue payment instruments to users and can pay acquirers for purchases made by cardholders to which the issuing bank has issued a payment instrument. The issuer (e.g., the server(s) 1510 associated therewith) can determine whether the customer has the capacity to absorb the relevant charge associated with the payment transaction. In at least one example, the payment service system 1512 can serve as an issuer or can partner with an issuer. The transaction is either approved or rejected by the issuer or the card payment network (e.g., the server(s) 1510 associated therewith), and a payment authorization message is communicated from the issuer to the POS device via a path opposite of that described above, or via an alternate path.

The payment service system 1512 can access a datastore 1526 (e.g., datastore 128) to retrieve one or more of user profiles (e.g., user identifiers, mapping between primary accounts and secondary accounts), user accounts associated with data objects, one or more conditions associated with data objects, stored balance 1528 associated with a sending user, stored balance 1530 associated with a receiving user, and the like as described herein. One of the users 1514 can be a sending user and another one of the users 1514 can be a receiving user.

As described above, the server(s) 1510, which can be associated with payment service provider(s), may determine whether the transaction is authorized based on the transaction data, as well as information relating to parties to the transaction (e.g., the customer 1520 or the merchant 1516(A)). The server(s) 1510 may send an authorization notification over the network(s) 1504 to the server(s) 1502, which may send the authorization notification to the POS system 1524 over the network(s) 1504 to indicate whether the transaction is authorized. The server(s) 1502 may also transmit additional information such as transaction identifiers to the POS system 1524. In one example, the server(s) 1502 may include a merchant application or other functional components for communicating with the POS system 1524 or the server(s) 1510 to authorize or decline transactions. The server(s) 1502 may include functional components that enable the payment service to perform operations as described herein. As a non-limiting example, the server(s) 1502 may maintain a configuration component 1517, a transfer component 1519, a state management component 1521, and a payment services component 1523 that have functionalities similar to the respective configuration component 117, transfer component 119, state management component 121, and payment services component 123 as described herein.

Based on the authentication notification that is received by the POS system 1524 from server(s) 1502, the merchant 1516(A) may indicate to the customer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the payment service system 1512 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1514 can access all of the services of the payment service system 1512. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The payment service system 1512 can offer payment processing services for processing payments on behalf of the merchants 1516, as described above. For example, the payment service system 1512 can provision payment processing software, payment processing hardware or payment processing services to merchants 1516, as described above, to enable the merchants 1516 to receive payments from the customers 1520 when conducting POS transactions with the customers 1520. For instance, the payment service system 1512 can enable the merchants 1516 to receive cash payments, payment instrument payments, or electronic payments from customers 1520 for POS transactions and the payment service system 1512 can process transactions on behalf of the merchants 1516.

As the payment service system 1512 processes transactions on behalf of the merchants 1516, the payment service system 1512 can maintain accounts or balances for the merchants 1516 in one or more ledgers. For example, the payment service system 1512 can analyze transaction data received for a transaction to determine an amount of funds owed to a merchant 1516(A) for the transaction. In at least one example, such an amount can be a total purchase price less fees charged by the payment service system 1512 for providing the payment processing services. Based on determining the amount of funds owed to the merchant 1516(A), the payment service system 1512 can deposit funds into an account of the merchant 1516(A). The account can have a stored balance, which can be managed by the payment service system 1512. The account can be different from a conventional bank account at least because the stored balance is managed by a ledger of the payment service system 1512 and the associated funds are accessible via various withdrawal channels including, but not limited to, scheduled deposit, same-day deposit, instant deposit, and a linked payment instrument.

A scheduled deposit can occur when the payment service system 1512 transfers funds associated with a stored balance of the merchant 1516(A) to a bank account of the merchant 1516(A) that is held at a bank or other financial institution (e.g., associated with the server(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the payment service system 1512 deposits funds from the stored balance to a linked bank account of the merchant on a same day as POS transaction, in some examples prior to the POS transaction being funded) or instant deposits (e.g., wherein the payment service system 1512 deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the payment service system 1512 to the bank account of the merchant 1516(A).

In at least one example, the payment service system 1512 may provide inventory management services. That is, the payment service system 1512 may provide inventory tracking and reporting. Inventory management services may enable the merchant 1516(A) to access and manage a datastore storing data associated with a quantity of each item that the merchant 1516(A) has available (i.e., an inventory). Furthermore, in at least one example, the payment service system 1512 can provide catalog management services to enable the merchant 1516(A) to maintain a catalog, which can be a datastore storing data associated with items that the merchant 1516(A) has available for acquisition (i.e., catalog management services). In at least one example, the catalog may include a plurality of data items and a data item of the plurality of data items may represent an item that the merchant 1516(A) has available for acquisition. The payment service system 1512 can offer recommendations related to pricing of the items, placement of items on the catalog, and multi-party fulfilment of the inventory.

In at least one example, the payment service system 1512 can provide business banking services, which allow the merchant 1516(A) to track deposits (from payment processing or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit or instant deposit, etc. Furthermore, the business banking services can enable the merchant 1516(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the payment service system 1512 can provide financing services and products, such as via business loans, consumer loans, fixed term loans, flexible term loans, and the like. In at least one example, the payment service system 1512 can utilize one or more risk signals to determine whether to extend financing offers or terms associated with such financing offers.

In at least one example, the payment service system 1512 can provide financing services for offering or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the payment service system 1512 can offer different types of capital loan products. For instance, in at least one example, the payment service system 1512 can offer a daily repayment loan product, wherein a capital loan is repaid daily, for instance, from a portion of transactions processed by the payment processing service on behalf of the borrower. Additionally or alternatively, the payment service system 1512 can offer a monthly repayment loan product, wherein a capital loan is repaid monthly, for instance, via a debit from a bank account linked to the payment processing service. The credit risk of the merchant may be evaluated using risk models that consider factors, such as payment volume, credit risk of similarly situated merchants, past transaction history, seasonality, credit history, and so on.

Additionally or alternatively, the payment service system 1512 can provide financing services for offering or lending a loan to a borrower that is to be used for, in some instances, financing the borrower's consumer purchase (e.g., a consumer loan). As described herein, the financing services can involve reporting lending activity to a credit tracking service. In at least one example, a borrower can submit a request for a loan to enable the borrower to purchase an item from a merchant, which can be one of the merchants 1516. The payment service system 1512 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed or maintained by the payment service system 1512 (e.g., from payments owed to the merchant from payments processed on behalf of the merchant, funds transferred to the merchant, etc.). The payment service system 1512 can offer specific financial products, such as payment instruments, tied specifically to the loan products. For example, in one implementation, the payment service system 1512 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan or the parties associated with the loan.

The payment service system 1512 can provide web-development services, which enable users 1514 who are unfamiliar with HTML, XML, Javascript, CSS, or other web design tools to create and maintain professional and aesthetically pleasing websites. Some of these web page editing applications allow users to build a web page or modify a web page (e.g., change, add, or remove content associated with a web page). Further, in addition to websites, the web-development services can create and maintain other online omni-channel presences, such as social media posts for example. In some examples, the resulting web page(s) or other content items can be used for offering item(s) for sale via an online/e-commerce platform. That is, the resulting web page(s) or other content items can be associated with an online store or offering by the one or more of the merchants 1516. In at least one example, the payment service system 1512 can recommend or generate content items to supplement omni-channel presences of the merchants 1516. That is, if a merchant of the merchants 1516 has a web page, the payment service system 1512—via the web-development or other services—can recommend or generate additional content items to be presented via other channel(s), such as social media, email, etc.

Furthermore, the payment service system 1512 can provide payroll services to enable employers to pay employees for work performed on behalf of employers. In at least one example, the payment service system 1512 can receive data that includes time worked by an employee (e.g., through imported timecards or POS interactions), sales made by the employee, gratuities received by the employee, and so forth. Based on such data, the payment service system 1512 can make payroll payments to employee(s) on behalf of an employer via the payroll service. For instance, the payment service system 1512 can facilitate the transfer of a total amount to be paid out for the payroll of an employee from the bank of the employer to the bank of the payment service system 1512 to be used to make payroll payments. In at least one example, when the funds have been received at the bank of the payment service system 1512, the payment service system 1512 can pay the employee, such as by check or direct deposit, often a day, a week, or more after when the work was actually performed by the employee. In additional or alternative examples, the payment service system 1512 can enable employee(s) to receive payments via same-day or instant deposit based at least in part on risk or reliability analyses performed by the payment service system 1512.

Moreover, in at least one example, the payment service system 1512 can provide employee management services for managing schedules of employees. Further, the payment service system 1512 can provide appointment services for enabling users 1514 to set schedules for scheduling appointments or users 1514 to schedule appointments.

In some examples, the payment service system 1512 can provide restaurant management services to enable users 1514 to make or manage reservations, to monitor front-of-house or back-of-house operations, and so on. In such examples, the merchant device(s) 1508 or server(s) 1502 can be configured to communicate with one or more other computing devices, which can be located in the front-of-house (e.g., POS device(s)) or back-of-house (e.g., kitchen display system(s) (KDS)). In at least one example, the payment service system 1512 can provide order management services or fulfillment services to enable restaurants to manage open tickets, split tickets, and so on or manage fulfillment services. In some examples, such services can be associated with restaurant merchants, as described above. In additional or alternative examples, such services can be any type of merchant.

In at least one example, the payment service system 1512 can provide fulfilment services, which can use couriers for delivery, wherein couriers can travel between multiple locations to provide delivery services, photography services, etc. Couriers can be users 1514 who can travel between locations to perform services for a requesting user 1514 (e.g., deliver items, capture images, etc.). In some examples, the courier can receive compensation from the payment service system 1512. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the payment service system 1512 can receive requests for courier services, automatically assign the requests to active couriers, and communicate dispatch instructions to couriers via user interface (e.g., application, web browser, or other access point) presented via respective devices 1506.

In some examples, the payment service system 1512 can provide omni-channel fulfillment services. For instance, if a customer places an order with a merchant and the merchant cannot fulfill the order because one or more items are out of stock or otherwise unavailable, the payment service system 1512 can leverage other merchants or sales channels that are part of the platform of the payment service system 1512 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the payment service system 1512 can enable conversational commerce via conversational commerce services, which can use one or more machine learning mechanisms to analyze messages exchanged between two or more users 1514, voice inputs into a virtual assistant or the like, to determine intents of user(s) 1514. In some examples, the payment service system 1512 can utilize determined intents to automate customer service, offer promotions, provide recommendations, or otherwise interact with customers in real-time. In at least one example, the payment service system 1512 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the payment service system 1512 can provide a peer-to-peer payment service that enables peer-to-peer payments between two or more users 1514 if the users are permitted to send and receive peer-to-peer payments. In at least one example, the payment service system 1512 can communicate with instances of a payment service app (or other access point) installed on devices 1506 configured for operation by users 1514. In an example, an instance of the payment service app executing on a first device operated by a payor can send a request to the payment service system 1512 to transfer an amount of funds (e.g., fiat currency or non-fiat currency such as cryptocurrency, securities, and related assets) from an account of the payor to an account of a payee (e.g., a peer-to-peer payment). The payment service system 1512 can facilitate the transfer and can send a notification to an instance of the payment service app executing on a second mobile device operated by the payee that the transfer is in process (or has been completed). In some examples, the payment service system 1512 can send additional or alternative information to the instances of the payment service app (e.g., low balance to the payor, current balance to the payor or the payee, etc.). In some implementations, the payor or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the payment service system 1512 funds the request to payee on behalf of the payor, to speed up the transfer process and compensate for any lags that may be attributed to payor's financial network.

In some implementations, the payment service system 1512 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer currency, where detection of the syntax (which includes one or more alphanumeric characters tagged by a monetary currency indicator) triggers a transfer of currency. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1506.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the payment service system 1512. For instance, the payment service system 1512 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1506 (e.g., mobile device or conventional personal computer (PC)) based on instructions transmitted to and from the server computing device(s) 1502 (which, in such an example can be called a "messaging server"). In some instances, the messaging application can include a payment service app with messaging capability that enables users of the payment service app to communicate with one another. In such instances, the payment service application can be executed on the user device 1506 based on instructions transmitted to and from the server computing device(s) 1502 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The payment service system 1512 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1514 may be new to the payment service system 1512 such that the user 1514 that has not registered (e.g., subscribed to receive access to one or more services offered by the payment service system 1512) with the payment service system 1512. The payment service system 1512 can offer onboarding services for registering a potential user 1514 with the payment service system 1512. In some examples, onboarding can involve presenting various questions, prompts, and the like to a potential user 1514 to obtain information that can be used to generate a profile for the potential user 1514. In at least one example, the payment service system 1512 can provide limited or short-term access to its services prior to, or during, onboarding (e.g., a user of a peer-to-peer payment service can transfer or receive funds prior to being fully onboarded, a merchant can process payments prior to being fully onboarded, etc.). In at least one example, responsive to the potential user 1514 providing all necessary information, the potential user 1514 can be onboarded to the payment service system 1512. In such an example, any limited or short-term access to services of the payment service system 1512 can be transitioned to more permissive (e.g., less limited) or longer-term access to such services.

The payment service system 1512 can be associated with IDV services, which can be used by the payment service system 1512 for compliance purposes or can be offered as a service, for instance to third-party service providers (e.g., associated with the server(s) 1510). That is, the payment service system 1512 can offer IDV services to verify the identity of users 1514 seeking to use or using their services. Identity verification requires a customer (or potential customer) to provide information that is used by compliance departments to prove that the information is associated with an identity of a real person or entity. In at least one example, the payment service system 1512 can perform services for determining whether identifying information provided by a user 1514 accurately identifies the customer (or potential customer) (i.e., Is the customer who they say they are?). The IDV services can perform analysis of user device contact records, social media information, related bank payment instruments, account records provided by phone number providers, and authenticated or trustworthy accounts (e.g., email addresses associated with ".edu" or ".gov" top-level domains). As an example, the IDV services can analyze the contact records of user devices and cross-match the contact records to determine whether the user is an actual person. As another example, the IDV services can analyze social media information to determine whether the user is an actual person. For instance, if the user is friends with other users of the payment service. The IDV services can verify a user if the user has multiple bank payment instruments with the user's name.

The payment service system 1512 is capable of providing additional or alternative services and the services described above are offered as a sampling of services. In at least one example, the payment service system 1512 can exchange data with the server(s) 1510 associated with third-party service providers. Such third-party service providers can provide information that enables the payment service system 1512 to provide services, such as those described above. In additional or alternative examples, such third-party service providers can access services of the payment service system 1512. That is, in some examples, the third-party service providers can be subscribers, or otherwise access, services of the payment service system 1512.

Techniques described herein can be configured to operate in both real-time/online and offline modes. "Online" modes refer to modes when devices are capable of communicating with the payment service system 1512 (e.g., the server(s) 1502) or the server(s) 1510 via the network(s) 1504. In some examples, the merchant device(s) 1508 are not capable of connecting with the payment service system 1512 (e.g., the server(s) 1502) or the server(s) 1510, due to a network connectivity issue, for example. In additional or alternative examples, the server(s) 1502 are not capable of communicating with the server(s) 1510 due to network connectivity issue, for example. In such examples, devices may operate in "offline" mode where at least some payment data is stored (e.g., on the merchant device(s) 1508) or the server(s) 1502 until connectivity is restored and the payment data can be transmitted to the server(s) 1502 or the server(s) 1510 for processing.

In at least one example, the payment service system 1512 can be associated with a hub, such as an order hub, an inventory hub, a fulfillment hub and so on, which can enable integration with one or more additional payment service systems (e.g., associated with the additional server(s) 1510). In some examples, such additional payment service systems can offer additional or alternative services and the payment service system 1512 can provide an interface or other computer-readable instructions to integrate functionality of the payment service system 1512 into the one or more additional payment service systems.

Techniques described herein are directed to services provided via a distributed system of user devices 1506 that are in communication with one or more server computing devices 1502 of the payment service system 1512. That is, techniques described herein are directed to a specific implementation—or, a practical application—of utilizing a distributed system of user devices 1506 that are in communication with one or more server computing devices 1502 of the payment service system 1512 to perform a variety of services, as described above. The unconventional configuration of the distributed system described herein enables the server(s) 1502 that are remotely-located from end-users (e.g., users 1514) to intelligently offer services based on aggregated data associated with the end-users, such as the users 1514 (e.g., data associated with multiple, different merchants or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the payment service system 1512, and those outside of the control of the payment service system 1512, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1514 and user devices 1506. Furthermore, such features are changed dynamically based on the profiles of the users involved interacting with the GUIs. As such, techniques described herein are directed to improvements to computing systems.

Figure 16:
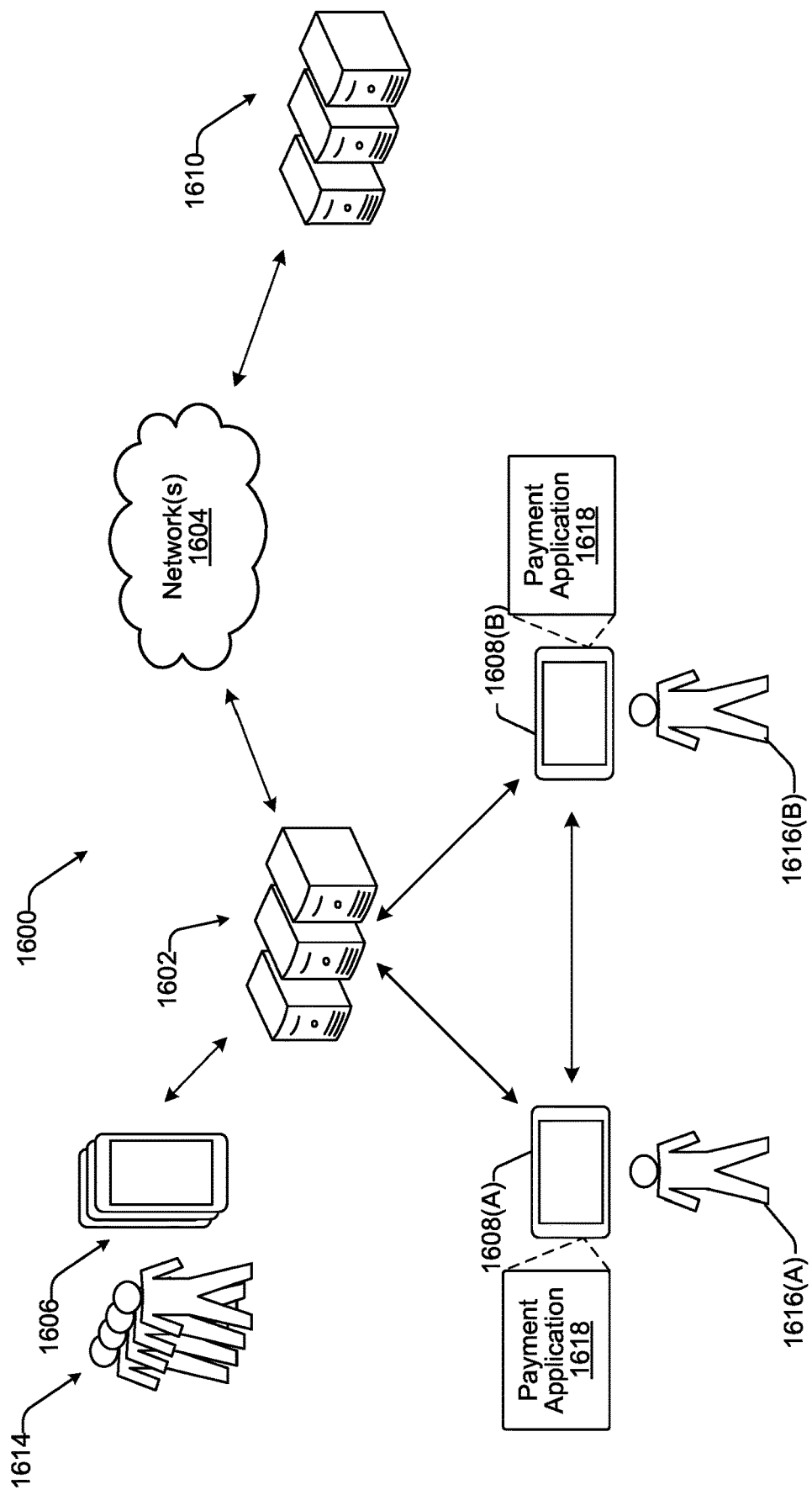
FIG. 16 is another example environment for providing embodiments described herein.

FIG. 16 illustrates an example environment 1600. Individual components of the example environment can correspond to components described above with reference to FIG. 1. In some examples, such corresponding reference numbers are shown in parenthesis following the components of FIG. 16. The environment 1600 includes server(s) 1602 (e.g., servers 104) that can communicate over a network 1604 (e.g., network 108) with user devices 1606 (e.g., user devices 112) which, in some examples can be user devices 1608 (individually, 1608(A), 1608(B)) or server(s) 1610 associated with third-party service provider(s). The server(s) 1602 can be associated with a payment service system (e.g., payment service system 106) that can provide one or more services for the benefit of users 1614 (e.g., users 114), as described below. Actions attributed to the payment service system 1512 can be performed by the server(s) 1602. In some examples, the payment service system 1512 referenced in FIG. 15 can be the same or different than the payment service system referenced in FIG. 16.

The environment 1600 can include a plurality of user devices 1606, as described above. Each one of the plurality of user devices 1606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1614. The users 1614 can be referred to as primary users, secondary users, customers, buyers, merchants, sellers, borrowers, employees, employers, payors, payees, couriers and so on. The users 1614 can interact with the user devices 1606 via user interfaces presented via the user devices 1606. In at least one example, a user interface can be presented via a web browser, or the like. In other examples, a user interface can be presented via an application, such as a mobile application or desktop application, which can be provided by the payment service system or which can be an otherwise dedicated application. In some examples, individual of the user devices 1606 can have an instance or versioned instance of an application, which can be downloaded from an application store, for example, which can present the user interface(s) described herein. In at least one example, a user 1614 can interact with the user interface via touch input, spoken input, or any other type of input.

In at least one example, the payment service system can provide a peer-to-peer payment service that enables peer-to-peer payments between two or more users 1614 for whom the peer-to-peer payment functionalities are enabled. Two users, user 1616(A) and user 1616(B) are illustrated in FIG. 16 as "peers" in a peer-to-peer payment. In some examples user 1616(A) and user 1616(B) can be receiving user 114(A) and sending user 114(B), respectively. In at least one example, the payment service system can communicate with instances of a payment service application 1618 (or other access point) installed on devices 1606 configured for operation by users 1614. In an example, an instance of the payment service application 1618 executing on a first device 1608(A) operated by a payor (e.g., user 1616(A)) can send a request to the payment service system to transfer an asset (e.g., fiat currency, non-fiat currency, cryptocurrency, securities, gift cards, or related assets) from the payor to a payee (e.g., user 1616(B)) via a peer-to-peer payment. In some examples, assets associated with an account of the payor are transferred to an account of the payee. In some examples, assets can be held at least temporarily in an account of the payment service system prior to transferring the assets to the account of the payee. In some examples, the payment service system can confirm that the account of the payer and the payee both have a peer-to-peer payment functionality enabled prior to completing the transfer.

Figure 17:
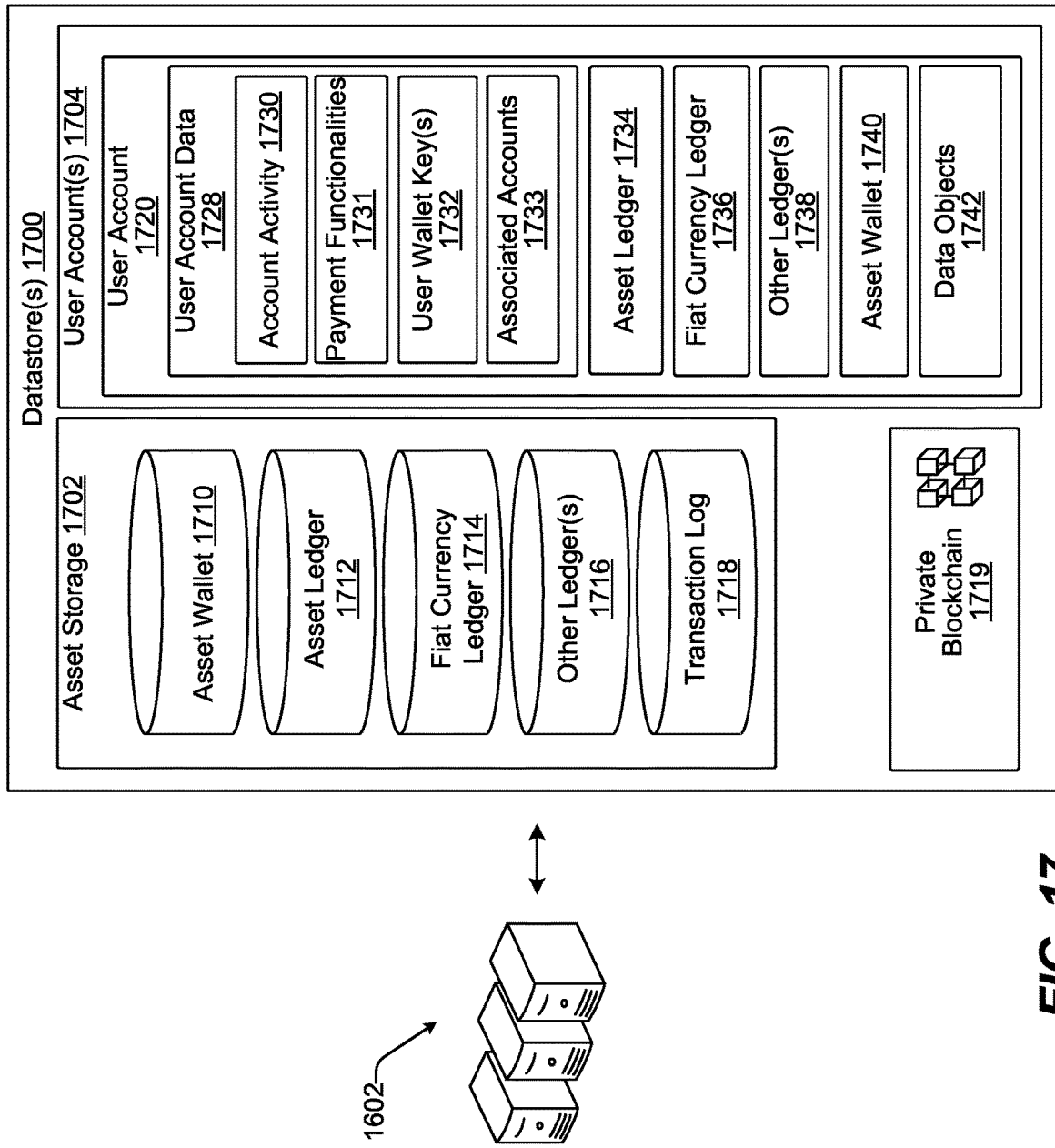
FIG. 17 is an example datastore for providing embodiments described herein.

In some examples, the payment service system can utilize a ledger system to track transfers of assets between users 1606. FIG. 17, below, provides additional details associated with such a ledger system. The ledger system can enable users 1606 to own fractional shares of assets that are not conventionally available. For instance, a user can own a fraction of a Bitcoin or a stock. Additional details are described herein.

In at least one example, the payment service system can facilitate transfers and can send notifications related thereto to instances of the payment service application 1618 executing on user device(s) of payee(s). As an example, the payment service system can transfer assets from an account of user 1616(A) to an account of the user 1616(B) and can send a notification to the user device 1608(B) of the user 1616(B) for presentation via a user interface. The notification can indicate that a transfer is in process, a transfer is complete, or the like. In some examples, the payment service system can send additional or alternative information to the instances of the payment service application 1618 (e.g., low balance to the payor, current balance to the payor or the payee, etc.). In some examples, the payor or payee can be identified automatically, e.g., based on context, proximity, prior transaction history, and so on. In other examples, the payee can send a request for funds to the payor prior to the payor initiating the transfer of funds. In some embodiments, the payment service system funds the request to payee on behalf of the payor, to speed up the transfer process and compensate for any lags that may be attributed to the payor's financial network.

In some examples, the payment service system can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1602 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, or the like can be used to trigger or identify users of a peer-to-peer payment process.

In some examples, the peer-to-peer payment process can be initiated through instances of the payment service application 1618 executing on the user devices 1606. In at least some embodiments, the peer-to-peer process can be implemented within a landing page associated with a user or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The payment service system can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, or any other types of messages. In some examples, the content provider can be the payment service system as described with reference to FIG. 16 or a third-party service provider associated with the server(s) 1610. In examples where the content provider is a third-party service provider, the server(s) 1610 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the payment service system referenced in FIG. 16. For instance, the payment service system can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1606 (e.g., mobile device or conventional personal computer (PC)) based on instructions transmitted to and from the server(s) 1602 (which, in such an example can be called a "messaging server"). In some instances, the messaging application can include a payment service application with messaging capability that enables users of the payment service application to communicate with one another. In such instances, the payment service application can be executed on a user device 1606 based on instructions transmitted to and from the server(s) 1602 (e.g., the payment service discussed in this description or another payment service that supports payment transactions). In some examples, the messaging application can be provided by a third-party service provider associated with the server(s) 1610. In examples where the messaging application is a third-party service provider, the server(s) 1610 can be accessible via one or more APIs or other integrations.

As described above, the payment service system can facilitate peer-to-peer transactions, which can enable users 1606 to transfer fiat currency, non-fiat currency, cryptocurrency, securities, or other assets, or portions thereof, to other users 1606. In at least one example, individual users can be associated with user accounts. Additional details associated with user accounts and the transfer of assets between users 1606 are described below with reference to FIG. 17.

Furthermore, the payment service system of FIG. 16 can enable users 1606 to perform banking transactions via instances of the payment service application 1618 when banking functionalities are enabled for accounts of the users 1606. For example, users can configure direct deposits or other deposits for adding assets to their various ledgers/balances. Further, users 1606 can configure bill pay, recurring payments, or the like using assets associated with their accounts. In addition to sending or receiving assets via peer-to-peer transactions, users 1606 buy or sell assets via asset networks such as cryptocurrency networks, securities networks, or the like.

FIG. 17 illustrates example datastore(s) 1700 that can be associated with the server(s) 1602.

In at least one example, the datastore(s) 1700 can store assets in an asset storage 1702, as well as data in user account(s) 1704, merchant account(s) 1706, or customer account(s) 1708. In at least one example, the asset storage 1702 can be used to store assets managed by the payment service system of FIG. 16. In at least one example, the asset storage 1702 can be used to record whether individual of the assets are registered to users. For example, the asset storage 1702 can include an asset wallet 1710 for storing records of assets owned by the payment service system of FIG. 16, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1610 can be associated therewith. In some examples, the asset wallet 1710 can communication with the asset network via one or more components associated with the server(s) 1602.

The asset wallet 1710 can be associated with one or more addresses and can vary addresses used to acquire assets (e.g., from the asset network(s)) so that its holdings are represented under a variety of addresses on the asset network. In examples where the payment service system of FIG. 16 has its own holdings of cryptocurrency (e.g., in the asset wallet 1710), a user can acquire cryptocurrency directly from the payment service system of FIG. 16. In some examples, the payment service system of FIG. 16 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources or costs. The payment service system can provide the same or similar functionality for securities or other assets.

The asset storage 1702 may contain ledgers that store records of assignments of assets to users 1606. Specifically, the asset storage 1702 may include asset ledger 1712, fiat currency ledger 1714, and other ledger(s) 1716, which can be used to record transfers of assets between users 1606 of the payment service system or one or more third-parties (e.g., merchant network(s), payment card network(s), ACH network(s), equities network(s), the asset network, securities networks, etc.). In doing so, the asset storage 1702 can maintain a running balance of assets managed by the payment service system of FIG. 16. The ledger(s) of the asset storage 1702 can further indicate some of the running balance for each of the ledger(s) stored in the asset storage 1702 is assigned or registered to one or more user account(s) 1704.

In at least one example, the asset storage 1702 can include transaction logs 1718, which can include records of past transactions involving the payment service system of FIG. 16. In at least one example, transaction data, as described herein, can be stored in association with the transaction logs 1718.

In some examples, the datastore(s) 1700 can store a private blockchain 1719. A private blockchain 1719 can function to record sender addresses, recipient addresses, public keys, values of cryptocurrency transferred, or can be used to verify ownership of cryptocurrency tokens to be transferred. In some examples, the payment service system of FIG. 16 can record transactions taking place within the payment service system of FIG. 16 involving cryptocurrency until the number of transactions has exceeded a determined limit (e.g., number of transactions, storage space allocation, etc.). Based at least in part on determining that the limit has been reached, the payment service system of FIG. 16 can publish the transactions in the private blockchain 1719 to a public blockchain (e.g., associated with the asset network), where miners can verify the transactions and record the transactions to blocks on the public blockchain. In at least one example, the payment service system of FIG. 16 can participate as miner(s) at least for its transactions to be posted to the public blockchain.

In at least one example, the datastore(s) 1700 can store or manage accounts, such as user account(s) 1704, merchant account(s) 1706, or customer account(s) 1708. In at least one example, the user account(s) 1704 may store records of user accounts associated with the users 1614. In at least one example, the user account(s) 1704 can include a user account 1720, which can be associated with a user (of the users 1614). Other user accounts of the user account(s) 1704 can be similarly structured to the user account 1720, according to some examples. In other examples, other user accounts may include more or less data or account information than that provided by the user account 1720. In at least one example, the user account 1720 can include user account data 1728, which can include, but is not limited to, data associated with user identifying information (e.g., name, phone number, address, etc.), user identifier(s) (e.g., alphanumeric identifiers, etc.), enabled functionalities (peer-to-peer transactions, lending services, banking services, payment instruments, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1728 can include account activity 1730, payment functionalities 1731, user wallet key(s) 1732, and associated accounts 1733. The account activity 1730 may include a transaction log for recording transactions associated with the user account 1720. The payment functionalities 1731 may include a listing of functionalities provided by a payment service system and a corresponding listing of functionalities enabled for an individual user account. In some examples, the user wallet key(s) 1732 can include a public-private key-pair and a respective address associated with the asset network or other asset networks. In some examples, the user wallet key(s) 1732 may include one or more key pairs, which can be unique to the asset network or other asset networks. In some examples, the associated accounts 1733 may include one or more other user accounts with are associated with an individual user account. For primary accounts, the associated accounts 1733 can include other related primary accounts or secondary accounts for which the primary account is responsible. For secondary accounts, the associated account 1733 may include the related primary account responsible for the secondary account.

In addition to the user account data 1728, the user account 1720 can include ledger(s) for account(s) managed by the payment service system of FIG. 16, for the user. For example, the user account 1720 may include an asset ledger 1734, a fiat currency ledger 1736, or one or more other ledgers 1738. The ledger(s) can indicate that a corresponding user utilizes the payment service system of FIG. 16 to manage corresponding accounts (e.g., a cryptocurrency account, a securities account, a fiat currency account, etc.). It should be noted that in some examples, the ledger(s) can be logical ledger(s) and the data can be represented in a single datastore. In some examples, individual of the ledger (s), or portions thereof, can be maintained by the payment service system of FIG. 16.

In some examples, the asset ledger 1734 can store a balance for each of one or more cryptocurrencies (e.g., Bitcoin, Ethereum, Litecoin, etc.) registered to the user account 1720. In at least one example, the asset ledger 1734 can further record transactions of cryptocurrency assets associated with the user account 1720. For example, the user account 1720 can receive cryptocurrency from the asset network using the user wallet key(s) 1732. In some examples, the user wallet key(s) 1732 may be generated for the user upon request. User wallet key(s) 1732 can be requested by the user in order to send, exchange, or otherwise control the balance of cryptocurrency held by the payment service system of FIG. 16 (e.g., in the asset wallet 1710) and registered to the user. In some examples, the user wallet key(s) 1732 may not be generated until a user account requires such. This on-the-fly wallet key generation provides enhanced security functionalities for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the payment service system of FIG. 16 and the value is credited as a balance in asset ledger 1734), by purchasing currency in the form associated with the account using currency in a different form (e.g., buying a value of cryptocurrency from the payment service system of FIG. 16 using a value of fiat currency reflected in fiat currency ledger 1714, and crediting the value of cryptocurrency in asset ledger 1734), or by conducting a transaction with another user (customer or merchant) of the payment service system of FIG. 16 wherein the account receives incoming currency (which can be in the form associated with the account or a different form, in which the incoming currency may be converted to the form associated with the account). In some examples, the user account data 1728 can include preferences for maintaining balances of individual of the ledgers. For example, the payment service system of FIG. 16 can automatically debit the fiat currency ledger 1736 to increase the asset ledger 1734, or another account associated with the user whenever the cryptocurrency balance (e.g., of the asset ledger 1734) falls below a stated level (e.g., a threshold). Conversely, in some embodiments, the payment service system of FIG. 16 can automatically credit the fiat currency ledger 1736 to decrease the asset ledger 1734 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the payment service system of FIG. 16 (i.e., an external account). In at least one example, the user can transfer all or a portion of a balance of the cryptocurrency stored in the third-party cryptocurrency wallet to the payment service system of FIG. 16. Such a transaction can require the user to transfer an amount of the cryptocurrency in a message signed by user's private key to an address provided by the payment service system of FIG. 16. In at least one example, the transaction can be sent to miners to bundle the transaction into a block of transactions and to verify the authenticity of the transactions in the block. Once a miner has verified the block, the block is written to a public, distributed blockchain where the payment service system of FIG. 16 can then verify that the transaction has been confirmed and can credit the user's asset ledger 1734 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the payment service system of FIG. 16. As described above, in some examples, the payment service system of FIG. 16 can acquire cryptocurrency from a third-party source (e.g., associated with the third-party server(s)). In such examples, the asset wallet 1710 can be associated with different addresses and can vary addresses used to acquire cryptocurrency so that its holdings are represented under a variety of addresses on a blockchain. When the payment service system of FIG. 16 has their own holdings of cryptocurrency, users can acquire cryptocurrency directly from the payment service system of FIG. 16. In some examples, the payment service system of FIG. 16 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the payment service system of FIG. 16 has its own cryptocurrency assets, cryptocurrency transferred in a transaction (e.g., data with address provided for receipt of transaction and a balance of cryptocurrency transferred in the transaction) can be stored in the asset wallet 1710. In at least one example, the payment service system of FIG. 16 can credit the asset ledger 1734 of the user. Additionally, while the payment service system of FIG. 16 recognizes that the user retains the value of the transferred cryptocurrency through crediting the asset ledger 1734, any person that inspects the blockchain will see the cryptocurrency as having been transferred to the payment service system of FIG. 16. In some examples, the asset wallet 1710 can be associated with many different addresses. In such examples, any person that inspects the blockchain may not easily associate all cryptocurrency stored in asset wallet 1710 as belonging to the same entity. It is this presence of a private ledger that is used for real-time transactions and maintained by the payment service system of FIG. 16, combined with updates to the public ledger at other times, that allows for extremely fast transactions using cryptocurrency to be achieved. In some examples, the "private ledger" can refer to the asset ledger 1712, which in some examples, can utilize the private blockchain 1719, as described herein. The "public ledger" can correspond to a public blockchain associated with the asset network.

In at least one example, a user's asset ledger 1734, fiat currency ledger 1736, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1734. In some examples, a user can receive fiat currency or another currency in the form of payment for a transaction with another user. In at least one example, at least a portion of such funds can be converted into cryptocurrency by the payment service system of FIG. 16 and used to fund the asset ledger 1734 of the user.

As addressed above, in some examples, users can also have other accounts maintained by the payment service system of FIG. 16. For example, a user can also have an account in U.S. dollars, which can be tracked, for example, via the fiat currency ledger 1736. Such an account can be funded by transferring money from a bank account at a third-party bank to an account maintained by the payment service system of FIG. 16 as is conventionally known. In some examples, a user can receive fiat currency in the form of payment for a transaction with another user. In such examples, at least a portion of such funds can be used to fund the fiat currency ledger 1736.

In some examples, a user can have one or more internal payment instruments registered with the payment service system of FIG. 16. Internal payment instruments can be linked to one or more of the accounts associated with the user account 1720. In some embodiments, options with respect to internal payment instruments can be adjusted and managed using an application (e.g., the payment service application 1618).

In at least one example, as described above, each ledger can correspond to an account of the user that is managed by the payment service system of FIG. 16. In at least one example, individual of the accounts can be associated with a wallet or a stored balance for use in payment transactions, peer-to-peer transactions, payroll payments, etc.

In at least one example, the user account 1720 can be associated with an asset wallet 1740. The asset wallet 1740 of the user can be associated with account information that can be stored in the user account data 1728 and, in some examples, can be associated with the user wallet key(s) 1732. In at least one example, the asset wallet 1740 can store data indicating an address provided for receipt of a cryptocurrency transaction. In at least one example, the balance of the asset wallet 1740 can be based at least in part on a balance of the asset ledger 1734. In at least one example, funds availed via the asset wallet 1740 can be stored in the asset wallet 1740 or the asset wallet 1710. Funds availed via the asset wallet 1710 can be tracked via the asset ledger 1734. The asset wallet 1740, however, can be associated with additional cryptocurrency funds.

In at least one example, the user account 1720 can be associated with one or more data objects 1742. The data objects 1742 can store data corresponding to a respective stored balance to associate with the user account 1720. The funds associated with the stored balances corresponding to the data objects 1742 can be used as described herein.

In at least one example, when the payment service system of FIG. 16 includes a private blockchain 1719 for recording and validating cryptocurrency transactions, the asset wallet 1740 can be used instead of, or in addition to, the asset ledger 1734. For example, at least one example, a merchant can provide the address of the asset wallet 1740 for receiving payments. In an example where a customer is paying in cryptocurrency and the customer has their own cryptocurrency wallet account associated with the payment service system of FIG. 16, the customer can send a message signed by its private key including its wallet address (i.e., of the customer) and identifying the cryptocurrency and value to be transferred to the merchant's asset wallet 1740. The payment service system of FIG. 16 can complete the transaction by reducing the cryptocurrency balance in the customer's cryptocurrency wallet and increasing the cryptocurrency balance in the merchant's asset wallet 1740. In addition to recording the transaction in the respective cryptocurrency wallets, the transaction can be recorded in the private blockchain 1719 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1734 or asset wallet 1740 are each described above with reference to cryptocurrency, the asset ledger 1734 or asset wallet 1740 can alternatively be used in association with securities. In some examples, different ledgers or wallets can be used for different types of assets. That is, in some examples, a user can have multiple asset ledgers or asset wallets for tracking cryptocurrency, securities, or the like.

It should be noted that user(s) having accounts managed by the payment service system of FIG. 16 is an aspect of the technology disclosed that enables technical advantages of increased processing speed and improved security.

Figure 18:
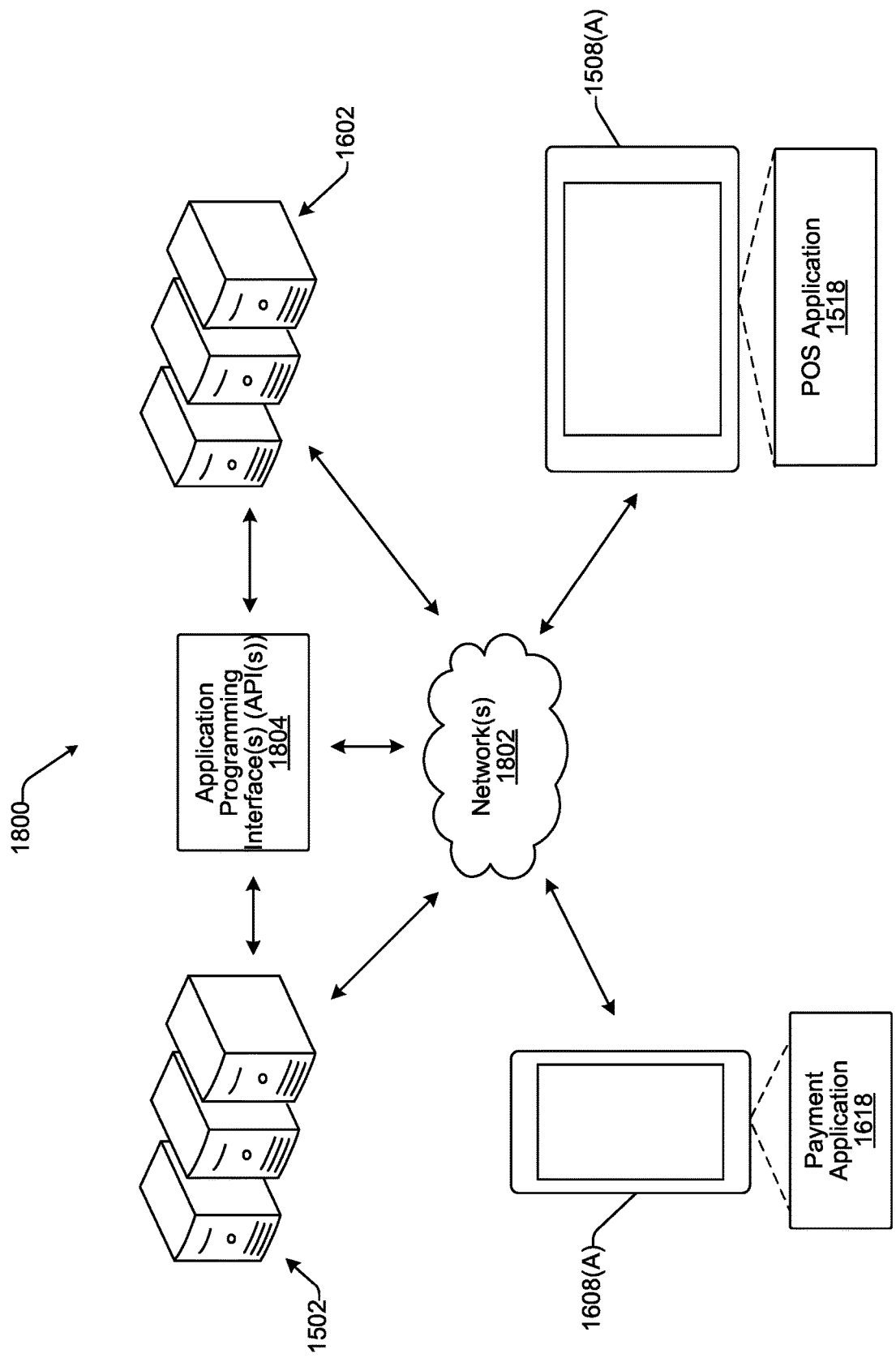
FIG. 18 is another example environment for providing embodiments described herein.

FIG. 18 illustrates an example environment 1800 wherein the environment 1500 and the environment 1600 can be integrated to enable payments at the point-of-sale using assets associated with user accounts in the peer-to-peer environment of FIG. 16. As illustrated, each of the components can communicate with one another via one or more networks 1802. In some examples, one or more APIs 1804 or other functional components can be used to facilitate such communication.

In at least one example, the example environment 1800 can enable contactless payments, via integration of peer-to-peer payment, or other payment making, platform(s) and payment processing platform(s), are described herein. For the purpose of FIG. 18, the environment 1500 can refer to a payment processing platform and the environment 1600 can refer to a peer-to-peer payment, or payment making, platform. In an example, such an integration can enable a customer to participate in a transaction via their own computing device instead of interacting with a merchant device of a merchant, such as the merchant device 1508(A). In such an example, the POS application 1518, associated with a payment processing platform and executable by the merchant device 1508(A) of the merchant, can present a Quick Response (QR) code, or other code that can be used to identify a transaction (e.g., a transaction code), in association with a transaction between the customer and the merchant. The QR code, or other transaction code, can be provided to the POS application. 1518 via an API associated with the peer-to-peer payment platform. In an example, the customer can utilize their own computing device, such as the user device 1608(A), to capture the QR code, or the other transaction code, and to provide an indication of the captured QR code, or other transaction code, to server(s) 1502 or server(s) 1602.

Based at least in part on the integration of the peer-to-peer payment platform and the payment processing platform (e.g., via the API), the server(s) 1502 or 1602 associated with each can exchange communications with each other and with a payment service application 1618 associated with the peer-to-peer payment platform or the POS application 1518—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1608(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1608(A), can be specially, configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1518 and the payment service application 1618, as described herein, can process a payment transaction by routing information input via the merchant application to the payment service application for completing a "frictionless" payment. This can be referred to as "in-application payment." In another example of "in-application payment," the payment service application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1508(A) can present a QR code, or other transaction code, that can be associated with a peer-to-peer payment platform. The customer can use a camera associated with the user device 1608(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed or maintained by the peer-to-peer payment platform, to a stored balance of the merchant, that is managed or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1518 can cause a text message with a resource locator (e.g., uniform resource locator (URL)) that can be associated with a peer-to-peer payment platform to be sent to the user device 1608(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction between the customer and the resource locator presented via the customer computing device can trigger communications between the peer-to-peer payment platform and the payment processing platform (e.g., via an API) to facilitate a transfer of funds from a stored balance of the customer, that is managed or maintained by the peer-to-peer payment platform, to a stored balance of the merchant, that is managed or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online or ecommerce selling channels as well. In such an example, a QR code, or other transaction code, can be presented via an online store/ecommerce web page of a merchant. The customer can use a camera associated with a customer computing device, such as the user device 1608 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed or maintained by the peer-to-peer payment platform, to a stored balance of the merchant, that is managed or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1518 of a merchant device 1508(A) at a brick-and-mortar store of a merchant to a payment service application 1618 of a user device 1608(A) of a customer to enable the customer to participate in a transaction via their own computing device. For instance, in a "scan to pay" example as described above, based at least in part on capturing the QR code, or other transaction code, via the user device 1608(A), the payment processing platform can provide transaction data to the peer-to-peer payment platform for presentation via the payment service application 1618 on the user device 1608(A). In some examples, the customer can watch items being added to their cart (e.g., via a user interface presented via the payment service application). As an item is added to a virtual cart by the merchant via the POS application 1518 on the merchant device 1508(A) of the merchant the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment service application 1618 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1608(A) during or after payment of the transaction.

In some examples, based at least in part on capturing the QR code, or other transaction code, the payment processing platform can provide transaction data to the peer-to-peer payment platform for presentation via the payment service application 1618 on the computing device of the customer, such as the user device 1608(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment service application 1618 to authorize the settlement of the transaction. A response to such a request can provide an express authorization of the customer. In some examples, such an authorization (implicit or express) can be provided prior to a transaction being complete or initialization of a conventional payment flow. That is, in some examples, such an authorization can be provided during cart building (e.g., adding item(s) to a virtual cart) or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment service application 1618 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback or loyalty information via the user interface presented by the payment service application, which can be associated with the transaction.

As described above and also below techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1518, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment service application 1618 (e.g., instead of a native camera, or other sensor), techniques described herein can utilize an indication of the QR code, or other transaction code, received from the payment service application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein e.g., a debit card linked to a stored balance of a customer) such that when the payment instrument is caused to interact with a payment reader, the payment processing platform can exchange communications with the peer-to-peer payment platform to authorize payment for a transaction or provision associated transaction data to a computing device of the customer associated with the transaction.

Figure 19:
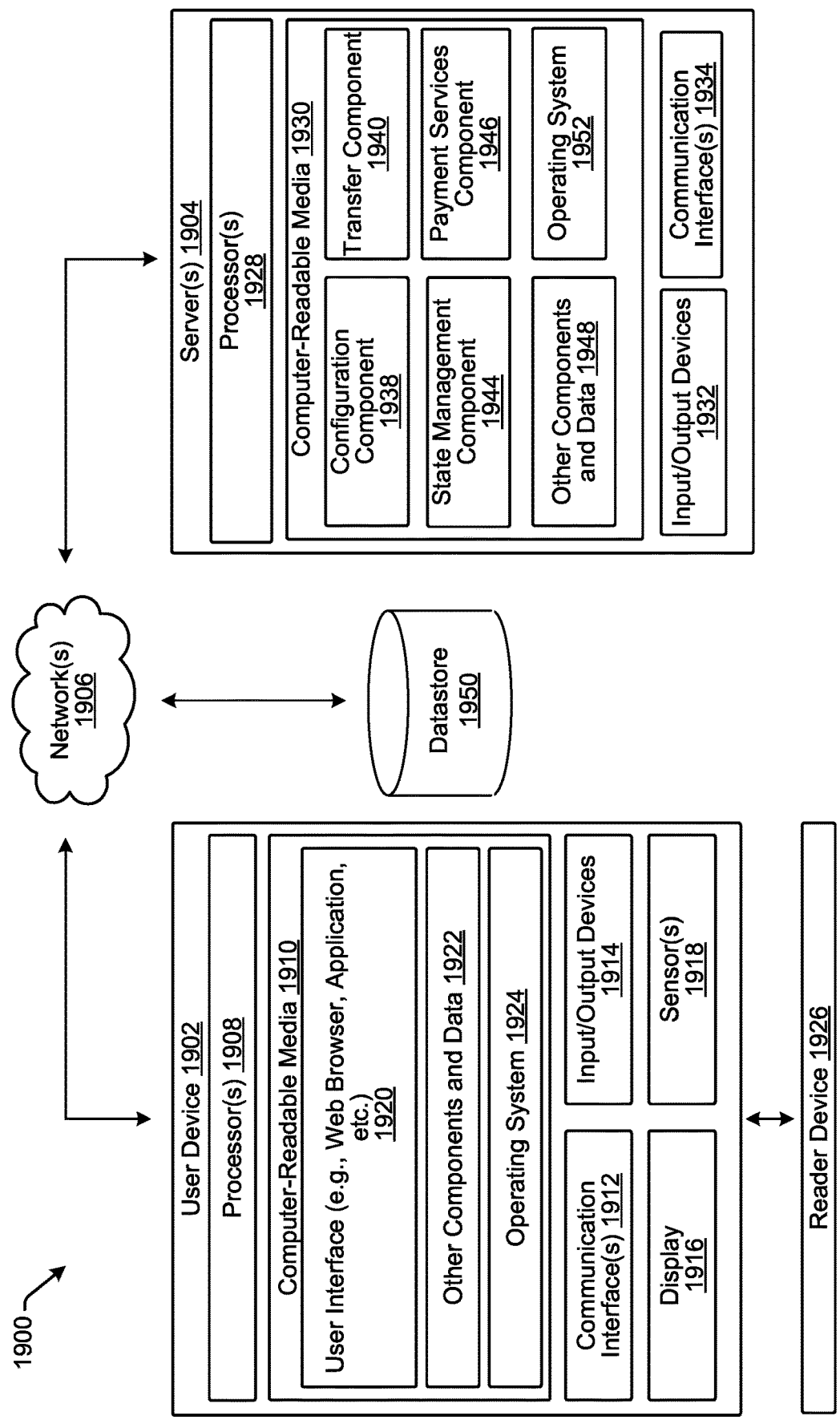
FIG. 19 is an example computer system for providing embodiments described herein.

FIG. 19 depicts an illustrative block diagram illustrating a system 1900 for performing techniques described herein. The system 1900 includes a user device 1902, that communicates with server computing device(s) (e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple user devices, as described above with reference to FIG. 15.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1902 can be any computing device capable of sending communications and performing the functions according to the techniques described herein. The user device 1902 can include devices, e.g., payment instrument readers, or components capable of accepting payments, as described below.

In the illustrated example, the user device 1902 includes one or more processors 1908, one or more computer-readable media 1910, one or more communication interface(s) 1912, one or more input/output (I/O) devices 1914, a display 1916, and sensor(s) 1918.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, or any devices that manipulate signals based on operational instructions. In some examples, the processor(s) 1908 can be one or more hardware processors or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory or removable and non-removable media implemented in any type of technology for storage of information such as computer-readable processor-executable instructions, data structures, program components or other data. The computer-readable media 1910 can include, but is not limited to, RAM, ROM, EEPROM, flash memory, solid-state storage, magnetic disk storage, optical storage, or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, components or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 or other networked devices. In at least one example, the user interface 1920 can be presented via a web browser, or the like. In other examples, the user interface 1920 can be presented via an application, such as a mobile application or desktop application, which can be provided by a payment service system 1512 associated with the server(s) 1904, or which can be an otherwise dedicated application. In some examples, the user interface 1920 can be FIGS. 2A-9D In at least one example, a user can interact with the user interface via touch input, spoken input, gesture, or any other type of input. The word "input" is also used to describe "contextual" input that may not be directly provided by the user via the user interface 1920. For example, user's interactions with the user interface 1920 are analyzed using, e.g., natural language processing techniques, to determine context or intent of the user, which may be treated in a manner similar to "direct" user input.

Depending on the type of the user device 1902, the computer-readable media 1910 can also optionally include other functional components and data, such as other components and data 1922, which can include programs, drivers, etc., and the data used or generated by the functional components. In addition, the computer-readable media 1910 can also store data, data structures and the like, that are used by the functional components. Further, the user device 1902 can include many other logical, programmatic, and physical components, of which those described are merely examples that are related to the discussion herein.

In at least one example, the computer-readable media 1910 can include additional functional components, such as an operating system 1924 for controlling and managing various functions of the user device 1902 and for enabling basic user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi or close-range wireless communications, such as Bluetooth®, BLE, NFC, RFID, a wired network, or any other such network, or any combination thereof. Accordingly, network(s) 1906 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or payment service system interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtually reality display, or any other display able to present or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the user device 1902 may not include the display 1916, and information can be presented by other means, such as aurally, haptically, etc.

In addition, the user device 1902 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, or a switch.

In some example, the GPS device can be used to identify a location of a user. In at least one example, the location of the user can be used by the payment service system 1512, described above, to provide one or more services. That is, in some examples, the payment service system 1512 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1514 or for sending users 1514 notifications regarding available appointments with merchant(s) located proximate to the users 1514. In at least one example, location can be used for taking payments from nearby customers when they leave a geofence, or location can be used to initiate an action responsive to users 1514 enter a brick-and-mortar store of a merchant. Location can be used in additional or alternative ways as well.

Additionally, the user device 1902 can include various other components that are not shown, examples of which include removable storage, a power source, such as a battery and power control unit, a barcode scanner, a printer, a cash drawer, and so forth.

In addition, in some examples, the user device 1902 can include, be connectable to, or otherwise be coupled to a reader device 1926, for reading payment instruments or identifiers associated with payment objects. In some examples, as described above, the reader device 1926 can plug in to a port in the user device 1902, such as a microphone port, a headphone port, an audio-jack, a data port, or other suitable port. In additional or alternative examples, the reader device 1926 can be coupled to the user device 1902 via another wired or wireless connection, such as via a Bluetooth®, BLE, and so on. The reader device 1926 can include a read head for reading a magnetic strip of a payment card, and further can include encryption technology for encrypting the information read from the magnetic strip. Additionally or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her user device such as a smart phone running a payment service application over a payment reader to complete a transaction via short-range communication) to obtain payment data associated with a customer. Additionally or optionally, the reader device 1926 may also include a biometric sensor to receive and process biometric characteristics and process them as payment instruments, given that such biometric characteristics are registered with the payment service system environment 100 and connected to a financial account with a bank server.

The reader device 1926 may include processing unit(s), computer-readable media, a reader chip, a transaction chip, a timer, a clock, a network interface, a power supply, and so on. The processing unit(s) of the reader device 1926 may execute one or more components or processes to cause the reader device 1926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, or one or more operating systems. Depending on the exact configuration and type of the reader device 1926, the computer-readable media may include volatile memory (such as RAM), non-volatile memory (such as ROM, flash memory, miniature hard drive, memory card, or the like), or some combination thereof. In at least one example, the computer-readable media of the reader device 1926 may include at least one component for performing various functions as described herein.

The reader chip may perform functionalities to control the operations and processing of the reader device 1926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1912, which may provide a clock signal indicating a time. Furthermore, the reader chip may perform functionality to control the network interface, which may interface with the network(s) 1906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1902, which can be a POS terminal, and the reader device 1926 are shown as separate devices, in additional or alternative examples, the user device 1902 and the reader device 1926 can be part of a single device, which may be a battery-operated device. In such an example, components of both the user device 1902 and the reader device 1926 may be associated with the single device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks or server farms. The described functionality can be provided by the servers of a single merchant or enterprise, or can be provided by the servers or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units, and can include single or multiple computing units or multiple processing cores. The processor(s) 1928 can be implemented as one or more microprocessors, microcomputers, microcontrollers, digital signal processors, central processing units, state machines, logic circuitries, or any devices that manipulate signals based on operational instructions. For example, the processor(s) 1928 can be one or more hardware processors or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory or removable and non-removable media implemented in any type of technology for storage of information, such as computer-readable instructions, data structures, program components, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the payment service system 1512 or payment processing service. Functional components stored in the computer-readable media 1930 can optionally include a configuration component 1938, a transfer component 1940, a state management component 1944, and a payment services component 1946, one or more other components and data 1948, or the like. Of course, additional or alternative components can be used for performing operations as described herein and, in some examples, one or more of the components can be combined. In some examples, the components of server(s) 1904 can correspond to one or more components of payment service system 106. As an example, in some embodiments, configuration component 117 can correspond to configuration component 1938. As another example, transfer component 119 can correspond to transfer component 1940. As another example, state management component 121 can correspond to state management component 1944. As another example, payment services component 123 can correspond to payment services component 1946. Although a particular arrangement of components is described, any arrangement of components is contemplated. Further, in some examples, additional or alternative components can perform operations as described herein and some components can perform other operations than those described herein.

The configuration component 1938 can be configured to associated conditions of use to data objects associated with a user account. The configuration component 1938 can maintain a stored balance associated with each data object associated with a user account. The configuration component 1938 can access one or more data objects associated with a user account to determine whether the one or more stored balances associated with the one or more data objects may be used for a transaction. The configuration component 1938 can access the conditions of use associated with one or more data objects associated with a user account to identify whether any of the one or more data objects can be used for a transaction.

The configuration component 1938 can be configured to generate one or more recommendations of condition(s) of use to associate with a data object. When a sending user request to send a data object, the configuration component 1938 can use one or more machine-learning models to determine whether to send one or more recommended condition(s) of use as described herein. The configuration component 1938 can send the one or more recommended condition(s) of use to the user interface of the user device associated with the sending user when the sending user is in the process of sending the data object to a receiving user.

The transfer component 1940 can be configured to handle the process of generating acknowledgements of data objects. The transfer component 1940 can log whenever an acknowledgement has been made with respect to a data object. If an acknowledgement has not yet been made for a data object and a transaction using the data object occurs, the transfer component 1940 can send a notification to the user device of the receiving user to request whether the receiving user would like to send an acknowledgement of the data object. As an example, the receiving user can be prompted to send a thank you note to the sending user of the data object.

A transfer component 1940 can be configured to manage the onboarding process for primary users and secondary users alike. The transfer component 1940 can be configured to handle the dynamic modification of the onboarding flow to include additional or alternative steps based on user data, as described above. When the transfer component 1940 determines that a user is not eligible for a primary account, the transfer component 1940 can initialize an alternative onboarding flow that can request alternative (e.g., different, more, or less) information and authorization of a primary user. As described above, techniques described herein can leverage various efficiencies (e.g., pre-approvals, etc.) to streamline the onboarding process for primary and secondary users.

The payment services component 1946 can be configured to receive payment requests from user devices, such as the user device 1902. In at least one example, a payment request can be associated with data indicating a sender, a recipient, and an amount of a payment. In at least one example, the payment services component 1946 can identify relevant sender and recipient accounts and can facilitate a P2P payment. The payment services component 1946 can access a ledger to update the balance of the relevant sender and recipient accounts to facilitate the P2P payment.

The payment services component 1946 can be configured to receive transaction data from POS systems, such as the POS system 1524 described above with reference to FIG. 15. The payment services component 1946 can transmit requests (e.g., authorization, capture, settlement, etc.) to payment service server computing device(s) to facilitate POS transactions between merchants and customers. The payment services component 1946 can communicate the successes or failures of the POS transactions to the POS systems. In some examples, the payment services component 1946 can receive transaction data from other sources associated with merchants, such as merchant applications or POS applications executing on merchant devices, merchant websites or ecommerce sites, or the like.

It should be noted that payment requests and transaction data can be received in real-time or near-real-time such that the payment service system can monitor interactions of users, with permission, over time. Such monitoring can enable activity tracking as described herein. The payment service system may monitor transaction data of the receiving user in real-time or near-real-time. In some examples, the payment service can access a datastore to determine whether conditions of use are satisfied for data objects associated with a user account of the receiving user. For example, the payment service system may review the conditions of use for the data objects associated with the user account of the receiving user and apply one or more stored balances associated with data objects to the transaction with the merchant based on whether the conditions of use have been satisfied.

The payment services component 1946 can be configured to train models using machine-learning mechanisms. For example, a machine-learning mechanism can analyze training data to train a data model that generates an output, which can be a recommendation, a score, or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1902 or the server(s) 1904 for use at a time after the data models have been trained (e.g., at runtime).

The payment services component 1946 can be configured to process transactions to determine whether one or more conditions are satisfied when a data object is used with a transaction. The payment services component 1946 can be configured to access context data associated with the user device of the receiving user to determine whether the one or more condition(s) of use are satisfied. For example, the payment services component 1946 can access a location of the user device of the secondary user to match a geographic condition for transactions. For instance, if the one or more condition(s) of use include a particular merchant and the transaction data indicates that the transaction occurred at the particular merchant, then the stored balance associated with a data object can be used for a transaction.

The payment services component 1946 can be configured to monitor user interactions on the payment service system. As an example, the payment services component 1946 can monitor transactions of a secondary account. The payment services component 1946 can receive incentives from one or more entities, such as a payment service system, a primary user, or one or more merchants. The incentives may indicate a goal or behavior to achieve prior to receiving the incentive. The incentives may indicate an incentive rewarding event to be performed to obtain the respective incentives. As an example, the incentive rewarding event may include a savings goal (e.g., save $50, periodically put money into savings, periodically put a threshold amount of money into savings, etc.), bill repayment goal (e.g., paying bills on time), conducting one or more transactions (e.g., purchasing first cryptocurrency, purchasing first stock, buying five stocks, etc.), and the like. The incentive rewarding event can specify one or more metrics to be performed in order to receive a corresponding incentive. As an example, the incentive rewarding event can specify that a user saves $100 within a month. In response to the user saving $100 within a month, an entity (e.g., payment service system, merchant, etc.) that provided the incentive can reward the user for the incentive rewarding event (e.g., saving $100 within a month). The payment services component 1946 can monitor the transactions of a user account and determine whether an incentive is applicable for the user account. If the payment services component 1946 determines that an incentive is applicable for a user account, the incentive monitoring component can apply the incentive to the user account.

The payment services component 1946 can be configured to monitor transaction data associated with users of the payment service. The payment services component 1946 can monitor the transaction data to identify a unique identifier associated with a user account associated with a user of the payment service. The payment services component 1946 can initiate a process of facilitate a use of a data object towards a transaction.

The one or more other components and data 1948 can include programs, drivers, etc., and the data used or generated by the functional components. Further, the server(s) 1904 can include many other logical, programmatic, and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the payment service system to allow third-party developers to include payment service system functionality or avail payment service system services in association with their own third-party applications. Additionally or alternatively, in some examples, the payment service system can utilize a SDK to integrate third-party service provider functionality into its applications. That is, API(s) or SDK(s) can enable third-party developers to customize how their respective third-party applications interact with the payment service system or vice versa.

The computer-readable media 1930 can additionally include an operating system 1952 for controlling and managing various functions of the server(s) 1904.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, such as a local area network or a wide area network, such as the Internet, and can include a wireless network, such as a cellular network, a local wireless network, such as Wi-Fi or close-range wireless communications, such as Bluetooth®, BLE, NFC, RFID, a wired network, or any other such network, or any combination thereof. Accordingly, network(s) 1902 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

In at least one example, the system 1900 can include a datastore 1950 that can be configured to store data that is accessible, manageable, and updatable. In some examples, the datastore 1950 can be integrated with the user device 1902 or the server(s) 1904. In other examples, as shown in FIG. 19, the datastore 1950 can be located remotely from the server(s) 1904 and can be accessible to the server(s) 1904. The datastore 1950 can comprise multiple databases or servers connected locally or remotely via the network(s) 1906.

In at least one example, the datastore 1950 can store user profiles, which can include merchant profiles, customer profiles, and so on. The datastore 1950 can store settings for user accounts, such as enabled functionalities for secondary accounts. The datastore 1950 can store mappings between primary accounts and secondary accounts. The datastore 1950 can store balances associated with each account. For example, the datastore 1950 can store separated balances for a primary account and an associated secondary account. The datastore 1950 can maintain balances associated with conditional currency.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized or total spends of each of the transactions, parties to the transactions, dates, times, or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the payment service system 1512.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) 1704, described above with reference to FIG. 17, can include or be associated with the merchant profiles or customer profiles described above.

Furthermore, in at least one example, the datastore 1950 can store inventory database(s) or catalog database(s). As described above, an inventory can store data associated with a quantity of each item that a merchant has available to the merchant. Furthermore, a catalog can store data associated with items that a merchant has available for acquisition. The datastore 1950 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. In some embodiments, one or more blocks of the process can be omitted entirely. Moreover, the methods can be combined in whole or in part with each other or with other methods.

The above Detailed Description of embodiments of the disclosure is not intended to be exhaustive or to limit the invention to the precise form disclosed above. While specific examples for the invention are described herein for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

The appended claims may serve as a summary of the invention. Various embodiments are disclosed in the Detailed Description and the appended claims and can be directed to a method, a storage medium, a system and a computer program product; any feature recited in one claim category such as a method can be embodied in a claim in another category such as a system. The dependencies or references back in the appended claims are recited only for formal reasons. Any subject matter resulting from a reference back to any previous claims is within the scope of the disclosure, so that any combination of claims and the features thereof are disclosed and can be claimed regardless of the dependencies recited in the attached claims. The disclosure encompasses not only the combinations recited in the appended claims but also any other combination of features in the claims. Thus, the disclosure includes each feature recited in the claims in combination with any other feature or combination of other features in the claims. Furthermore, any of the embodiments and features described or depicted herein can be claimed in a separate claim or in any combination with any embodiment or feature described or depicted herein or with any of the features of the attached claims.

As a non-limiting example, in one or more embodiments, a computing device of a payment service can receive a request to send a digital gift card to a user that is associated with a user account and a stored balance managed by the payment service, wherein the stored balance associated with the user account is accessible via a payment instrument provisioned to the user account. The computing device can associate an amount of the digital gift card with a distinct stored balance associated with the user account, wherein the distinct stored balance is associated with a condition of use and is separate from the stored balance. The computing device can cause the digital gift card to be rendered via a user interface presented by an application, provided by the payment service, executing on a device of the user, wherein the user interface includes additional data associated with at least one of the user account, the stored balance, or the payment instrument. The computing device can monitor, in real-time, transaction data associated with users of the payment service. The computing device can identify, from the transaction data, a transaction associated with an identifier of the payment instrument. The computing device can access, using the identifier, the user account. The computing device can based on a determination, using at least a portion of the transaction data associated with the transaction, that the transaction satisfies the condition of use of the distinct stored balance, process payment for the transaction using the distinct stored balance prior to using the stored balance.

As a non-limiting example, in one or more embodiments, a computing device of a payment service can receive a second request to send a second digital gift card to the user. The computing device can associate a second amount of the second digital gift card with a second distinct stored balance associated with the user account, wherein the second distinct stored balance is associated with a second condition of use. The computing device can determine that the condition of use corresponds with second condition of use. The computing device can aggregate the distinct stored balance with the second distinct stored balance to generate a third distinct stored balance. The computing device can based on a determination, using at least a portion of the transaction data associated with the transaction, that the transaction satisfies a second condition of use associated with an incentive, apply the incentive to the transaction while processing the payment for the transaction using the distinct stored balance.

The request to send the digital gift card can be received from a primary user with a primary account, wherein the user can be a secondary user with a secondary account mapped to the primary account, and wherein the condition is configured by the primary user.

As a non-limiting example, in one or more embodiments, a computing device of a payment service can determine to associate a data object with a user account that is associated with a stored balance managed by the payment service. The computing device can associate an amount of the data object with a distinct stored balance associated with the user account, wherein the distinct stored balance is associated with a condition of use. The computing device can monitor transaction data associated with users of the payment service. The computing device can identify, from the transaction data, a transaction associated with an identifier associated with the user account. The computing device can based on a determination that the user account is associated with the data object, use at least a portion of the transaction data associated with the transaction to determine whether the transaction satisfies the condition of use. The computing device can based at least in part on a determination that the transaction satisfies the condition of use, process payment for the transaction using at least a portion of the distinct stored balance prior to using the stored balance.

As a non-limiting example, in one or more embodiments, a computing device of a payment service can cause the data object to be rendered via a user interface presented by an application associated with the payment service and execute on a device of a user associated with the user account, wherein the user interface includes additional data identifying a sender of the data object, the condition of use, the amount of the distinct stored balance, or associated with at least one of the user account or the stored balance. The stored balance can be accessible via a payment instrument provisioned to the user account, wherein the payment instrument comprises a physical payment card or a virtual payment card, and wherein the identifier is associated with the payment instrument. The determining to associate the data object with the user account can be based on receiving a request from a device of a first user to send the data object to a second user that is associated with the user account. The determining to associate the data object with the user account can be based on a determination that the user account has satisfied a condition for receiving an incentive.

As a non-limiting example, in one or more embodiments, a computing device of a payment service can cause the data object to be rendered via a user interface presented by an application associated with the payment service and executing on a device of a user associated with the user account, wherein the rendered data object is associated with at least one of a graphical design or animation associated with the event. The identifier can be an identifier of one or more of the user account, a payment instrument, a device of the user, or an application associated with the payment service and executing on the device of the user. The computing device can receive, from a device of the user, a request to add an additional amount to the data object, wherein the request identifies a second user based at least in part on a second identifier associated with the second user. The computing device can receive, from a second device of the second user, confirmation to approve the request to add the additional amount to the data object. The computing device can process payment for the request to add the additional amount to the data object using a second stored balance associated with a second user account of the second user. The computing device can generate one or more recommended conditions of use to associate with the distinct stored balance. The computing device can determine to associate the condition of use, from the one or more recommended conditions of use, with the distinct stored balance. The computing device can, subsequent to processing payment for the transaction using the distinct stored balance, cause a user interface presented by an application associated with the payment service and executing on a device of the user, to display an interactive prompt, wherein the interactive prompt is configured to send an acknowledgement of use to a sender of the data object.

As a non-limiting example, in one or more embodiments, a computing device of a payment service can identify a second data object associated with the user account, the second data object is associated with a second distinct stored balance of a second amount, wherein the second distinct balance is associated with a second condition of use. The computing device can, based on a second determination, use at least the portion of the transaction data associated with the transaction, that the transaction satisfies the second condition of use, processing payment for the transaction using at least a second portion of the second distinct balance. The computing device can identify a second data object associated with the user account, the second data object is associated with a second distinct stored balance of a second amount, wherein the second distinct balance is associated with a second condition of use. The computing device can, based on a second determination, use at least the portion of the transaction data associated with the transaction, that the transaction satisfies the second condition of use, selecting, based at least in part on context data associated with the transaction, the distinct stored balance instead of the second distinct stored balance for processing payment for the transaction.

As a non-limiting example, in one or more embodiments, a computing device of a payment service can identify, in transaction history associated with the user account, a second transaction, wherein the second transaction is associated with second transaction data. The computing device can, based on a second determination, using at the second transaction data associated with the second transaction, that the second transaction satisfies a second condition of use associated with a second data object associated with the user account, credit the stored balance using at least a second portion of a second distinct stored balance associated with the second data object, wherein at least the second portion corresponds to a cost of the second transaction. The conditions of use can comprise one or more of a transaction category, a geolocation, a time, an item inclusion list, an item exclusion list, one or more merchants, or one or more merchant categories. The computing device can determine that the distinct stored balance falls below a threshold. The computing device can transfer, in response to determining the distinct stored balance falls below the threshold, the distinct stored balance to the stored balance.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, implemented at least in part by a computing device of a payment service, comprising:
   receiving, by the payment service, a request to send a data object comprising a digital gift card from a sending user to a receiving user,
      wherein the sending user is associated with a first user account and a first stored balance that is managed by a ledger system associated with the payment service,
      wherein the receiving user is associated with a second user account and a second stored balance that is (i) managed by the ledger system associated with the payment service and (ii) accessible via a payment instrument associated with the payment service,
      wherein the payment instrument comprises at least one of a virtual card within a payment application of the payment service or a physical card provided by the payment service,
      wherein the digital gift card is useable at a merchant of a plurality of available merchants that is selected by the sending user via a user interface of a device associated with the sending user, the user interface of the device associated with the sending user displaying a first instance of the payment application of the payment service executing at the device associated with the sending user, and
      wherein the data object is associated with either an enabled state or a disabled state based on a geographical location within which the data object can be used;
   accessing, by the ledger system associated with the payment service, a data store of the payment service to withdraw an amount of the digital gift card from the first stored balance and associate the amount of the digital gift card with the second user account,
      wherein the amount of the digital gift card is stored as a distinct stored balance associated with the second user account and that is separate from the second stored balance, and
      wherein the first stored balance, the second stored balance, the distinct stored balance, and the geographical location are maintained by the payment service;
   causing the digital gift card to be rendered via a user interface of a device associated with the receiving user, the user interface of the device associated with the receiving user displaying a second instance of the payment application of the payment service executing on the device associated with the receiving user, wherein the user interface of the device associated with the receiving user includes additional data associated with at least one of the second user account, the second stored balance, or the payment instrument;
   monitoring, by the payment service in real-time, transaction data associated with users of the payment service;
   identifying, by the payment service and from the transaction data, a transaction associated with the payment instrument;
   accessing, by the payment service a location of the device associated with the receiving user when the transaction occurs;
   determining, by the payment service and responsive to accessing the location of the device associated with the receiving user, that the data object is associated with the enabled state based on the location of the device matching the geographical location;
   authorizing, by the payment service and responsive to the data object being associated with the enabled state, the transaction; and
   automatically processing payment for the transaction using the distinct stored balance prior to using the second stored balance.

2. The method of claim 1, further comprising:
   receiving, by the payment service, a second request to send a second data object comprising a second digital gift card to the receiving user;
   associating an amount of the second digital gift card with a second distinct stored balance associated with the second user account, wherein the second data object is associated with a condition of use; and
   aggregating the distinct stored balance with the second distinct stored balance to generate a third distinct stored balance.

3. The method of claim 1, further comprising:
   based on a determination, using at least a portion of the transaction data associated with the transaction, that the transaction satisfies a second condition of use associated with an incentive, applying the incentive to the transaction while processing the payment for the transaction using the amount of the digital gift card.

4. The method of claim 1, wherein the sending user is a primary user with a primary account of the payment service, and wherein the receiving user is a secondary user with a secondary account of the payment service that is mapped to the primary account.

5. The method of claim 1, wherein the geographical location corresponds to the merchant selected by the sending user.

6. The method of claim 1, further comprising:
   identifying that a time period associated with a validity of the digital gift card has expired; and
   based on expiry of the time period, aggregating the distinct stored balance with the second stored balance to generate a third stored balance associated with the second user account.

7. The method of claim 1, further comprising:
   receiving, from the device associated with the receiving user, a message indicating that the digital gift card is rejected; and
   based on the message, aggregating the distinct stored balance with the first stored balance to generate a third stored balance associated with the first user account.

8. The method of claim 1, wherein the payment instrument comprises the virtual card within the payment application of the payment service and the physical card provided by the payment service.

9. A method, implemented at least in part by a computing device of a payment service, comprising:
receiving a request to send a data object comprising a digital gift card from a sending user device to a receiving user device, the request including a geographical location within which the data object can be used;
wherein the sending user device is associated with a first user account and a first stored balance that is managed by a ledger system associated with the payment service,
wherein the receiving user device is associated with a second user account and a second stored balance that is (i) managed by the ledger system associated with the payment service and (ii) accessible via a payment instrument associated with the payment service,
wherein the payment instrument comprises at least one of a virtual card within a payment application of the payment service or a physical card provided by the payment service, and
wherein the data object is associated with either an enabled state or a disabled state based on the geographical location;
accessing, by the ledger system associated with the payment service, a data store of the payment service to withdraw an amount of the digital gift card from the first stored balance and associate the amount of the digital gift card with the second user account,
wherein the amount of the digital gift card is stored as a distinct stored balance associated with the second user account and that is separate from the second stored balance, and
wherein the first stored balance, the second stored balance, the distinct stored balance, and the geographical location are maintained by the payment service;
detecting a transaction with the payment instrument;
determining that the data object is associated with the enabled state based on a location of the receiving user device matching the geographical location;
authorizing, responsive to the data object being associated with the enabled state, the transaction; and
automatically processing payment for the transaction using the distinct stored balance prior to using the second stored balance.

10. The method of claim 9, further comprising:
causing the digital gift card to be rendered via a user interface presented by the payment application of the payment service and executing on the receiving user device associated with the second user account, wherein the user interface includes additional data identifying the first user account, the geographical location, and the amount of the distinct stored balance.

11. The method of claim 9, wherein the geographical location corresponds to a merchant.

12. The method of claim 11, wherein the merchant is selected from a plurality of available merchants via an instance of the payment application of the payment service executing at the sending user device.

13. The method of claim 9, wherein the sending user device is associated with a primary account of the payment service, and wherein the receiving user device is associated with a secondary account of the payment service that is mapped to the primary account.

14. The method of claim 9, wherein the data object is associated with a plurality of conditions of use comprising a transaction category, the geographical location within which the data object can be used, a time, an item inclusion list, or an item exclusion list.

15. The method of claim 9, further comprising:
identifying that a time period associated with a validity of the digital gift card has expired; and
based on expiry of the time period, aggregating the distinct stored balance with the second stored balance to generate a third stored balance associated with the second user account.

16. A payment service system comprising:
one or more processors; and
one or more computer-readable non-transitory storage media coupled to the one or more processors and comprising instructions operable when executed by the one or more processors to cause the payment service system to perform operations comprising:
receiving, by a payment service, a request to send a data object comprising a digital gift card from a sending user to a receiving user, the request including a condition of use associated with the data object;
wherein the sending user is associated with a first user account and a first stored balance that is managed by a ledger system associated with the payment service,
wherein the receiving user is associated with a second user account and a second stored balance that is (i) managed by the ledger system associated with the payment service and (ii) accessible via a payment instrument associated with the payment service,
wherein the payment instrument comprises at least one of a virtual card within a payment application of the payment service or a physical card provided by the payment service, and
wherein the data object is associated with either an enabled state or a disabled state based on the condition of use associated with the data object, the condition of use corresponding to a merchant;
accessing, by the ledger system associated with the payment service, a data store of the payment service to withdraw an amount of the digital gift card from the first stored balance and associate the amount of the digital gift card with the second user account,
wherein the amount of the digital gift card is stored as a distinct stored balance associated with the second user account and that is separate from the second stored balance, and
wherein the first stored balance, the second stored balance, the distinct stored balance, and the condition of use associated with the data object are maintained by the payment service;
detecting, based on transaction data associated with users of the payment service, a transaction with the payment instrument;
determining, using the transaction data, that the data object is associated with the enabled state based on the transaction satisfying the condition of use associated with the data object;
authorizing, by the payment service and responsive to the data object being associated with the enabled state, the transaction; and automatically processing payment for the transaction using the distinct stored balance prior to using the second stored balance.

17. The payment service system of claim 16, wherein the condition of use comprises one or more of a transaction category, a geographical location within which the data object can be used, a time, an item inclusion list, an item exclusion list, one or more merchants, or one or more merchant categories.

18. The payment service system of claim 16, wherein the instructions are further operable when executed by the one or more processors to cause the payment service system to perform further operations comprising:
   determining that the distinct stored balance falls below a threshold; and
   transferring, in response to determining the distinct stored balance falls below the threshold, the distinct stored balance to the second stored balance.

19. The payment service system of claim 9, wherein the merchant is selected from a plurality of available merchants by the sending user via a first instance of the payment application of the payment service executing at a first device of the sending user.

20. The payment service system of claim 16, wherein the sending user is a primary user with a primary account of the payment service, and wherein the receiving user is a secondary user with a secondary account of the payment service that is mapped to the primary account.

\* \* \* \* \*